US010645674B2

(12) United States Patent
Kwak et al.

(10) Patent No.: US 10,645,674 B2
(45) Date of Patent: May 5, 2020

(54) METHOD FOR TRANSMITTING BROADCAST SIGNALS, APPARATUS FOR TRANSMITTING BROADCAST SIGNALS, METHOD FOR RECEIVING BROADCAST SIGNALS AND APPARATUS FOR RECEIVING BROADCAST SIGNALS

(71) Applicant: LG ELECTRONICS INC., Seoul (KR)

(72) Inventors: Minsung Kwak, Seoul (KR); Sejin Oh, Seoul (KR); Kyoungsoo Moon, Seoul (KR); Jangwon Lee, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/913,639

(22) PCT Filed: Aug. 21, 2015

(86) PCT No.: PCT/KR2015/008773
§ 371 (c)(1),
(2) Date: Feb. 22, 2016

(87) PCT Pub. No.: WO2016/028120
PCT Pub. Date: Feb. 25, 2016

(65) Prior Publication Data
US 2016/0295553 A1 Oct. 6, 2016

Related U.S. Application Data

(60) Provisional application No. 62/040,419, filed on Aug. 22, 2014.

(51) Int. Cl.
*H04W 4/00* (2018.01)
*H04W 72/00* (2009.01)
(Continued)

(52) U.S. Cl.
CPC ......... *H04W 72/005* (2013.01); *H04L 1/0009* (2013.01); *H04L 1/0042* (2013.01);
(Continued)

(58) Field of Classification Search
CPC .. H04W 72/005; H04L 1/0009; H04L 1/0042; H04L 1/0071; H04L 69/164; H04L 69/22; H04N 21/00
See application file for complete search history.

(56) References Cited

U.S. PATENT DOCUMENTS 8,498,272 B2 7/2013 Väre et al.
2002/0063150 A1 5/2002 Nygren et al.
(Continued)

FOREIGN PATENT DOCUMENTS

CN 102484694 A 5/2012
CN 10283220 A 9/2013
(Continued)

OTHER PUBLICATIONS

Luby et al., RFC 3451 Layered Coding Transport (LCT) Building Block, Dec. 2002, Network Working Group ,pp. 13-16 and Fig. 1 (Year: 2002).*

*Primary Examiner* — Gerald A Smarth
(74) *Attorney, Agent, or Firm* — Birch, Stewart, Kolasch & Birch, LLP

(57) ABSTRACT

Disclosed herein is a method and apparatus for transmitting and receiving a broadcast signal. The method for transmitting a broadcast signal includes encoding a broadcast service and signaling information of the broadcast service, generating the broadcast signal including the encoded broadcast service and signaling information, and transmitting the generated broadcast signal.

12 Claims, 91 Drawing Sheets

(51) Int. Cl.
*H04W 4/06* (2009.01)
*H04L 1/00* (2006.01)
*H04N 21/00* (2011.01)
*H04L 5/00* (2006.01)
*H04L 29/06* (2006.01)
*H04L 27/26* (2006.01)
*H04L 1/08* (2006.01)

(52) U.S. Cl.
CPC .......... *H04L 1/0057* (2013.01); *H04L 1/0071* (2013.01); *H04L 5/0007* (2013.01); *H04L 27/2601* (2013.01); *H04L 69/164* (2013.01); *H04L 69/22* (2013.01); *H04N 21/00* (2013.01); *H04W 4/06* (2013.01); *H04L 1/08* (2013.01); *H04L 5/0091* (2013.01); *H04L 69/16* (2013.01); *H04L 2001/0093* (2013.01)

(56) References Cited

U.S. PATENT DOCUMENTS

| | | | |
|---|---|---|---|
| 2008/0056196 A1 | 3/2008 | Ito et al. | |
| 2009/0257391 A1 | 10/2009 | Song et al. | |
| 2010/0242067 A1* | 9/2010 | Song | H04H 20/67 725/51 |
| 2011/0228865 A1 | 9/2011 | Park et al. | |
| 2012/0110629 A1 | 5/2012 | Ruiz Alonzo et al. | |
| 2013/0034032 A1 | 2/2013 | Väre et al. | |
| 2013/0036234 A1* | 2/2013 | Pazos | H04L 12/189 709/231 |
| 2013/0201399 A1* | 8/2013 | Kitazato | H04N 5/44 348/553 |
| 2013/0219431 A1 | 8/2013 | Hong et al. | |
| 2013/0230036 A1* | 9/2013 | Reznik | H04L 67/16 370/338 |
| 2013/0235865 A1 | 9/2013 | Eum et al. | |
| 2013/0291046 A1 | 10/2013 | Ko et al. | |
| 2014/0006564 A1* | 1/2014 | Thang | H04L 65/601 709/219 |
| 2014/0380135 A1* | 12/2014 | Hong | H04H 20/42 714/776 |
| 2016/0011923 A1* | 1/2016 | Walker | H04L 65/80 714/49 |
| 2016/0134927 A1* | 5/2016 | Kitazato | H04N 21/2381 725/110 |
| 2016/0360241 A1 | 12/2016 | Hong et al. | |
| 2017/0099517 A1 | 4/2017 | Kitahara et al. | |

FOREIGN PATENT DOCUMENTS

| | | |
|---|---|---|
| CN | 103283219 A | 9/2013 |
| CN | 103493499 A | 1/2014 |
| CN | 103535013 A | 1/2014 |
| CN | 103535046 A | 1/2014 |
| KR | 10-2009-0021120 A | 2/2009 |
| KR | 10-2009-0021125 A | 2/2009 |
| KR | 10-2009-0108677 A | 10/2009 |
| KR | 10-2009-0124959 A | 12/2009 |
| KR | 10-2010-0069293 A | 6/2010 |
| KR | 10-2012-0103511 A | 9/2012 |
| KR | 10-2013-0056829 A | 5/2013 |
| KR | 10-2013-0087584 A | 8/2013 |
| KR | 10-2013-0102984 A | 9/2013 |
| WO | WO 2011/105803 A2 | 9/2011 |
| WO | WO 2012/036429 A2 | 3/2012 |
| WO | WO 2015/102381 A1 | 7/2015 |

* cited by examiner

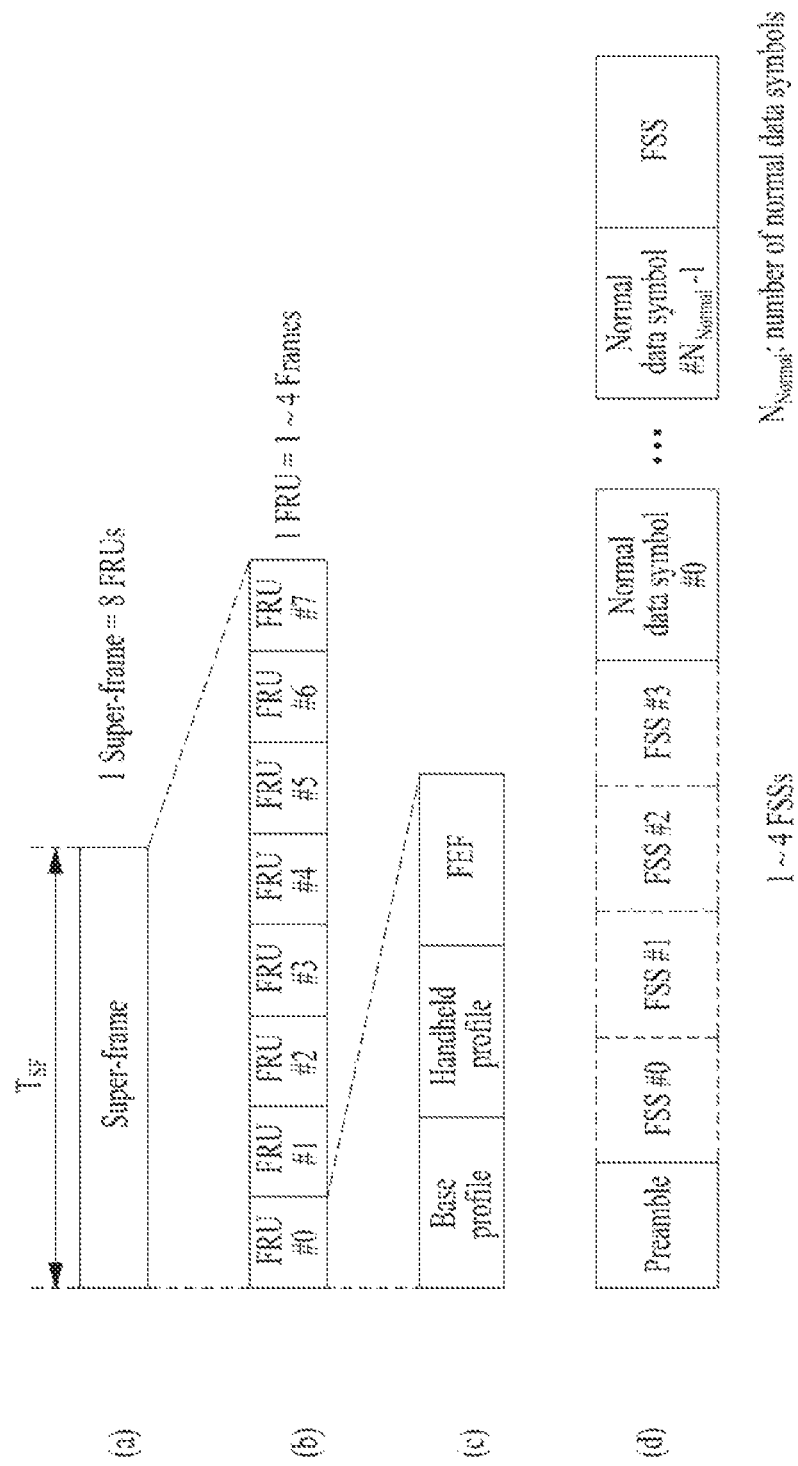

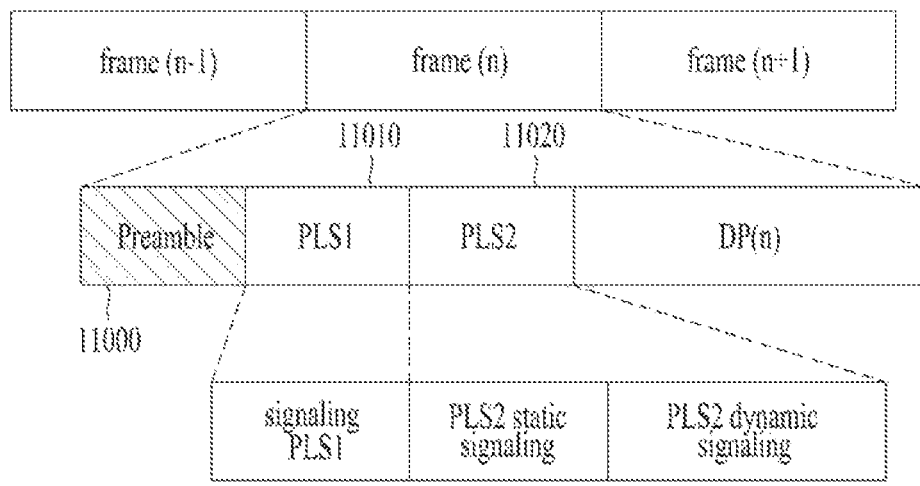

FIG. 12

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MOD | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 13

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE == '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1: NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1; NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1;NUM_AUX | |
|     AUX_PRIVATE_DYN | 48 |
| end | |
| CRC_32 | 32 |

FIG. 20
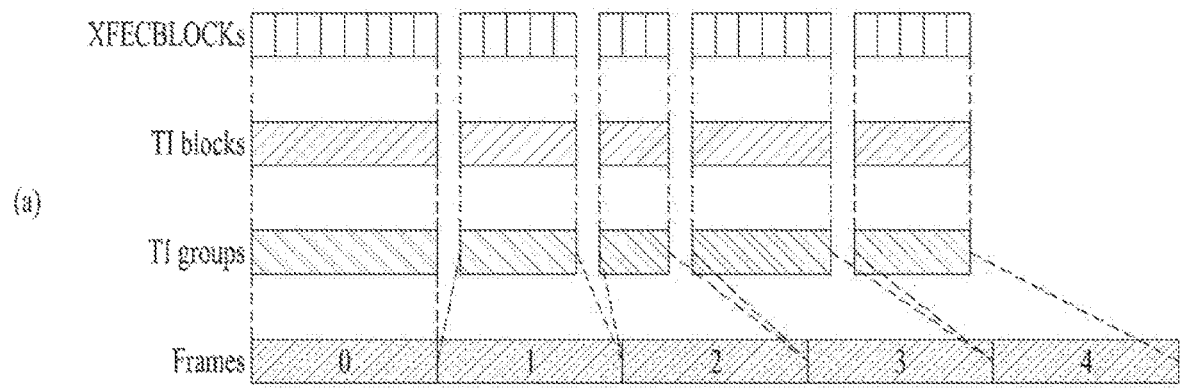
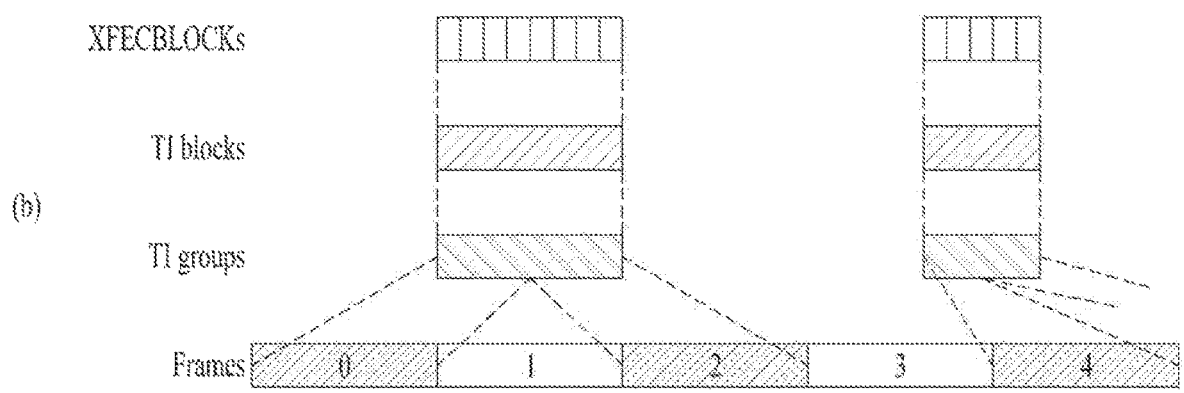
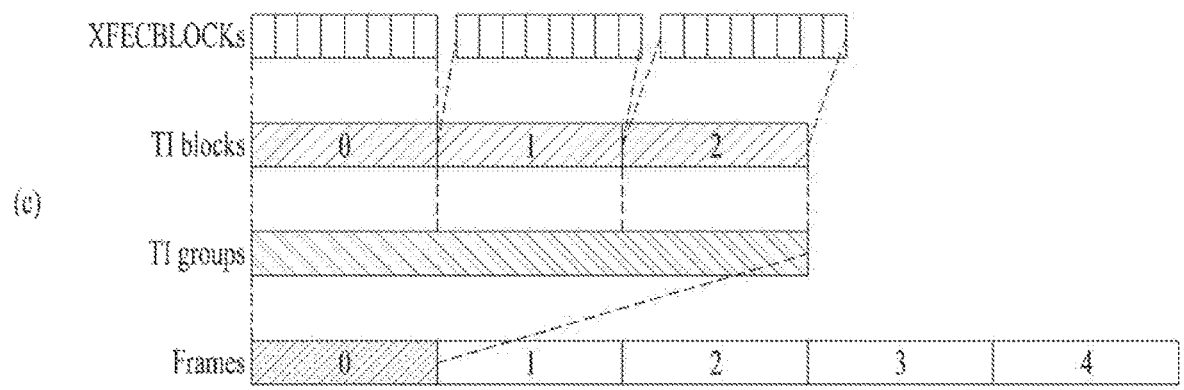

| N_sym | | Fl_mode | |
|---|---|---|---|
| | | 0 | 1 |
| N_sym | even | Fl scheme #1 | Fl scheme #1 |
| | odd | Fl scheme #1 | Fl scheme #2 |

FIG. 27

|  |  | FI_mode | |
|---|---|---|---|
|  |  | 0 | 1 |
| N_sym | even | off | off |
|  | odd | on | off |

FIG. 28

$t50010$ — $O_{m,l} = [x_{m,l,0}, ..., x_{m,l,p}, ..., x_{m,l,N_{data}-1}]$   $l = 0, ..., N_{sym}-1$ $t50020$ — $P_{m,l} = [v_{m,l,0}, ..., v_{m,l,N_{data}-1}]$   $l = 0, ..., N_{sym}-1$

FIG. 29

$t51010$ — $v_{m,l,H_l(p)} = x_{m,l,p}$   $l = 0, 1, ..., N_{sym}-1$   $p = 0, 1, ..., N_{data}-1$ $t51020$ — $v_{m,l,p} = x_{m,l,H_l(p)}$   $l = 0, 1, ..., N_{sym}-1$   $p = 0, 1, ..., N_{data}-1$

FIG. 37

$$\text{for } 0 \leq k \leq N_{cells} N'_{BLOCK\_TI} - 1$$
$$r_k = \text{mod}(k, N_{cells}),$$
$$t_k = \text{mod}(S_T \times r_k, N'_{BLOCK\_TI}),$$
$$c_k = \text{mod}\left(t_{j,k} + \left\lfloor \frac{k}{N_{cells}} \right\rfloor, N'_{BLOCK\_TI}\right),$$
$$\pi(k) = N_{cells} c_k + r_k$$
end
where $S_T$ is defined as
$$S_T = \frac{N'_{BLOCK\_TI} - 1}{2} + 1 \quad \text{for } \begin{cases} N'_{BLOCK\_TI} = N_{BLOCK\_TI} + 1, & \text{if } N_{BLOCK\_TI} \bmod 2 = 0 \\ N'_{BLOCK\_TI} = N_{BLOCK\_TI}, & \text{if } N_{BLOCK\_TI} \bmod 2 = 1 \end{cases}$$

$\pi(k)$: the k-th address for reading memory data
$S_T$: shift value for use in interleaving (constant value)

FIG. 39 for $0 \leq k \leq N_{cells} N'_{BLOCK\_TI\_MAX} - 1$ $r_k = \text{mod}(k, N_{cells})$, $t_k = \text{mod}(S_T \times r_k, N'_{BLOCK\_TI\_MAX})$, $c_k = \text{mod}\left(t_k + \left\lfloor \dfrac{k}{N_{cells}} \right\rfloor, N'_{BLOCK\_TI\_MAX}\right)$ $V(k) = N_{cells} c_k + r_k$, if $V(k) \geq N_{cells} N_{BLOCK\_TI\_MAX}$  ⎫
$\quad \pi(C_{cnt}) = V(k)$,                    ⎬  Skip virtual FEC blocks
$\quad C_{cnt} = C_{cnt} + 1$,                  ⎪
end                                              ⎭ end where $C_{cnt} = 0$, $S_T = \dfrac{N'_{BLOCK\_TI\_MAX} - 1}{2} + 1$ for $\begin{cases} N'_{BLOCK\_TI\_MAX} = N_{BLOCK\_TI\_MAX} + 1, & \text{if } N_{BLOCK\_TI\_MAX} \bmod 2 = 0 \\ N'_{BLOCK\_TI\_MAX} = N_{BLOCK\_TI\_MAX}, & \text{if } N_{BLOCK\_TI\_MAX} \bmod 2 = 1 \end{cases}$ $N_{BLOCK\_TI\_Diff} = N'_{BLOCK\_TI\_MAX} - N_{BLOCK\_TI}$

FIG. 41

$N_{TI\_NUM} = 2, N_{cells} = 30,$
$N_{BLOCK\_TI,0} = 5,$
$N_{BLOCK\_TI,1} = 6,$ ▫ At that time, $N_{cells} = 30, N_{BLOCK\_TI\_MAX} = \max(5,6) = 6$ $$S_T = \frac{N_{BLOCK\_TI\_MAX} - 1}{2} + 1 \; for \begin{cases} N_{BLOCK\_TI\_MAX} = N_{BLOCK\_TI\_MAX} + 1, & if \; N_{BLOCK\_TI\_MAX} \bmod 2 = 0 \\ N_{BLOCK\_TI\_MAX} = N_{BLOCK\_TI\_MAX}, & if \; N_{BLOCK\_TI\_MAX} \bmod 2 = 1 \end{cases}$$

$\boxed{S_T = 4}$ $\quad \boxed{N_{BLOCK\_TI\_MAX} = 7}$

FIG. 47 for $0 \le k \le N_{cells} N'_{BLOCK\_TI\_MAX} - 1$ $r_k = \mod(k, N_{cells})$, $t_k = \mod(S_R \times r_k, N'_{BLOCK\_TI\_MAX})$, $c_k = \mod\left(t_k + \left\lfloor \dfrac{k}{N_{cells}} \right\rfloor, N'_{BLOCK\_TI\_MAX}\right)$, $V(k) = N_{cells} c_k + r_k$, if $V(k) \ge N_{cells} N_{BLOCK\_TI\_Diff}$    Skip virtual FEC blocks $\pi(C_{cnt}) = \theta(k)$, $C_{cnt} = C_{cnt} + 1$, end end where $C_{cnt} = 0$, $S_R = N'_{BLOCK\_TI\_MAX} - S_T$, $N_{BLOCK\_TI\_Diff} = N'_{BLOCK\_TI\_MAX} - N_{BLOCK\_TI}$

| Syntax | No. Bits | Format |
|---|---|---|
| signaling_message_header{ | | |
|    signaling_id | 8 | uimsbf |
|    signaling_length | 12 | uimsbf |
|    reserved | 4 | '1111' |
|    signaling_id_extension { | | |
|      protocol_version | 8 | uimsbf |
|      reserved | 8 | uimsbf |
|    } | | |
|    reserved | 2 | '11' |
|    version_number | 5 | uimsbf |
|    current_next_indicator | 1 | uimsbf |
|    fragment_number | 8 | uimsbf |
|    last_fragment_number | 8 | uimsbf |
| } | | |

FIG. 61

| Signaling message header | Signaling message (binary or XML formatted) |
|---|---|

| Syntax | No. Bits | Format |
|---|---|---|
| signaling_message_header   { | | |
|    signaling_id | 8 | uimsbf |
|    signaling_length | 12 | uimsbf |
|    reserved | 4 | '1111' |
|    signaling_id_extension   { | | |
|       protocol_version | 8 | uimsbf |
|       reserved | 8 | uimsbf |
|    } | | |
|    reserved | 2 | '11' |
|    version_number | 5 | uimsbf |
|    current_next_indicator | 1 | uimsbf |
|    payload_format | 2 | uimsbf |
|    expiration | 32 | uimsbf |
|    fragment_number | 8 | uimsbf |
|    last_fragment_number | 8 | uimsbf |
| } | | |

FIG. 62

```
┌─────────────────────┬─────────────────────────────────┐
│ Signaling message   │ Service map signaling message   │
│ header              │ or portion thereof              │
└─────────────────────┴─────────────────────────────────┘
                                    │
                                    ▼
```

| Syntax | No. of Bits | Format |
|---|---|---|
| service_map_signaling_message { | | |
| ... | | |
|   num_services | 8 | uimsbf |
|   for (i=0; i<num_services; i++) | | |
|   { | | |
|     service_id | 16 | uimsbf |
|     service_type | 8 | uimsbf |
|     short_service_name_length /* m */ | 3 | uimsbf |
|     short_service_name | 16*m | bslbf |
|     channel_number | 16 | uimsbf |
|     ... | | |
|     timebase_transport_mode | 8 | uimsbf |
|     bootstrap_data(timebase_transport_mode) | var | |
|     signaling_transport_mode | 8 | |
|     bootstrap_data(signaling_transport_mode) | var | |
|     ... | | |
|     num_service_level_descriptors | 8 | uimsbf |
|     for (m=0; m<num_service_level_descriptors; m++) | | |
|     { | | |
|       service_level_descriptor() | var | |
|     } | | |
|   } | | |
| } | | |

FIG. 63

| Timebase_transport_mode or signaling_transport_mode value | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 64

| Syntax | No. of Bits | Format |
|---|---|---|
| bootstrap_data( ) { | | |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    port_num_count | 8 | |
|    if(port_num_count > 0) | | |
|       destination_UDP_port_num | 16 | uimsbf |
| } | | |

FIG. 65

| Syntax | No. of Bits | Format |
|---|---|---|
| bootstrap_data() { | | |
|    broadcast_id | 16 | uimsbf |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    port_num_count | 8 | |
|    if(port_num_count > 0) | | |
|       destination_UDP_port_num | 16 | uimsbf |
| } | | |

FIG. 66

| Syntax | No. of Bits | Format |
|---|---|---|
| bootstrap_data( ) { | | |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    tsi | 16 | uimsbf |
| } | | |

FIG. 67

| Syntax | No. of Bits | Format |
|---|---|---|
| bootstrap_data( ) { | | |
|    broadcast_id | 16 | uimsbf |
|    IP_version_flag | 1 | bslbf |
|    source_IP_address_flag | 1 | bslbf |
|    destination_IP_address_flag | 1 | bslbf |
|    reserved | 5 | '11111' |
|    if(source_IP_address_flag) | | |
|       source_IP_address | 32 or 128 | uimsbf |
|    if(destination_IP_address_flag) | | |
|       destination_IP_address | 32 or 128 | uimsbf |
|    destination_UDP_port_num | 16 | uimsbf |
|    tsi | 16 | uimsbf |
| } | | |

FIG. 68

| Syntax | No. of Bits | Format |
|---|---|---|
| bootstrap_data() { | | |
|   IP_version_flag | 1 | bslbf |
|   source_IP_address_flag | 1 | bslbf |
|   destination_IP_address_flag | 1 | bslbf |
|   reserved | 5 | '11111' |
|   if(source_IP_address_flag) | | |
|     source_IP_address | 32 or 128 | uimsbf |
|   if(destination_IP_address_flag) | | |
|     destination_IP_address | 32 or 128 | uimsbf |
|   destination_UDP_port_num | 16 | uimsbf |
|   packet_id | 16 | uimsbf |
| } | | |

FIG. 69

| Syntax | No. of Bits | Format |
|---|---|---|
| bootstrap_data() { | | |
|   broadcast_id | 16 | uimsbf |
|   IP_version_flag | 1 | bslbf |
|   source_IP_address_flag | 1 | bslbf |
|   destination_IP_address_flag | 1 | bslbf |
|   reserved | 5 | '11111' |
|   if(source_IP_address_flag) | | |
|     source_IP_address | 32 or 128 | uimsbf |
|   if(destination_IP_address_flag) | | |
|     destination_IP_address | 32 or 128 | uimsbf |
|   destination_UDP_port_num | 16 | uimsbf |
|   packet_id | 16 | uimsbf |
| } | | |

FIG. 70

| Syntax | No. of Bits | Format |
|---|---|---|
| bootstrap_data() { | | |
|    URL_length | 8 | |
|    for (i = 0; i < URL_length; i++) { | | |
|       URL_char | 8 | bslbf |
|    } | | |
| } | | |

FIG. 71

```
service_map_signaling_message {
    ...
    num_services
    for (i=0; i<num_services; i++)
    {
        service_id
        service_type
        short_service_name_length /* m */
        short_service_name
        channel_number
        ...
        timebase_transport_mode
        bootstrap_data(timebase_transport_mode)
        signaling_transport_mode
        bootstrap_data(signaling_transport_mode)
        ...
        num_service_level_descriptors
        for (m=0; m<num_service_level_descriptors; m++)
        {
            service_level_descriptor()
        }
    }
}
```

— IP/UDP flow for delivering timebase timebase
timebase_id
clock_rate
...

— Specific ACL/LCT transport session

MPG signaling message
MPD@id
...

Component location signaling message
Service_id
for (i=0; i<num_components; i++)
{
...
}

Application signaling message
App_signaling_id
for (i=0; i<num_apps; i++)
{
...
}

FIG. 72

| | Signaling message header | Service map signaling message or portion thereof |
|---|---|---|

| Syntax | No. of Bits | Format |
|---|---|---|
| service_map_signaling_message { | | |
| ... | | |
|   num_services | 8 | uimsbf |
|   for (i=0; i<num_services; i++) | | |
|   { | | |
|     service_id | 16 | uimsbf |
|     service_type | 8 | uimsbf |
|     short_service_name_length /* m */ | 3 | uimsbf |
|     short_service_name | 16*m | bslbf |
|     channel_number | 16 | uimsbf |
|     ... | | |
|     timebase_transport_flag | 1 | bslbf |
|     if(timebase_transport_flag) | | |
|       timebase_transport_mode | 8 | uimsbf |
|       bootstrap_data(timebase_transport_mode) | var | |
|     } | | |
|     signaling_transport_mode | 8 | uimsbf |
|     bootstrap_data(signaling_transport_mode) | var | |
|     ... | | |
|     num_service_level_descriptors | 8 | uimsbf |
|     for (m=0; m<num_service_level_descriptors; m++) | | |
|     { | | |
|       service_level_descriptor() | var | |
|     } | | |
|   } | | |
| } | | |

FIG. 73

| Signaling message header | service map signaling message or portion thereof |

Service map signaling message is as follows.
(represented in other formats such as XML)

| Syntax | No. of Bits | Format |
|---|---|---|
| service_map_signaling_message { | | |
| ... | | |
|   num_services | 8 | uimsbf |
|   for (i=0; i<num_services; i++) | | |
|   { | | |
|     service_id | 16 | uimsbf |
|     service_type | 8 | uimsbf |
|     ... | | |
|     timebase_transport_flag | 1 | bslbf |
|     MPD_transport_flag | 1 | bslbf |
|     component_location_transport_flag | 1 | bslbf |
|     app_signaling_transport_flag | 1 | bslbf |
|     signaling_transport_flag | 1 | bslbf |
|     reserved | 3 | '111' |
|     if(timebase_transport_flag) | | |
|       timebase_transport_mode | 8 | uimsbf |
|       bootstrap_data(timebase_transport_mode) | var | |
|     } | | |
|     if(MPD_transport_flag) | | |
|       MPD_transport_mode | 8 | |
|       bootstrap_data(MPD_transport_mode) | var | |
|     } | | |
|     if(component_location_transport_flag) | | |
|       component_location_transport_mode | 8 | uimsbf |
|       bootstrap_data(component_location_transport_mode) | var | |
|     } | | |
|     if(app_signaling_transport_flag) | | |
|       app_signaling_transport_mode | 8 | |
|       bootstrap_data(app_signaling_transport_mode) | var | |
|     } | | |
|     if(signaling_transport_flag) | | |
|       signaling_transport_mode | 8 | |
|       bootstrap_data(signaling_transport_mode) | var | |
|     } | | |
|     ... | | |
|     num_service_level_descriptors | 8 | uimsbf |
|     for (m=0; m<num_service_level_descriptors; m++) | | |
|     { | | |
|       service_level_descriptor() | var | |
|     } | | |
|   } | | |
| } | | |

FIG. 74

| X_transport_mode value | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 75

| Syntax | No. Bits | Format |
|---|---|---|
| component_location_signaling_message { | | |
|    signaling_id | 8 | uimsbf |
|    signaling_length | 12 | uimsbf |
|    reserved | 4 | '1111' |
|    signaling_id_extension { | | |
|       protocol_version | 8 | uimsbf |
|       reserved | 8 | uimsbf |
|    } | | |
|    reserved | 2 | '11' |
|    version_number | 5 | uimsbf |
|    current_next_indicator | 1 | uimsbf |
|    fragment_number | 8 | uimsbf |
|    last_fragment_number | 8 | uimsbf |
|    service_id | 16 | uimsbf |
|    num_components | 8 | uimsbf |
|    for (i=0; i<num_components; i++) | | |
|    { | | |
|       component_id_length /*L*/ | 8 | uimsbf |
|       component_id | 8*L | uimsbf |
|       frequency_number | 16 | uimsbf |
|       broadcast_id | 16 | uimsbf |
|       data_pipe_id | 8 | uimsbf |
|       IP_version_flag | 1 | bslbf |
|       source_IP_address_flag | 1 | bslbf |
|       destination_IP_address_flag | 1 | bslbf |
|       reserved | 5 | '11111' |
|       if (source_IP_address_flag) | | |
|          source_IP_address | 32 or 128 | uimsbf |
|       if (destination_IP_address_flag) | | |
|          destination_IP_address | 32 or 128 | uimsbf |
|       UDP_port_num | 16 | uimsbf |
|       tsi | 16 | uimsbf |
|    } | | |
|    num_app_signalings | 8 | uimsbf |
|    for (k=0; k<num_app_signalings; k++) | | |
|    { | | |
|       app_signaling_id_length /*M*/ | 8 | uimsbf |
|       app_signaling_id | 8*M | uimsbf |
|       app_delivery_info() | var | |
|    } | | |
| } | | |

FIG. 76

| Syntax | No. of Bits | Format |
|---|---|---|
| app_delivery_info() { | | |
|    broadcast_flag | 1 | bslbf |
|    IP_version_flag | 1 | bslbf |
|    source_IP_address_flag | 1 | bslbf |
|    destination_IP_address_flag | 1 | bslbf |
|    reserved | 4 | '1111' |
|    if (broadcast_flag) | | |
|       broadcast_id | 16 | uimsbf |
|    if (source_IP_address_flag) | | |
|       source_IP_address | 32 or 128 | uimsbf |
|    if (destination_IP_address_flag) | | |
|       destination_IP_address | 32 or 128 | uimsbf |
|    destination_UDP_port_num | 16 | uimsbf |
|    tsi | 16 | uimsbf |
| } | | |

FIG. 77

| Syntax | No. of Bits | Format |
|---|---|---|
| app_delivery_info() { | | |
|    broadcast_flag | 1 | bslbf |
|    IP_version_flag | 1 | bslbf |
|    source_IP_address_flag | 1 | bslbf |
|    destination_IP_address_flag | 1 | bslbf |
|    reserved | 4 | '1111' |
|    if (broadcast_flag) | | |
|       broadcast_id | 16 | uimsbf |
|    if (source_IP_address_flag) | | |
|       source_IP_address | 32 or 128 | uimsbf |
|    if (destination_IP_address_flag) | | |
|       destination_IP_address | 32 or 128 | uimsbf |
|    destination_UDP_port_num | 16 | uimsbf |
|    packet_id | 16 | uimsbf |
| } | | |

FIG. 78

```xml
<?xml version="1.0" encoding="UTF-8"?>
<xs:schema xmlns:xs="http://www.w3.org/2001/XMLSchema">
<xs:element name="CompLocTable" type="CompLocTableType"/>
<xs:complexType name="CompLocTableType">
  <xs:sequence>
    <xs:element name="MPDCompLocs" maxOccurs="unbounded">
      <xs:complexType>
        <xs:sequence>
          <xs:element name="PeriodCompLocs" maxOccurs="unbounded">
            <xs:complexType>
              <xs:sequence>
                <xs:element name="ReptnLoc" type="ReptnLocType" maxOccurs="unbounded"/>
              </xs:sequence>
              <xs:attribute name="periodId" type="xs:string"/>
            </xs:complexType>
          </xs:element>
        </xs:sequence>
        <xs:attribute name="mpdId"/>
      </xs:complexType>
    </xs:element>
  </xs:sequence>
</xs:complexType>
<xs:complexType name="ReptnLocType">
  <xs:attribute name="ReptnID" type="StringNoWhitespaceType" use="required"/>
  <xs:attribute name="RFChan" type="xs:unsignedByte" use="required"/>
  <xs:attribute name="BroadcastId " type="xs:unsignedByte" use="required"/>
  <xs:attribute name="DataPipeId " type="xs:unsignedByte" use="required"/>
  <xs:attribute name="IPAddr" type="xs:unsignedInt" use="required"/>
  <xs:attribute name="UDPPort" type="xs:unsignedShort" use="required"/>
  <xs:attribute name="TSI" type="xs:unsignedInt" use="required"/>
</xs:complexType>
<!-- String without white spaces -->
<xs:simpleType name="StringNoWhitespaceType">
  <xs:restriction base="xs:string">
    <xs:pattern value="[^\r\n\t \p{Z}]*"/>
  </xs:restriction>
</xs:simpleType>
</xs:schema>
```

FIG. 80

| Element or Attribute Name | Use | Description |
|---|---|---|
| Service | | |
| @id | M | Service identifier |
| @serviceType | M | service type |
| @serviceName | O | service name |
| @channelNumber | M | channel number associated with this service |
| .. | | |
| | | |
| TimebaseLocation | 0...1 | The location where a time base, a metadata to establish a time line for synchronizing the components of this service, can be acquired |
| @deliveryMode | M | The delivery mode of this time base. |
| BootstrapInfo | 1 | Bootstrap information of this time base according to the delivery mode |
| MPD | 0...1 | DASH media presentation description (MPD) including components of this service |
| MPDSignalingLocation | 0...1 | The location where MPD or MPD URL can be acquired |
| @deliveryMode | O | The delivery mode of this MPD location signalling |
| BootstrapInfo | 1 | Bootstrap information of MPD or MPD URL according to the delivery mode |
| ComponentSignalingLocation | 1...N | Component location signalling |
| @deliveryMode | O | The delivery mode of this component location signalling |
| BootstrapInfo | 1 | Bootstrap information of this component location signalling according to the delivery mode |
| AppSignalingLocation | 0...N | The location where application signalling can be acquired |
| @deliveryMode | O | The delivery mode of this application signalling |
| BootstrapInfo | 1 | Bootstrap information of the application signalling according to the delivery mode |
| ObjectFlow | 1...N | associated object flow delivering components of this service |
| Legend: | | |
| For attributes: M=Mandatory, O=Optional, OD=Optional with Default Value, CM=Conditionally Mandatory. For elements: <minOccurs>...<maxOccurs> (N=unbounded) Note that the conditions only holds without using xlink:href. If linking is used, then all attributes are "option" and <minOccurs=0> Elements are bold; attributes are non-bold and preceded with an @. | | |

FIG. 81

| @ deliveryMode value | Designation |
|---|---|
| 0x00 | IPv4/IPv6 flows through same broadcast or over the cellular network |
| 0x01 | IPv4/IPv6 flows through different broadcast |
| 0x02 | Session - based flows (e.g., ALC/LCT, FLUTE sessions) through same broadcast |
| 0x03 | Session - based flows (e.g., ALC/LCT, FLUTE sessions) through different broadcast |
| 0x04 | packet - based flows through same broadcast |
| 0x05 | packet - based flows through different broadcast |
| 0x06 | URL |
| 0x07-0xFF | Reserved |

FIG. 82

| Element or Attribute Name | Use | Description |
|---|---|---|
| BootstrapInfo | | |
| @ RFchannel | O | RF channel carrying broadcast stream |
| @ broadcastID | O | the identifier of broadcaster transmitting the broadcast stream |
| @ datapipeID | O | the physical layer data pipe identifier carrying IP datagrams |
| @ sourceIP | O | the source address of the IP datagrams carrying associated data |
| @ destinationIP | O | the destination address of the IP datagrams carrying associated data |
| @ destinationPort | O | the destination port number of the IP datagrams carrying associated data |
| @ tsi | O | the identifier of transport session delivering transport packets carrying associated data |
| @ URL | O | URL where associated data can be acquired |
| @ packetId | O | The identifier of transport packets carrying the associated data |
| Legend | | |
| For attributes: M=Mandatory, O=Optional, OD=Optional with Default Value, CM=Conditionally Mandatory. For elements: <minOccurs>...<maxOccurs> (N=unbounded) Note that the conditions only holds without using xlink:href. If linking is used, then all attributes are "optional" and <minOccurs>=0 Elements are bold; attributes are non-bold and preceded with an @. | | |

FIG. 83

| Element or Attribute Name | Use | Description |
|---|---|---|
| ObjectFlow | | specifies the object flow |
| @id | M | the object flow identifier. When DASH segments are delivered via this object flow, it can be equal to combination of MPD identifier, period identifier, and DASH representation identifier |
| @objectFormat | M | The format of objects in this object flow. |
| @contentType | O | the media content component type for this object flow |
| @contentEncoding | O | the encoding of delivered objects via this object flow (e.g., gzip, etc) |
| File | 0..N | file information |
| @contentLocation | M | location where this file can be acquired. When DASH segments are delivered via this object flow, it can be equal to DASH segment URL |
| @TOI | M | transport object identifier (TOI) |
| FileTemplate | 0..1 | file template information. |
| @contentLocTemplate | M | Template to create location where a file can be acquired. |
| @startTOI | O | the first TOI that is delivered in this object flow |
| @endTOI | O | the end TOI that is delivered in this object flow |
| @scale | O (default = 1) | the scale between TOI values in this object flow |
| ObjectGroup | 0..N | the group of transport objects delivered via this object flow |
| @contentLocation | M | content location associated to this object group |
| @startTOI | O | the first TOI of packets delivering this object group |
| @endTOI | O | the last TOI of packets delivering this object group |
| BootstrapInfo | 0..N | bootstrap information of this object flow |

Legend :
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs>=0 Elements are bold, attributes are non-bold and preceded with an @.

FIG. 84

| $<Identifier>$ | Substitution parameter | Format |
|---|---|---|
| $$ | Is an escape sequence, i.e. "$$" is replaced with a single "$". | not applicable |
| $RepresentationID$ | This identifier is substituted with the value of the attribute Representation@id of the containing Representation. | The format tag shall not be present. |
| $Number$ | This identifier is substituted with the number of the corresponding Segment. | The format tag may be present.<br>If no format tag is present, a default format tag with width=1 shall be used. |

FIG. 85

| Element or Attribute Name | Use | Description |
|---|---|---|
| ObjectFlow | | specifies the object flow |
| @id | M | the object flow identifier. When DASH segments are delivered via this object flow, it can be equal to combination of MPD identifier, period identifier, and DASH representation identifier |
| @objectFormat | M | The format of objects in this object flow. |
| @contentType | O | the media content component type for this object flow |
| @contentEncoding | O | the encoding of delivered objects via this object flow (e.g., gzip, and so on) |
| @isDefault | OD (default=true) | Specifies whether objects delivered in this object flow include the component data used as default |
| File | 0..N | file information |
| @contentLocation | M | location where this file can be acquired. When DASH segments are delivered via this object flow, it can be equal to DASH segment URL |
| @TOI | M | transport object identifier (TOI) |
| FileTemplate | 0..1 | file template information. |
| @startTOI | O | the first TOI that is delivered in this object flow |
| @endTOI | O | the end TOI that is delivered in this object flow |
| @scale | OD (default = 1) | the scale between TOI values in this object flow. |
| ObjectGroup | 0..N | the group of transport objects delivered via this object flow. |
| @contentLocation | M | content location associated to this object group |
| @startTOI | O | the first TOI of packets delivering this object group |
| @endTOI | O | the last TOI of packets delivering this object group |
| BootstrapInfo | 0..N | bootstrap information of this object flow |

Legend :

For attributes: M=Mandatory, O=Optional, OD=Optional with Default Value, CM=Conditionally Mandatory.

For elements: <minOccurs>...<maxOccurs> (N=unbounded)

Note that the conditions only holds without using xlink:href. If linking is used, then all attributes are "optional" and <min Occurs=0>

Elements are bold; attributes are non-bold and preceded with an @.

FIG. 86

| Element or Attribute Name | Use | Description |
|---|---|---|
| FDTInstance | | specifies the static File Delivery Descriptor |
| @id | M | specifies the identifier of the FDT instance |
| @Expires | M | expiry time of the FDT Instance. |
| @Complete | O | when TRUE, signals that no new data will be provided in future FDT Instances within this session (i.e., that either FDT Instances with higher ID numbers will not be used or if they are used, will only provide identical file parameters to those already given in this and previous FDT Instances) |
| File | 1..N | |
| @Content-Location | M | Can be assigned a valid URI |
| @TOI | M | MUST be assigned a valid TOI value |
| @Content-Length | O | The actual length of this file content |
| @Transfer-Length | O | The transfer length of this file content |
| @Content-Encoding | O | The encoding of this file content |
| @Content-Type | O | The type of this file content |

Legend:
For attributes: M=Mandatory, O=Optional, OD=Optional with Default Value, OM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 87

| Element or Attribute Name | Use | Description |
|---|---|---|
| TSID | | Transport Session Instance Descriptor |
| TransportSession | 1...N | |
| @tsi | M | specifies the transport session identifier |
| PayloadFormat | 1...N | |
| @codePoint | OD default=0 | defines what CodePoint value is used for this payload. This is the value of the CP field in the LCT header. |
| @protocol | M | specifies the protocol for this payload.<br>0: ALC<br>1: ROUTE |
| @deliveryObjectFormat | M | specifies the payload format of the delivery object. For details see below. |
| @realtime | OD | if not present it is false. If present and set to true, LCT packets contain extension headers including NTP timestamps that express the presentation time of the included delivery object. |
| @isobmff | OD default=0 | expresses if the delivery objects are ISO BMFF structures and if specific fragmentation is applied<br>0: arbitrary data<br>1: delivery object is a sequence of complete ISO BMFF boxes<br>2: each delivery object is a DASH object, i.e. a segment or any other object that is referenced in the MPD.<br>3: delivery object is a is a sequence of complete ISO BMFF boxes fragmented according to the rules in MMT MPU mode |
| @packetheadersize | OD default=1 | The size the route packet header in multiple of 4 octets. The value space shall 0, 1 or 2. If set to 0, the ROUTE packet is of zero size and the packet itself contains an entire delivery object. |
| EFID | 0...1 | provides details of the file delivered data. This is the extended FDT instance descriptor. Either embedded or as reference. |
| ApplicationIdentifier | 0...1 | may provide additional information that can be mapped to the application that is carried in this transport session, e.g. Representation ID of a DASH content. |
| RepairFlow | 0...N | Reference a repair flow. This may be added directly or referenced as a separate fragment |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @.

FIG. 88

| Element or Attribute Name | Use | Description |
|---|---|---|
| TSID | | Transport Session Instance Descriptor |
| TransportSession | 1..N | |
| @tsi | M | specifies the transport session identifier |
| @protocol | M | specifies the protocol for this payload.<br>0: ALC<br>1: ROUTE |
| PayloadFormat | 1..N | |
| @codePoint | OD default=0 | defines what CodePoint value is used for this payload. This is the value of the CP field in the LCT header. |
| @deliveryObjectFormat | M | specifies the payload format of the delivery object. For details see below. |
| @realtime | OD | if not present it is false. If present and set to true, LCT packets contain extension headers including NTP timestamps that express the presentation time of the included delivery object. |
| @isobmff | OD default=0 | expresses if the delivery objects are ISO BMFF structures and if specific fragmentation is applied<br>0: arbitrary data<br>1: delivery object is a sequence of complete ISO BMFF boxes<br>2: each delivery object is a DASH object, i.e. a segment or any other object that is referenced in the MPD.<br>3: delivery object is a is a sequence of complete ISO BMFF boxes fragmented according to the rules in MMT MPU mode |
| @packetheadersize | OD default=1 | The size the route packet header in multiple of 4 octets. The value space shall 0, 1 or 2. If set to 0, the ROUTE packet is of zero size and the packet itself contains an entire delivery object. |
| EFID | 0..1 | provides details of the file delivered data. This is the extended FDT instance descriptor. Either embedded or as reference. |
| ApplicationIdentifier | 0..1 | may provide additional information that can be mapped to the application that is carried in this transport session, e.g. Representation ID of a DASH content. |
| RepairFlow | 0..N | Reference a repair flow. This may be added directly or referenced as a separate fragment |

Legend:

For attributes: M=Mandatory, O=Optional, OD=Optional with Default Value, CM=Conditionally Mandatory.

For elements: <minOccurs>...<maxOccurs> (N=unbounded)

Note that the conditions only holds without using xlink:href. If linking is used, then all attributes are "optional" and <minOccurs=0>

Elements are bold; attributes are non-bold and preceded with an @.

FIG. 89

| Element or Attribute Name | Use | Description |
|---|---|---|
| Service | 1..N | specifies the service |
| @id | M | service identifier |
| @serviceType | M | service type |
| @serviceName | O | service name |
| @channelNumber | M | channel number associated with this service |
| TimebaseLocation | 0..N | The location where a time base, a metadata to establish a time time for synchronizing the components of this service, can be acquired |
| @deliveryMode | M | delivery mode of this time base |
| BootstrapInfo | 1..N | Bootstrap information of this time base according to the delivery mode |
| MPD | 0..1 | DASH media presentation description (MPD) associated with this service |
| SignalingLocation | 0..N | The location where MPD or MPD URL related signaling can be acquired |
| @deliveryMode | M | The delivery mode of this MPD location signaling |
| BootstrapInfo | 1..N | Bootstrap information of MPD or MPD URL according to the delivery mode |

Legend:

For attributes: M=Mandatory, O=Optional, OD=Optional with Default Value, CM=Conditionally Mandatory.
For elements: <minOccurs>..<maxOccurs> (N=unbounded)
Note that the conditions only holds without using xlink:href. If linking is used, then all attributes are "optional" and < minOccurs=0>

Elements are bold; attributes are non-bold and preceded with an @.

FIG. 90

| Element or Attribute Name | Use | Description |
|---|---|---|
| FDT-Instance | | specifies the static File Delivery Descriptor |
| @id | M | specifies the identifier of the FDT instance |
| @version | O | Version information of this FDT instance |
| @Expires | M | expiry time of the FDT instance. |
| @Complete | O | when TRUE, signals that no new data will be provided in future FDT Instances within this session (i.e., that either FDT Instances with higher ID numbers will not be used or if they are used, will only provide identical file parameters to those already given in this and previous FDT Instances) |
| File | 1..N | |
| @Content-Location | M | Can be assigned a valid URI |
| @TOI | M | MUST be assigned a valid TOI value |
| @Content-Length | O | The actual length of this file content |
| @Transfer-Length | O | The transfer length of this file content |
| @Content-Encoding | O | The encoding of this file content |
| @Content-Type | O | The type of this file content |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "option al" and <minOccurs=0>

Elements are bold; attributes are non-bold and preceded with an @.

FIG. 91

| Syntax | No. of Bits | Format |
|---|---|---|
| Service_Mapping_Table { | | |
|     signaling_id | 8 | TBD |
|     signaling_length | 16 | |
|     protocol_version | 8 | |
|     broadcast_id | 16 | |
|     version_number | 8 | |
|     IP_version_flag | 1 | |
|     signaling_data_type | 7 | |
|     expiration | 8 | |
|     fragment_number | 8 | |
|     last_fragment_number | 8 | |
|     num_services | 8 | |
|     for(i=0;i<num_services;i++){ | | |
|         service_id | 16 | |
|         service_name_length | 8 | |
|         service_name | 8*N | |
|         channel_number | 8 | |
|         service_category | 8 | |
|         service_status | 2 | |
|         sp_indicator | 1 | |
|         reserved | 1 | |
|         num_route_sessions | 4 | |
|         for(j=0;j<num_route_sessions;j++){ | | |
|             source_ip | 32 or 128 | |
|             destination_ip | 32 or 128 | |
|             port | 16 | |
|             num_lsid_tsi | 8 | |
|             for(k=0;k<num_lsid_tsi;k++){ | | |
|                 lsid_delivery_tsi | 16 | |
|             } | | |
|         } | | |
|     } | | |
| } | | |

FIG. 92

```xml
<?xml version = "1.0" encoding = "UTF-8"?>
<schema
    xmlns = "http://www.w3.org/2001/XMLSchema"
    elementFormDefault = "qualified"
    version = "1.0">
    <!-- GLOBAL ELEMENTS -->
    <element name = "SMT" type = "SmtType" />
    <!-- TYPE DEFINITIONS -->
    <complexType name = "SmtType">
        <sequence>
            <element name = "Service" type = "ServiceType" maxOccurs = "unbounded" />
        </sequence>
    </complexType>

<complexType name = "ServiceType">
        <sequence>
            <element name = "Name" type = "string" minOccurs = "1" />
            <element name = "Category" type = "string" minOccurs = "1" maxOccurs = "unbounded" />
            <element name = "RouteSessionInfo" type = "RouteSessionInfoType" minOccurs = "1"
                        maxOccurs = "unbounded" />
        </sequence>
        <attribute name = "serviceID" type = "unsignedShort" use = "required" />
        <attribute name = "RFChan" type = "unsignedByte" use = "required" />
        <attribute name = "serviceStatus" type = "unsignedByte" use = "optional" />
        <attribute name = "SPindicator" type = "boolean" use = "optional" default = "false" />
    </complexType>

<complexType name = "RouteSessionInfoType">
        <sequence>
            <element name = "sourceIPAddr" type = "IPAddrType" minOccurs = "1" />
            <element name = "destinationIPAddr" type = "IPAddrType" minOccurs = "1" />
            <element name = "Port" type = "unsignedShort" minOccurs = "1" />
            <element name = "lsid_delivery_tsi" type = "unsignedLong" minOccurs = "0"
                        maxOccurs = "unbounded" default = "0" />
        </sequence>
    </complexType>

<simpleType name = "IPAddrValueType">
        <restriction base = "string" />
    </simpleType>
    <complexType name = "IPAddrType">
        <simpleContent>
            <extension base = "IPAddrValueType">
                <attribute name = "version" type = "unsignedByte" />
            </extension>
        </simpleContent>
    </complexType>
</schema>
```

FIG. 94

| Element or Attribute Name | Use | Description |
|---|---|---|
| Service | 1..N | specifies the service |
| @id | M | service identifier |
| @serviceType | M | service type |
| @serviceName | O | service name |
| @channelNumber | M | channel number associated with this service |
| ROUTESessionInfo | 0..N | |
| @id | M | Identifier of ROUTE session |
| @version | M | Version of ROUTE session |
| @sourceIP | M | Source IP address of ROUTE session for transmitting media component |
| @destinationIP | M | Destination IP address of ROUTE session for transmitting media component |
| @port | M | Destination port number of ROUTE session for transmitting media component |
| @DP_ID | M | ID of DATA pipeline via which ROUTE session is transmitted |
| LSIDInfo | 0..N | |
| TimeBaseLocation | 0..1 | The location where a time base, a metadata to establish a time line for synchronizing the components of this service, can be acquired |
| @deliveryMode | M | The delivery mode of this time base |
| BootstrapInfo | 1 | Bootstrap information of this time base according to the delivery mode |

| Element or Attribute Name | Use | Description |
|---|---|---|
| LSIDInfo | | |
|   @deliveryMode | M | The delivery mode of the LSID |
|   DeliveryInfo | 1 | Bootstrap information of this time base according to the delivery mode |
|   LSID | 0..1 | Actual LSID embedded (only in case of @deliveryMode == embedded) |

Legend:
    For attributes: M=Mandatory, O=Optional, OD=Optional with Default Value, CM=Conditionally Mandatory
    For elements: <minOccurs>...<maxOccurs> (N=unbounded)
    Note that the conditions only holds without using xlink:href. If linking is used, then all attributes are "optional" and <minOccurs=0>
Elements are bold; attributes are non-bold and proceeded with an @

L95020

| Element or Attribute Name | Use | Description |
|---|---|---|
| DeliveryInfo | | |
|   @ROUTE_session_id | O | If this value is 0, this indicates the LSID transmitted via the session such as high-level ROUTE session |
|   @sourceIP | O | the source address of the IP datagrams carrying associated data |
|   @destinationIP | O | the destination address of the IP datagrams carrying associated data |
|   @destinationPort | O | the destination port number of the IP datagrams carrying associated data |
|   @tsi | O | the transport session identifier of session-based transport packets carrying associated data |
|   @URL | O | URL where associated data can be acquired |
|   @DP_ID | O | The Data pipeline ID of the physical layer carrying the associated data |

Legend:
    For attributes: M=Mandatory, O=Optional, OD=Optional with Default Value, CM=Conditionally Mandatory
    For elements: <minOccurs>...<maxOccurs> (N=unbounded)
    Note that the conditions only holds without using xlink:href. If linking is used, then all attributes are "optional" and <minOccurs=0>
Elements are bold; attributes are non-bold and proceeded with an @

FIG. 96

| Element or Attribute Name | Use | Description |
|---|---|---|
| Service | 1..N | specifies the service |
| @id | M | service identifier |
| @serviceType | M | service type |
| @serviceName | O | service name |
| @channelNumber | M | channel number associated with this service |
| ROUTESessionInfo | 0..N | |
| @id | M | Identifier of route SESSION |
| @version | M | Version of ROUTE session |
| @sourceIP | M | Source IP address of ROUTE session for transmitting media component |
| @destinationIP | M | Destination IP address of ROUTE session for transmitting media component |
| @port | M | Destination port number of ROUTE session for transmitting media component |
| LSIDInfo | 0..N | |
| TimebaseLocation | 0..1 | The location where a time base, a metadata to establish a time line for synchronizing the components of this service, can be acquired |
| @deliveryMode | M | The delivery mode of this time base |
| BootstrapInfo | 1 | Bootstrap information of this time base according to the delivery mode |

FIG. 97

| Element or Attribute Name | Use | Description |
|---|---|---|
| LSID | | LCT Session Instance Description |
| @version | O | Version of this LCT Session Instance Description. The version is increased by one when the descriptor is updated. The received LSID with highest version number is the currently valid version |
| @validFrom | O | The date and time from which the LSID is valid. The validFrom attribute may or may not be present. If not present, the receiver should assume the LSID version is valid immediately |
| @expiration | O | The date and time when the LSID expires. The expiration attribute may or may not be present. If not present the receiver should assume the LSID is valid for all time, or until it receives a newer LSID with an associated expiration value |
| TransportSession | 1..N | Provides information about LCT transport sessions |
| @tsi | M | Specifies the transport session identifier. The session identifiers must not be 0 |
| @DP_ID | M | DP_ID via which transport session is transmitted |
| SourceFlow | 0..1 | Provides information of a source flow carried on this tsi |
| RepairFlow | 0..1 | Provides information of a repair flow carried on the tsi. For more details refer to Section 7 |

Legend:
For attributes: M=Mandatory; O=Optional, OD=Optional with Default Value, CM=Conditionally Mandatory.
For elements: <minOccurs>...<maxOccurs> (N=unbounded)
Note that the conditions only holds without using xlink:href. If linking is used, then all attributes are "optional" and <minOccurs=0>
Elements are bold; attributes are non-bold and preceded with an @

METHOD FOR TRANSMITTING BROADCAST SIGNALS, APPARATUS FOR TRANSMITTING BROADCAST SIGNALS, METHOD FOR RECEIVING BROADCAST SIGNALS AND APPARATUS FOR RECEIVING BROADCAST SIGNALS

CROSS REFERENCE TO RELATED APPLICATIONS

This application is the National Phase of PCT International Application No. PCT/KR2015/008773, filed on Aug. 21, 2015, which claims priority under 35 U.S.C. 119(e) to U.S. Provisional Application No. 62/040,419, filed on Aug. 22, 2014, all of which are hereby expressly incorporated by reference into the present application.

TECHNICAL FIELD

The present invention relates to a method and apparatus for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and may further include various types of additional data.

DISCLOSURE

Technical Problem

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

The object of the present invention can be achieved by providing a method for transmitting a broadcast signal including encoding a broadcast service and signaling information of the broadcast service, generating the broadcast signal including the encoded broadcast service and signaling information, and transmitting the generated broadcast signal.

The signaling information may include service identification information for identifying the broadcast service, information indicating the name of the broadcast service and/or information indicating whether the broadcast service is active or inactive.

The signaling information may include information for identifying information on a transport session for transmitting the broadcast service.

The signaling information may include information indicating a channel number of the broadcast service.

The signaling information may include information indicating whether the format of the signaling information is binary or extensible markup language (XML).

The signaling information may include information on a transport session for transmitting the broadcast service, and the information on the transport session may include source IP address information of the transport session, destination IP address information of the transport session and/or destination port number information of the transport session.

In another aspect of the present invention, provided herein is a method for receiving a broadcast signal including receiving a broadcast signal including a broadcast service and signaling information of the broadcast service, parsing the broadcast service and signaling information from the received broadcast signal, and decoding the parsed broadcast service and signaling information.

The signaling information may include service identification information for identifying the broadcast service, information indicating the name of the broadcast service and/or information indicating whether the broadcast service is active or inactive.

The signaling information may include information for identifying information on a transport session for transmitting the broadcast service.

The signaling information may include information indicating a channel number of the broadcast service.

The signaling information may include information indicating whether the format of the signaling information is binary or extensible markup language (XML).

The signaling information may include information on a transport session for transmitting the broadcast service, and the information on the transport session may include source IP address information of the transport session, destination IP address information of the transport session and/or destination port number information of the transport session.

In another aspect of the present invention, provided herein is an apparatus for transmitting a broadcast signal including an encoder configured to encode a broadcast service and signaling information of the broadcast service, a broadcast signal generator configured to generate the broadcast signal including the encoded broadcast service and signaling information, and a transmitter configured to transmit the generated broadcast signal.

The signaling information may include service identification information for identifying the broadcast service, information indicating the name of the broadcast service and/or information indicating whether the broadcast service is active or inactive.

In another aspect of the present invention, provided herein is an apparatus for receiving a broadcast signal including a receiver configured to receive a broadcast signal including a broadcast service and signaling information of the broadcast service, a parser configured to parse the broadcast service and signaling information from the received broadcast signal, and a decoder configured to decode the parsed broadcast service and signaling information.

Advantageous Effects

An embodiment of the present invention provides a broadcast service by controlling QoS (Quality of Service) of each service or service component and by processing data according to features of each service.

An embodiment of the present invention provides a transmission flexibility by transmitting various broadcast services through the same RF (radio frequency) signal bandwidth.

An embodiment of the present invention enhances Robustness of a broadcast signal and an efficiency of a data transmission by using MIMO (Multiple Input Multiple Output) system.

An embodiment of the present invention provides a broadcast transmission apparatus, an operation method of the broadcast transmission apparatus, a broadcast reception apparatus, and an operation method of the broadcast reception apparatus that are capable of acquiring digital broadcast signals without errors although we are using mobile receiving apparatus or we are in door.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates a frame structure according to an embodiment of the present invention.

FIG. 10 illustrates a signaling hierarchy structure of the frame according to an embodiment of the present invention.

FIG. 11 illustrates preamble signaling data according to an embodiment of the present invention.

FIG. 12 illustrates PLS1 data according to an embodiment of the present invention.

FIG. 13 illustrates PLS2 data according to an embodiment of the present invention.

FIG. 20 illustrates a time interleaving according to an embodiment of the present invention.

FIG. 27 illustrates operation of a reset mode in signaling for single-memory deinterleaving irrespective of the number of symbols in a frame according to an embodiment of the present invention.

FIG. 28 illustrates equations indicating input and output of the frequency interleaver in signaling for single-memory deinterleaving irrespective of the number of symbols in a frame according to an embodiment of the present invention.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

FIG. 37 shows equations representing block interleaving according to an embodiment of the present invention.

FIG. 39 shows equations representing reading operation after insertion of virtual FEC blocks according to an embodiment of the present invention.

FIG. 41 shows equations representing a process of determining a shift value and a maximum TI block size according to an embodiment of the present invention.

FIG. 42 illustrates writing operation according to an embodiment of the present invention.

FIG. 43 illustrates reading operation according to an embodiment of the present invention.

FIG. 44 illustrates a result of skip operation in reading operation according to an embodiment of the present invention.

FIG. 45 shows a writing process of time deinterleaving according to an embodiment of the present invention.

FIG. 46 illustrates a writing process of time deinterleaving according to another embodiment of the present invention.

FIG. 47 shows equations representing reading operation of time deinterleaving according to another embodiment of the present invention.

FIG. 61 is a diagram showing the configuration of a service signaling message according to one embodiment of the present invention.

FIG. 62 is a diagram showing the configuration of a broadcast service signaling message in a next generation broadcast system according to one embodiment of the present invention.

FIG. 63 is a diagram showing the meaning of the value of a timebase_transport_mode field and a signaling_transport_mode field in a service signaling message according to one embodiment of the present invention.

FIGS. 64 to 70 are diagrams showing the syntax of a bootstrap( ) field according to the values of the timebase_transport_mode field and the signaling_transport_mode field in one embodiment of the present invention.

FIG. 71 is a diagram showing a process of acquiring a timebase and a service signaling message in the embodiments of FIGS. 62 to 70.

FIG. 72 is a diagram showing the configuration of a broadcast service signaling message in a next generation broadcast system according to one embodiment of the present invention.

FIG. 73 is a diagram showing the configuration of a broadcast service signaling message in a next generation broadcast system according to one embodiment of the present invention.

FIG. 74 is a diagram showing the meaning of the value of each transport mode described in FIG. 73.

FIG. 75 is a diagram showing the configuration of a signaling message for signaling a component data acquisition path of a broadcast service in a next generation broadcast system.

FIG. 76 is a diagram showing the syntax of an app_delevery_info( ) field according to one embodiment of the present invention.

FIG. 77 is a diagram showing the syntax of an app_delevery_info( ) field according to another embodiment of the present invention.

FIG. 78 is a diagram showing component location signaling including path information capable of acquiring one or more component data configuring a broadcast service.

FIG. 80 is a diagram showing other information included in signaling of a broadcast service in a next generation broadcast system in one embodiment of the present invention.

FIG. 81 is a diagram showing a transport mode included in service signaling of a next generation broadcast system according to one embodiment of the present invention.

FIG. 82 is a diagram showing information on a bootstrap included in service signaling of a next generation broadcast system according to one embodiment of the present invention.

FIG. 83 is a diagram showing other information included in signaling for an object flow.

FIG. 84 is a diagram showing a combination of information for representing a file template in one embodiment of the present invention.

FIG. 85 is a diagram showing an object flow included in service signaling according to one embodiment of the present invention.

FIG. 86 is a diagram showing other information included in signaling of a broadcast service in a next generation broadcast system in one embodiment of the present invention.

FIG. 87 is a diagram showing signaling information for transport session information of a session level according to one embodiment of the present invention.

FIG. 88 is a diagram showing signaling information for transport session information of a session level according to another embodiment of the present invention.

FIG. 89 is a diagram showing signaling information of a broadcast service according to another embodiment of the present invention.

FIG. 90 is a diagram showing FDT related information included in signaling information of a broadcast service according to another embodiment of the present invention.

FIG. 91 is a diagram showing the configuration of the binary format of a Service_Mapping_Table according to one embodiment of the present invention.

FIG. 92 is a diagram showing the configuration of the XML format of a Service_Mapping_Table according to one embodiment of the present invention.

FIG. 94 is a diagram showing the configuration of service signaling according to one embodiment of the present invention.

FIG. 95 is a diagram showing the configuration of LSID-Info information and DeliveryInfo information according to one embodiment of the present invention.

FIG. 96 is a diagram showing the configuration of service signaling according to another embodiment of the present invention.

FIG. 97 is a diagram showing the configuration of an LSID according to one embodiment of the present invention.

BEST MODE

Figure 1:
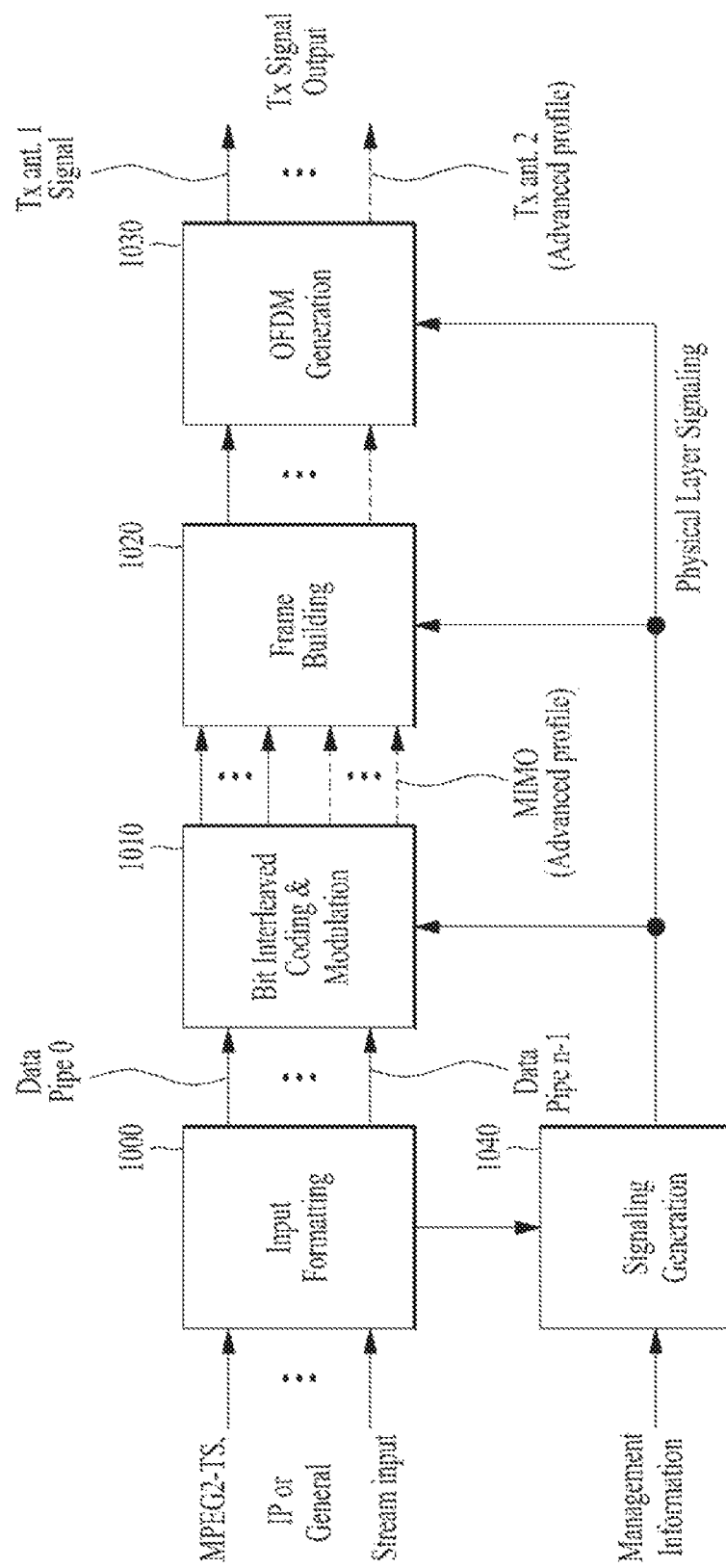
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

'Signaling' in this specification indicates transmitting service information provided in a broadcast system.

'Broadcast signal' in this specification indicates signals and data that are provided in terrestrial, cable, satellite, mobile, internet, broadband, communication, data and/or VOD broadcast.

'PLP' in this specification indicates a kind of unit transmitting data belong to physical layers. And, it may be called 'data unit' or 'data pipe'.

Various contents may be provided by transmitting A/V contents and relevant enhanced data through a terrestrial channel and/or internet channel in real time.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤219 data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |

TABLE 2-continued

| | |
|---|---|
| Time de-interleaving memory size | ≤218 data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤219 data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
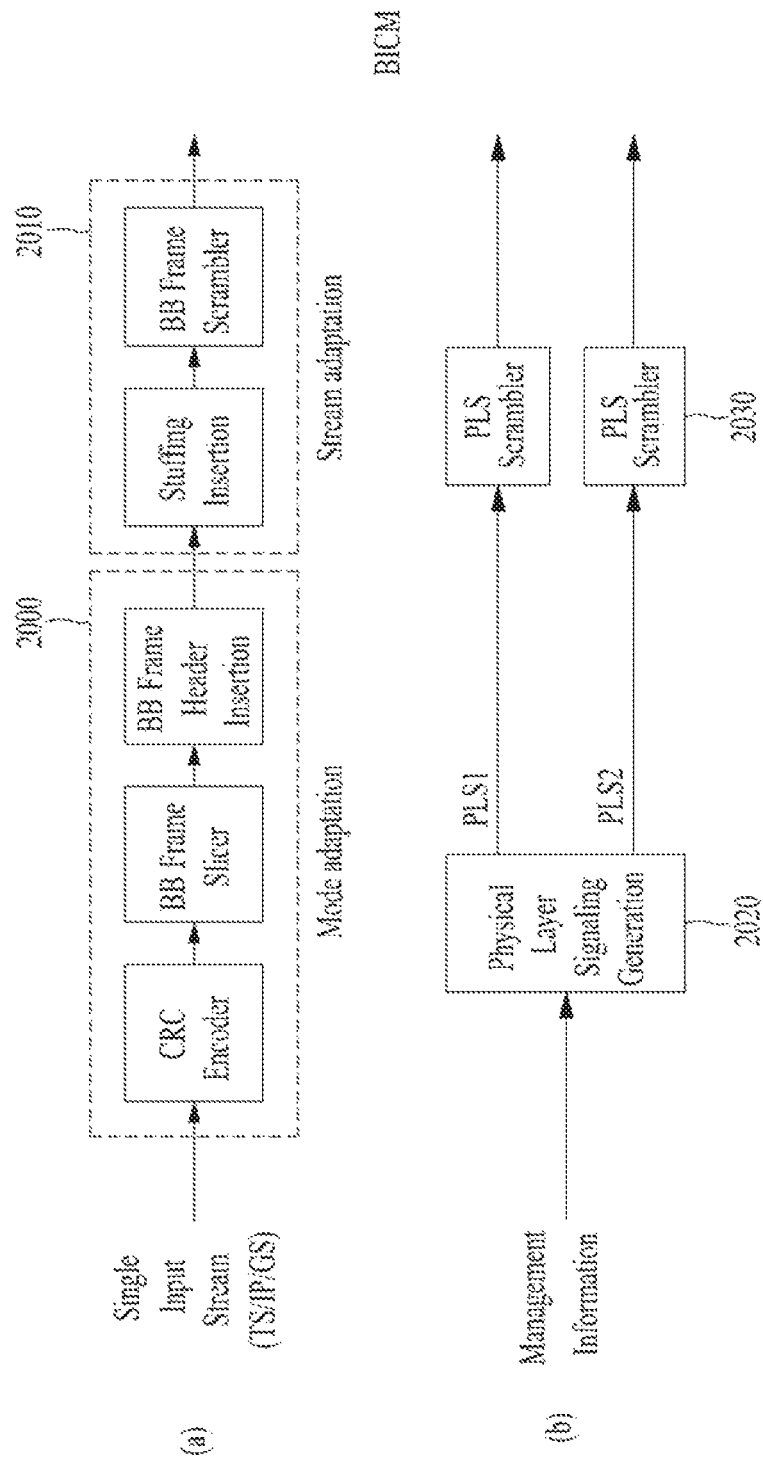
FIG. 2 illustrates an input formatting block according to one embodiment of the present invention.
Figure 3:
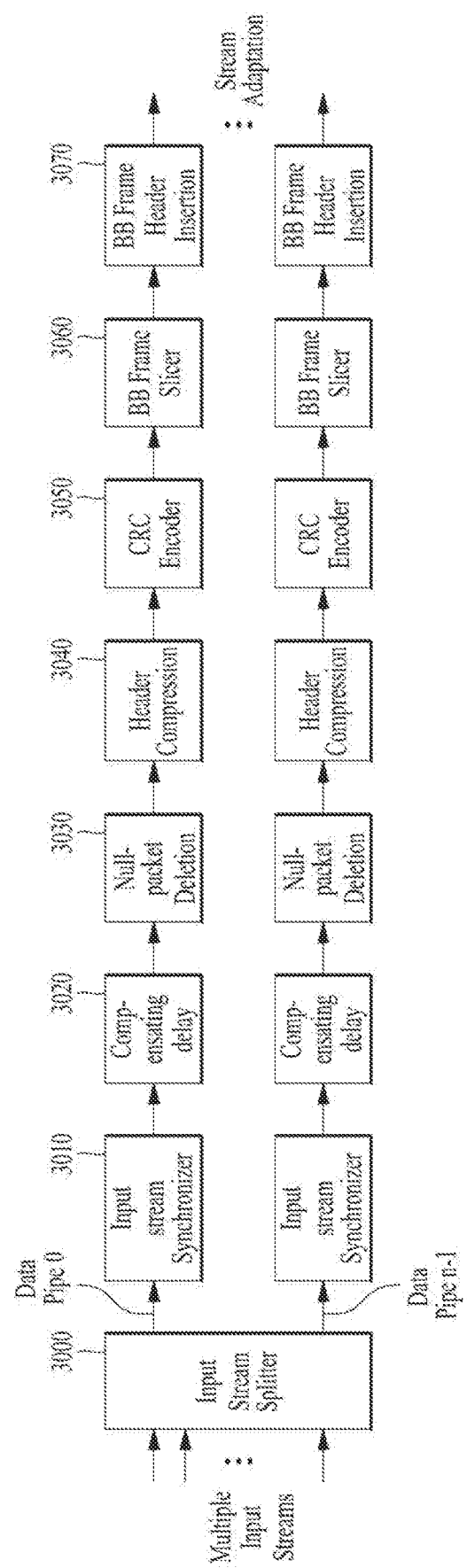
FIG. 3 illustrates an input formatting block according to another embodiment of the present invention.
Figure 4:
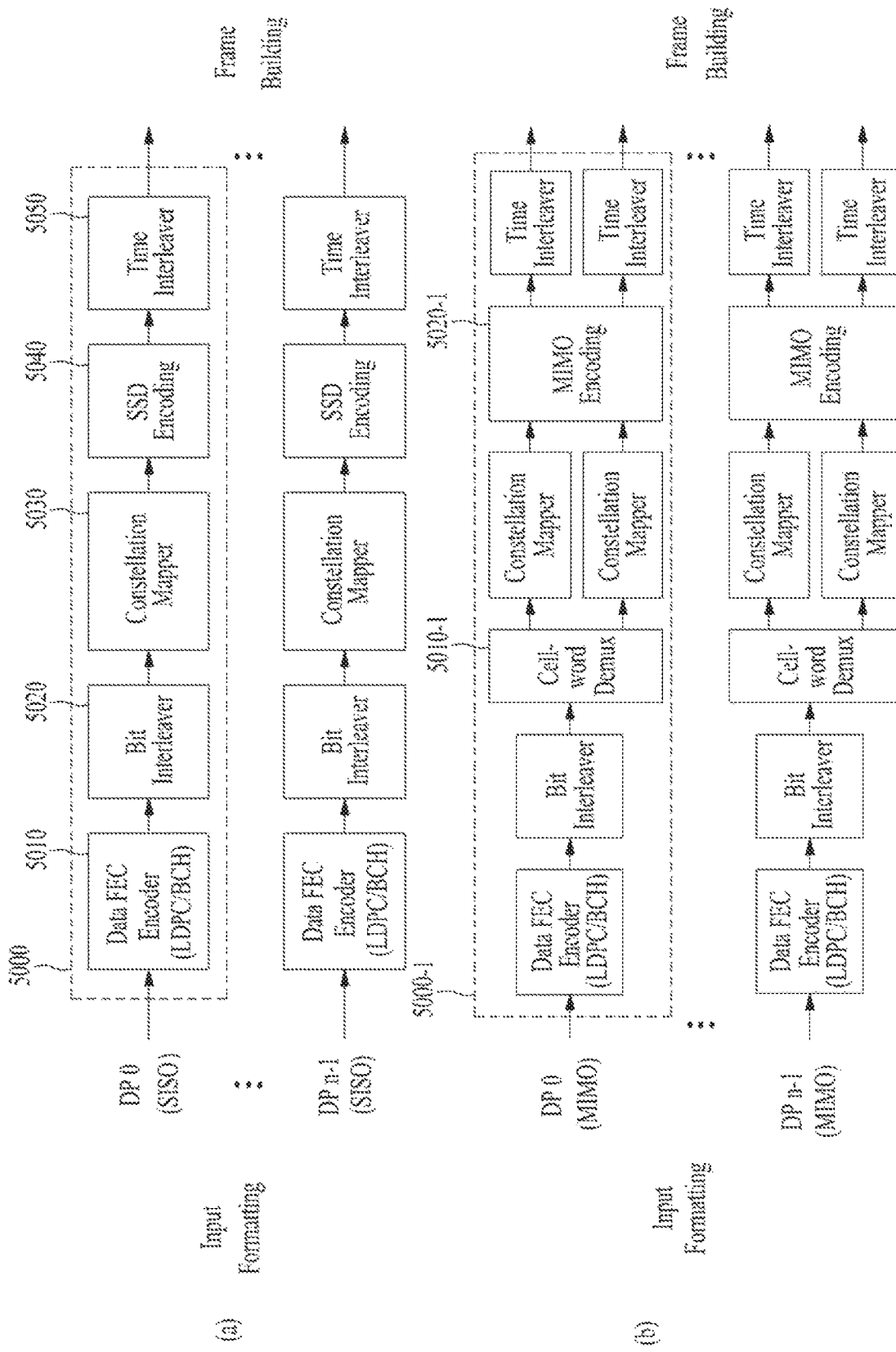
FIG. 4 illustrates a BICM block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

Figure 5:
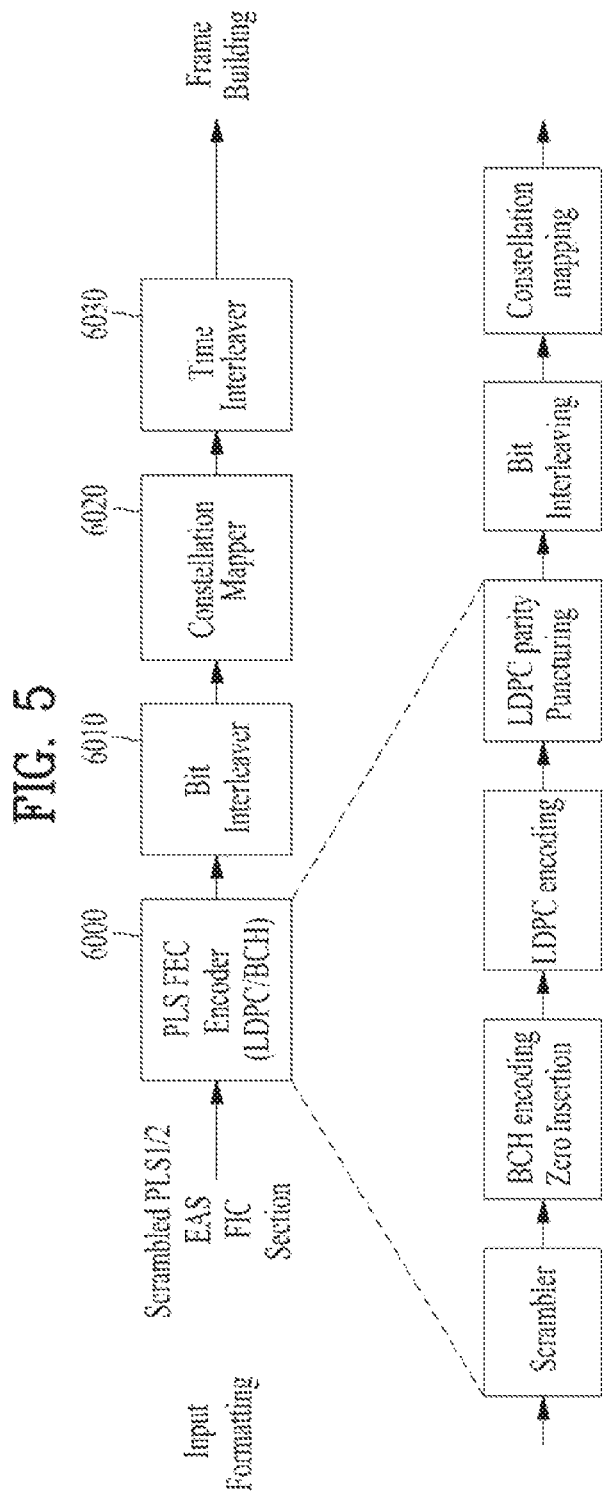
FIG. 5 illustrates a BICM block according to another embodiment of the present invention.

FIG. 5 illustrates a BICM block according to another embodiment of the present invention.

The BICM block illustrated in FIG. 6 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Figure 6:
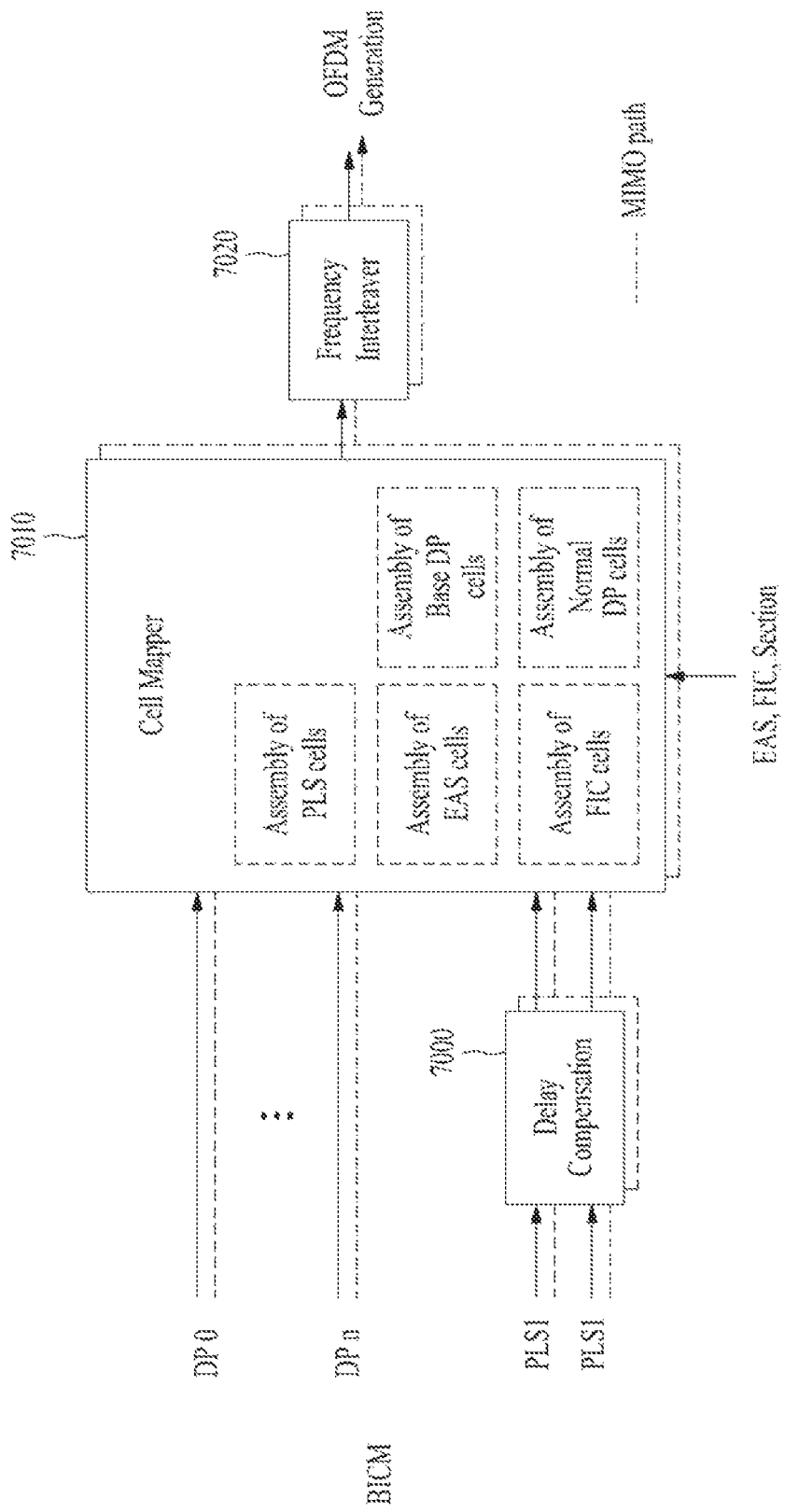
FIG. 6 illustrates a frame building block according to one embodiment of the present invention.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC code parameters for PLS1 and PLS2 are as following table 4.

TABLE 4

| Signaling Type | Ksig | Kbch | Nbch_parity | Kldpc (=Nbch) | Nldpc | Nldpc_parity | code rate | Qldpc |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
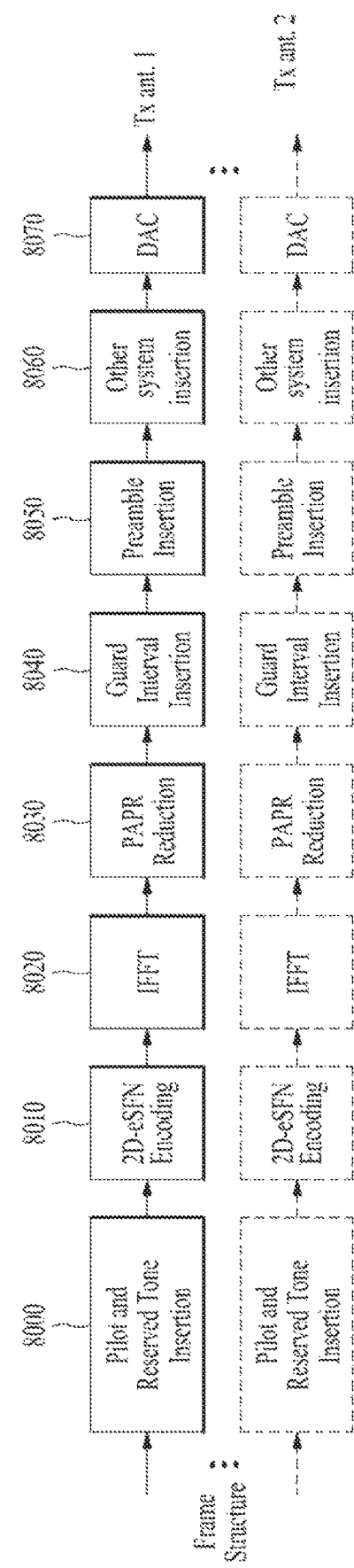
FIG. 7 illustrates an OFDM generation block according to an embodiment of the present invention.

FIG. 7 illustrates an OFDM generation block according to an embodiment of the present invention.

The OFDM generation block illustrated in FIG. 7 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 8:
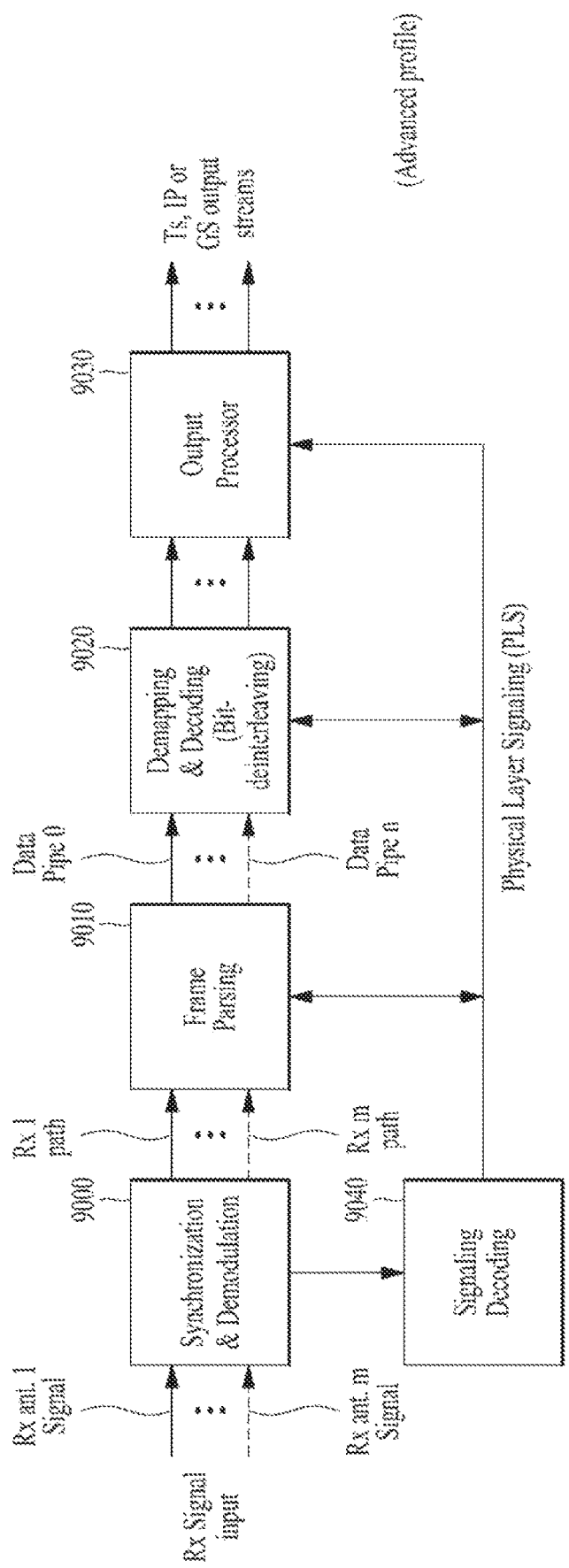
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Future-cast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

|  | Current PHY_PROFILE = '000' (base) | Current PHY_PROFILE = '001' (handheld) | Current PHY_PROFILE = '010' (advanced) | Current PHY_PROFILE = '111' (FEF) |
| --- | --- | --- | --- | --- |
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
| --- | --- |
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2 MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotalpartial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of the current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |

TABLE 16-continued

| Value | Modulation |
|---|---|
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | PI | NTI |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (DUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |

TABLE 23-continued

| Value | Null-packet deletion mode |
|---|---|
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC-MODE_TS 4 |

HC_MODE JP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
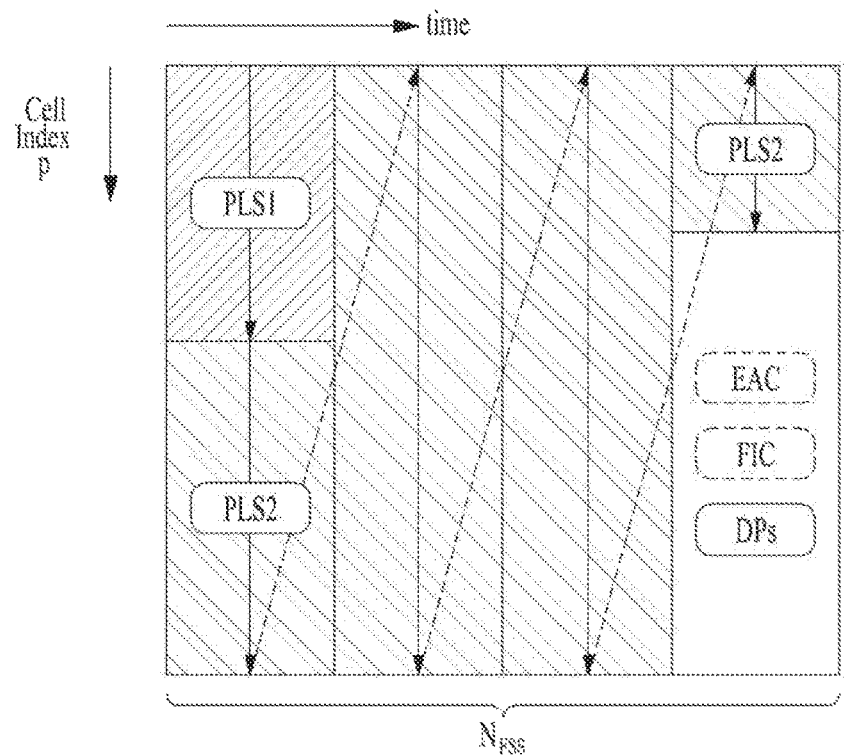
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
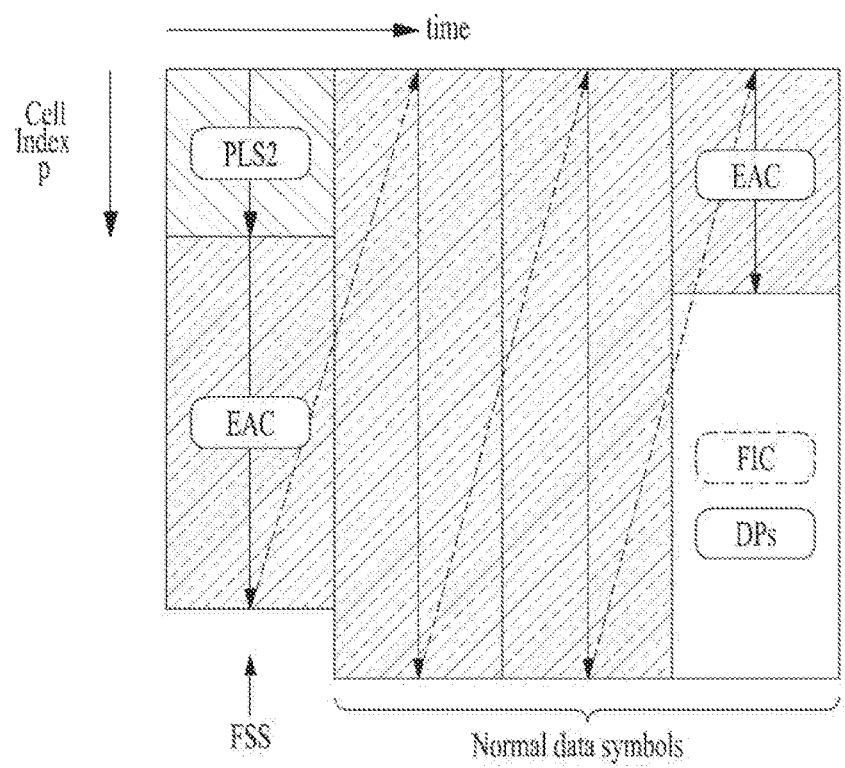
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 18:
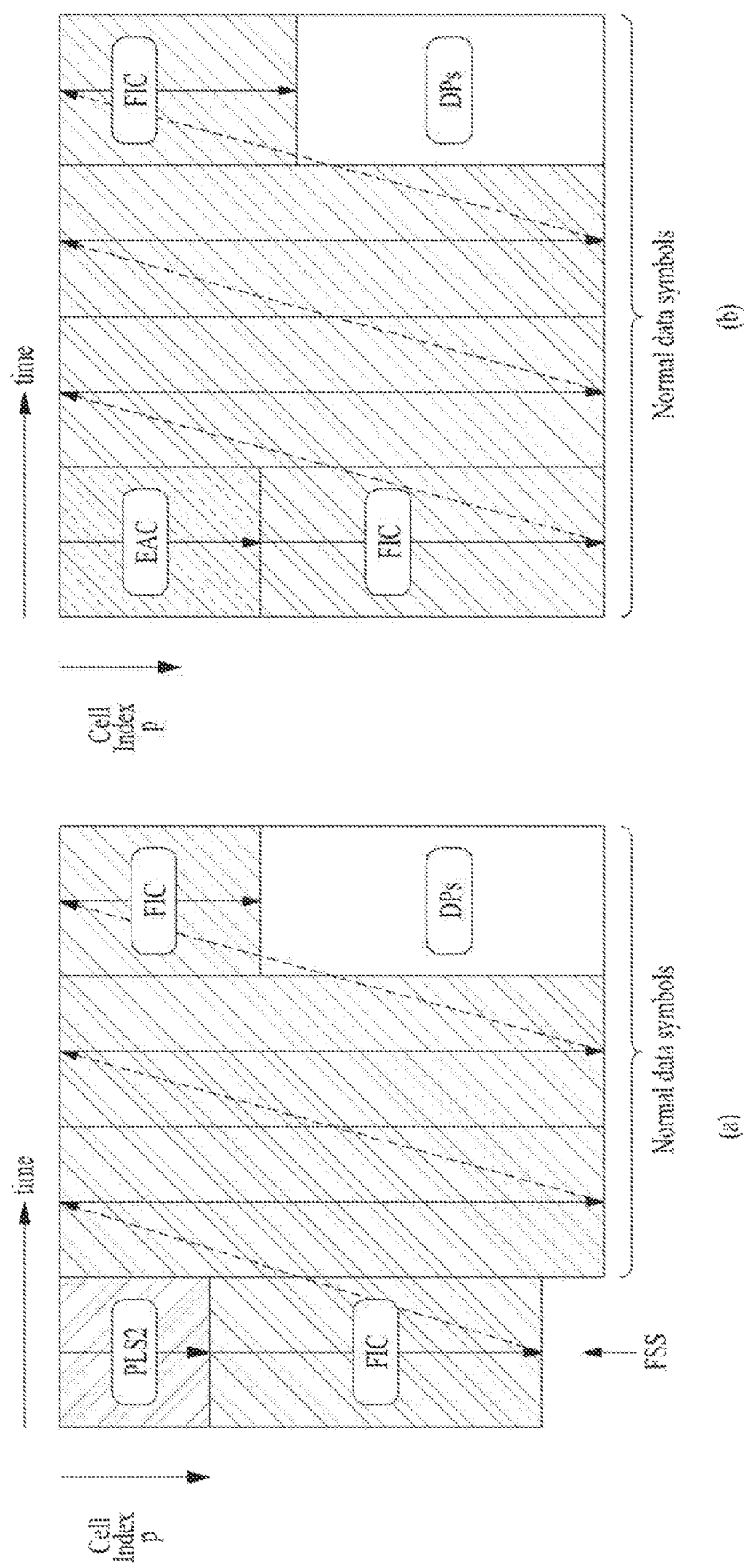
FIG. 18 illustrates FIC mapping according to an embodiment of the present invention.

FIG. 18 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
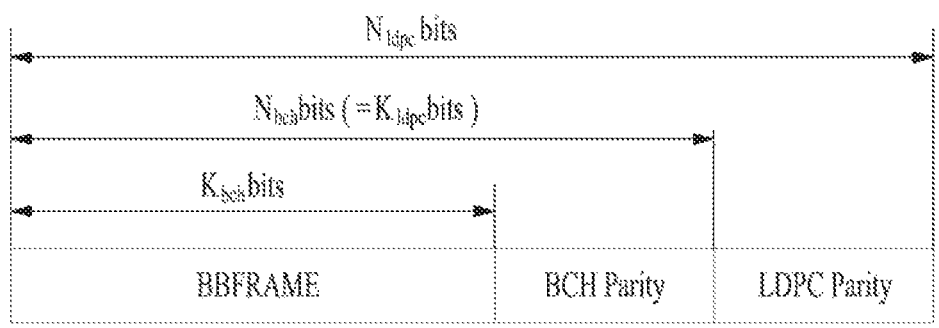
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

Figure 22:
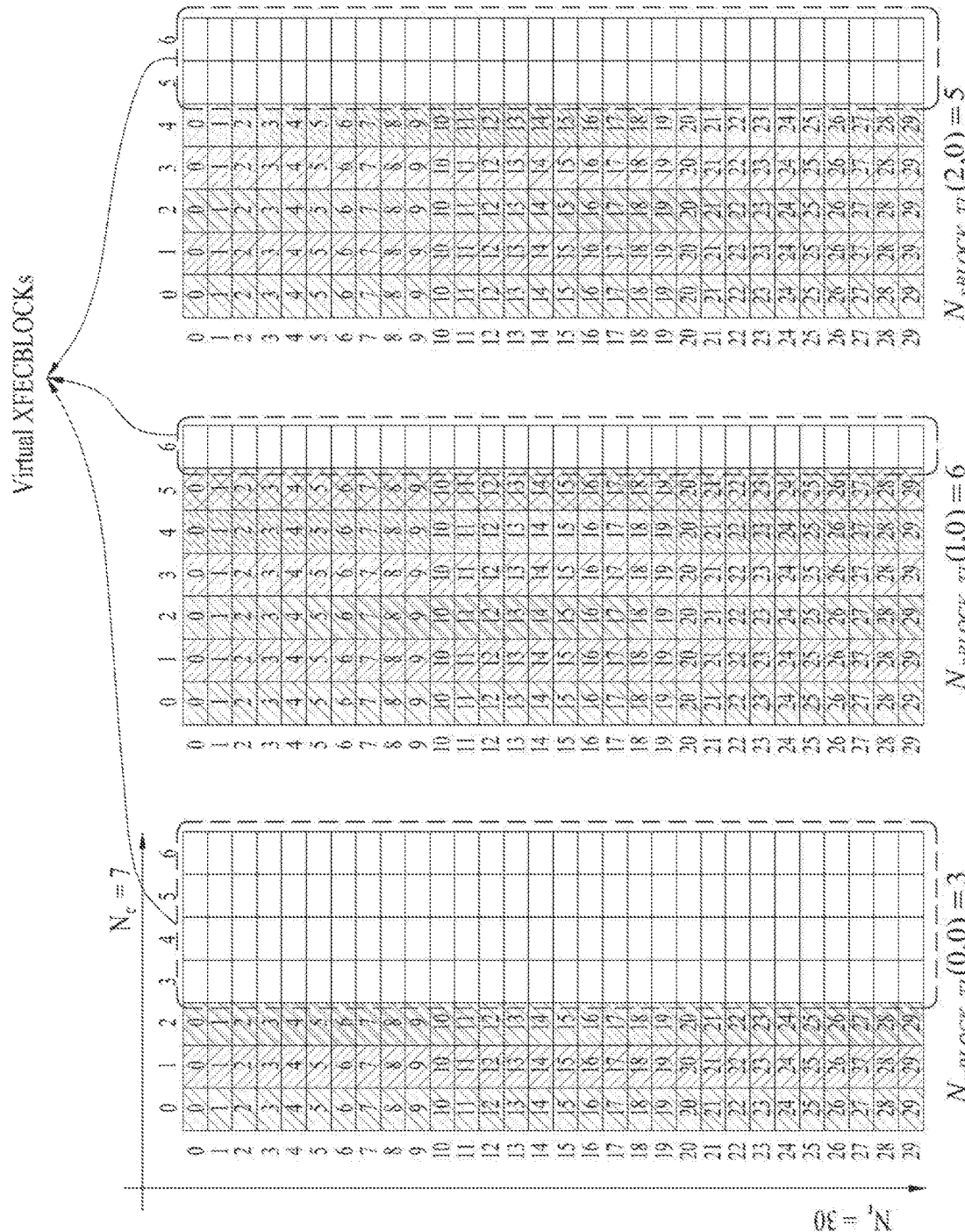
FIG. 22 illustrates an operation of a twisted row-column block interleaver according to another embodiment of the present invention.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | Nldpc | Kldpc | Kbch | BCH error correction capability | Nbch-Kbch |
|---|---|---|---|---|---|
| 5/15 | 64800 | 21600 | 21408 | 12 | 192 |
| 6/15 |  | 25920 | 25728 |  |  |
| 7/15 |  | 30240 | 30048 |  |  |
| 8/15 |  | 34560 | 34368 |  |  |
| 9/15 |  | 38880 | 38688 |  |  |
| 10/15 |  | 43200 | 43008 |  |  |
| 11/15 |  | 47520 | 47328 |  |  |
| 12/15 |  | 51840 | 51648 |  |  |
| 13/15 |  | 56160 | 55968 |  |  |

TABLE 29

| LDPC Rate | Nldpc | Kldpc | Kbch | BCH error correction capability | Nbch-Kbch |
|---|---|---|---|---|---|
| 5/15 | 16200 | 5400 | 5232 | 12 | 168 |
| 6/15 |  | 6480 | 6312 |  |  |
| 7/15 |  | 7560 | 7392 |  |  |
| 8/15 |  | 8640 | 8472 |  |  |
| 9/15 |  | 9720 | 9552 |  |  |
| 10/15 |  | 10800 | 10632 |  |  |
| 11/15 |  | 11880 | 11712 |  |  |
| 12/15 |  | 12960 | 12792 |  |  |
| 13/15 |  | 14040 | 13872 |  |  |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Equation 2]}$$

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=\ldots=p_{N_{ldpc}-K_{ldpc}-1}=0 \quad \text{[Equation 3]}$$

2) Accumulate the first information bit—i0, at parity bit addresses specified in the first row of an addresses of parity check matrix. The details of addresses of parity check matrix will be described later. For example, for rate 13/15:

$$p_{983}=p_{983} \oplus i_0 \, p_{2815}=p_{2815} \oplus i_0$$

$$p_{4837}=p_{4837} \oplus i_0 \, p_{4989}=p_{4989} \oplus i_0$$

$$p_{6138}=p_{6138} \oplus i_0 \, p_{6458}=p_{6458} \oplus i_0$$

$$p_{6921}=p_{6921} \oplus i_0 \, p_{6974}=p_{6974} \oplus i_0$$

$$p_{7572}=p_{7572} \oplus i_0 \, p_{8260}=p_{8260} \oplus i_0$$

$$p_{8496}=p_{8496} \oplus i_0 \qquad \text{[Equation 4]}$$

3) For the next 359 information bits, is, s=1, 2, . . . , 359 accumulate is at parity bit addresses using following equation.

$$\{x+(s \bmod 360) \times Q_{ldpc}\} \bmod(N_{ldpc}-K_{ldpc}) \qquad \text{[Equation 5]}$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007}=p_{1007} \oplus i_1 \, p_{2839}=p_{2839} \oplus i_1$$

$$p_{4861}=p_{4861} \oplus i_1 \, p_{5013}=p_{5013} \oplus i_1$$

$$p_{6162}=p_{6162} \oplus i_1 \, p_{6482}=p_{6482} \oplus i_1$$

$$p_{6945}=p_{6945} \oplus i_1 \, p_{6998}=p_{6998} \oplus i_1$$

$$p_{7596}=p_{7596} \oplus i_1 \, p_{8284}=p_{8284} \oplus i_1$$

$$p_{8520}=p_{8520} \oplus i_1 \qquad \text{[Equation 6]}$$

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1,2, \ldots, N_{ldpc}-K_{ldpc}-1 \qquad \text{[Equation 7]}$$

where final content of pi, i=0, 1, . . . Nldpc−Kldpc−1 is equal to the parity bit pi.

TABLE 30

| Code Rate | Qldpc |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with the LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | Qldpc |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames HUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'(NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of $N_{cells}$, i.e., $N_r=N_{cells}$, while the number of columns $N_c$ is equal to the number $N_{xBLOCK\_TI}(n,s)$.

Figure 21:
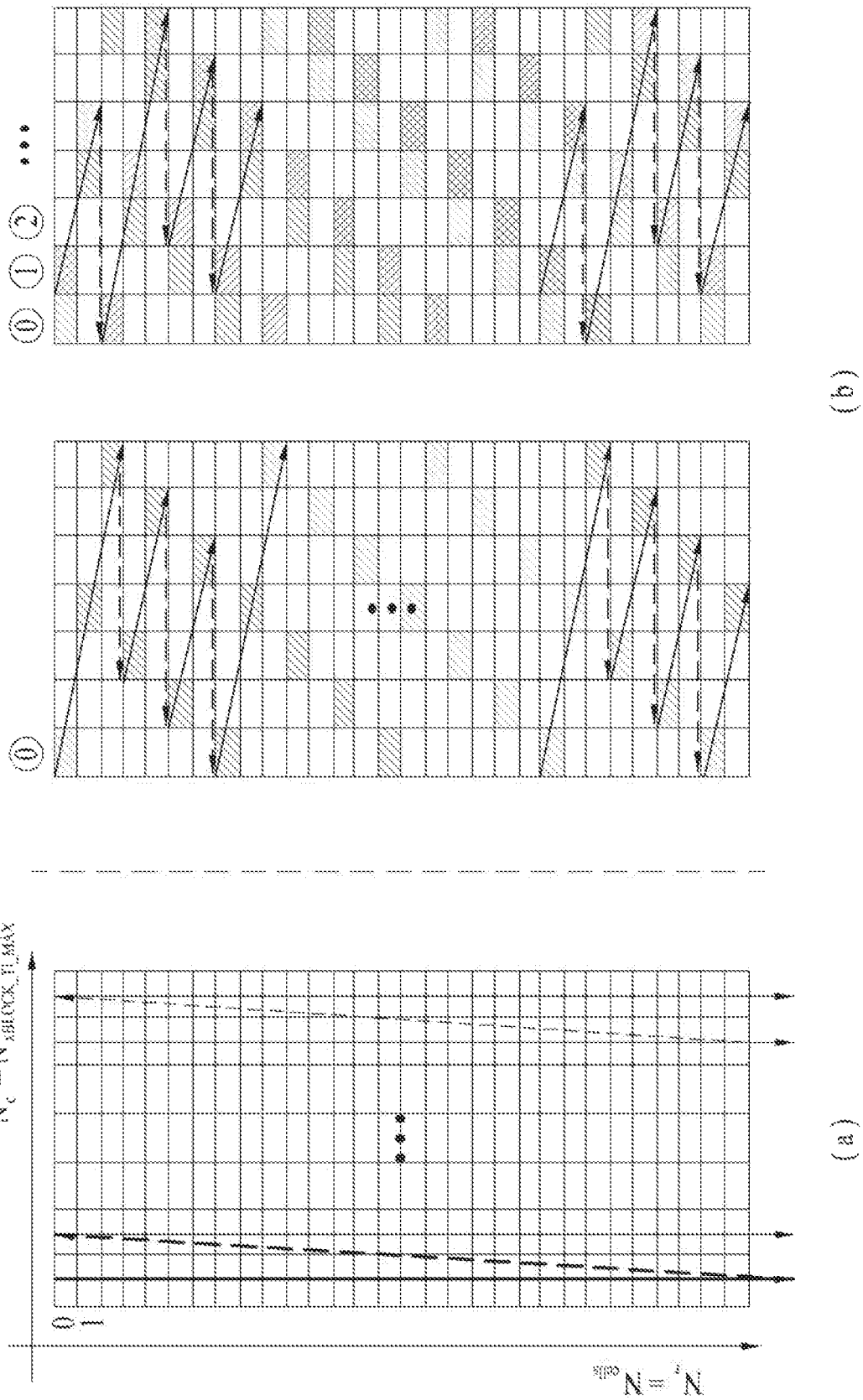
FIG. 21 illustrates the basic operation of a twisted row-column block interleaver according to an embodiment of the present invention.

FIG. 21 illustrates the basic operation of a twisted row-column block interleaver according to an embodiment of the present invention.

FIG. 21 (a) shows a writing operation in the time interleaver and FIG. 21(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}(i=0, \ldots, N_r, N_c)$ as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows equation.

$$\text{GENERATE}(R_{n,s,i}, C_{n,s,i}) = \qquad \text{[Equation 8]}$$

$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows equation.

for [Equation 9]

$$\begin{cases} N'_{xBLOCK\_TI\_MAX} = \\ \quad N_{xBLOCK\_TI\_MAX} + 1, & \text{if } N_{xBLOCK\_TI\_MAX} \mod 2 = 0 \\ N'_{xBLOCK\_TI\_MAX} = \\ \quad N_{xBLOCK\_TI\_MAX}, & \text{if } N_{xBLOCK\_TI\_MAX} \mod 2 = 1 \end{cases},$$

$$S_{shift} = \frac{N'_{xBLOCK\_TI\_MAX} - 1}{2}$$

As a result, the cell positions to be read are calculated by a coordinate as $z_{n,s,i}=N_r C_{n,s,i}+R_{n,s,i}$.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} N'_{xBLOCK\_MAX}$ by inserting the virtual XFEC-BLOCKs into the TI memory and the reading process is accomplished as follow equation.

Equation 10

```
p = 0;
for i = 0;i < N_cells N'_xBLOCK_TI_MAX;i = i + 1
{GENERATE (R_{n,s,i},C_{n,s,i});
V_i = N_r C_{n,s,i} + R_{n,s,i}
    if V_i < N_cells N_xBLOCK_TI(n,s)
    {
        Z_{n,s,p} = V_i; p = p + 1;
    }
}
```

The number of TI groups is set to 3. The option of time interleaver is signaled in the PLS2-STAT data by DP_TI_TYPE='0', DP_FRAME_INTERVAL='1', and DP_TI_LENGTH=, i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX}=6$.

Figure 23:
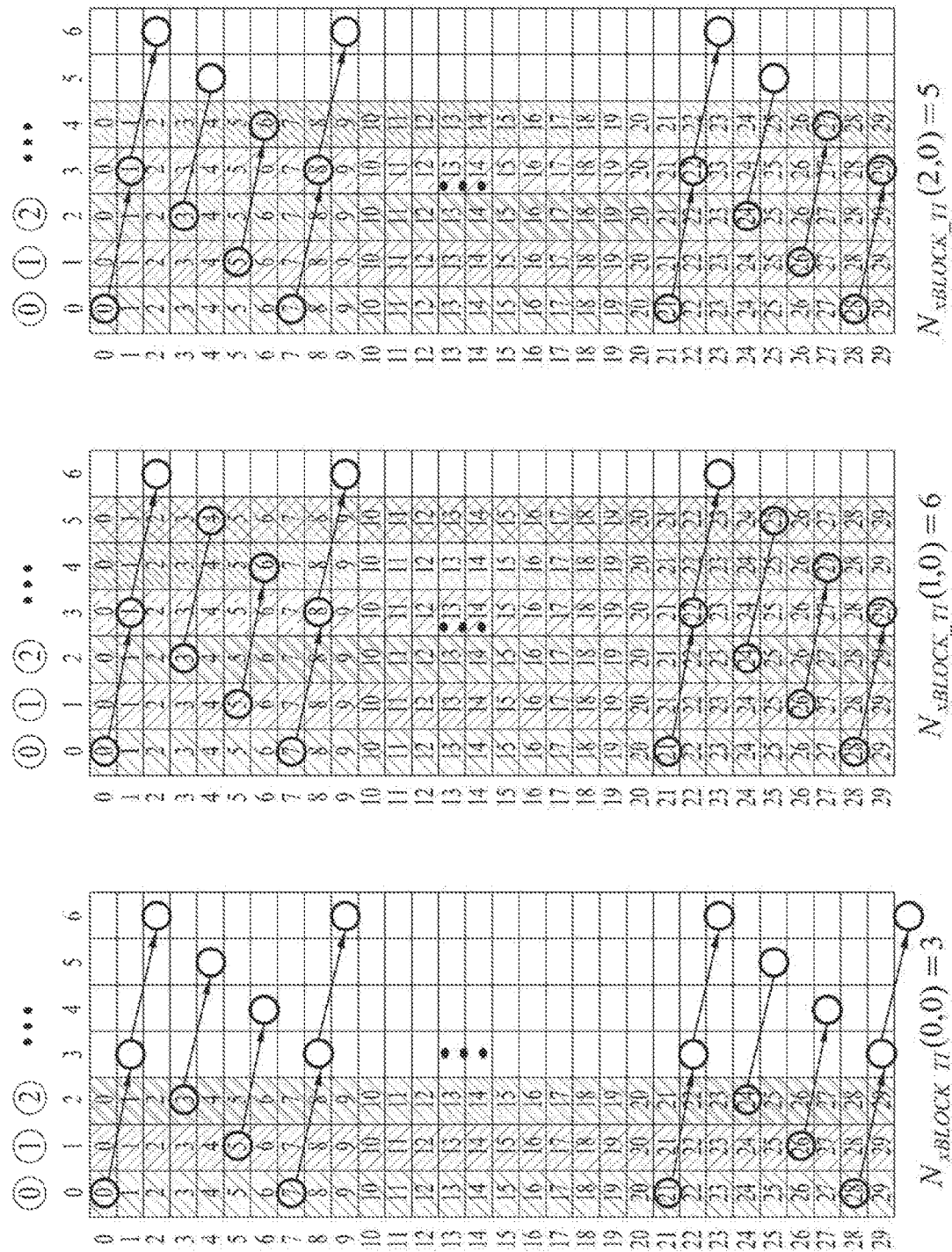
FIG. 23 illustrates a diagonal-wise reading pattern of a twisted row-column block interleaver according to an embodiment of the present invention.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N'_{xBLOCK\_TI\_MAX}=7$ and $Sshift=(7-1)/2=3$. Note that in the reading process shown as pseudocoele above, if $V_i \geq N_{cells}$ $N_{xBLOCK\_TI}(n,s)$, the value of Vi is skipped and the next calculated value of Vi is used.

Figure 24:
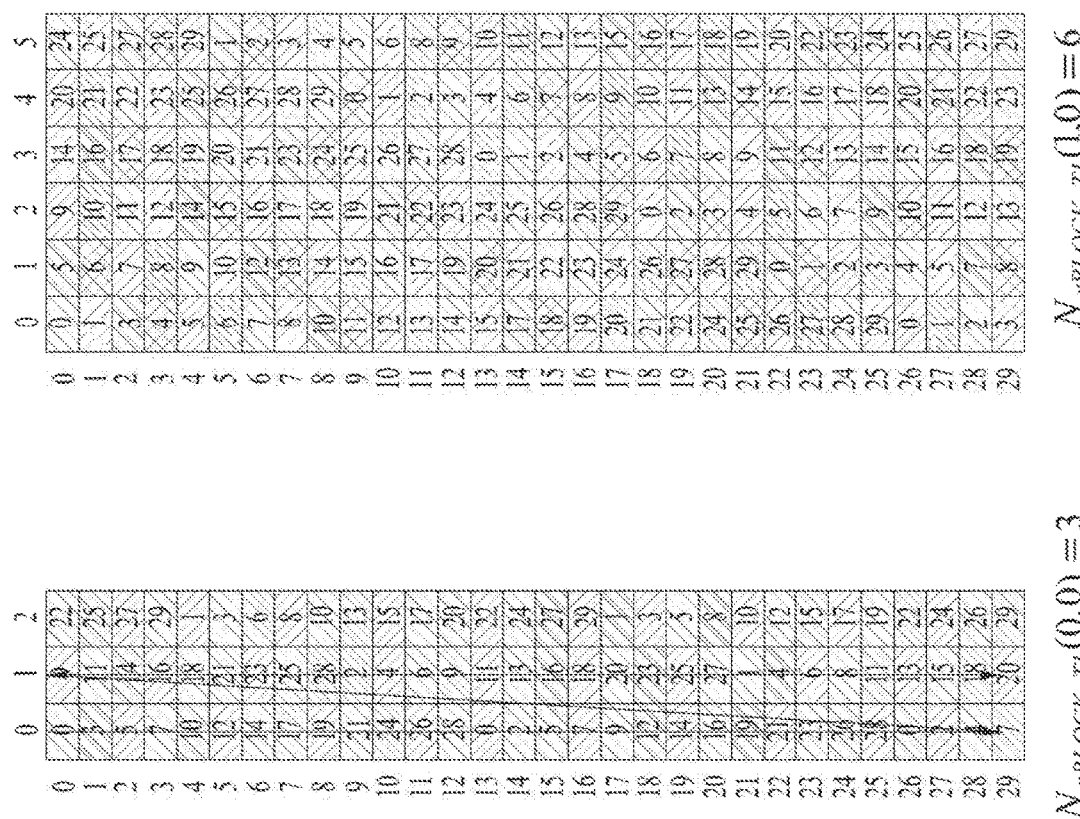
FIG. 24 illustrates interlaved XFECBLOCKs from each interleaving array according to an embodiment of the present invention.

FIG. 24 illustrates interlaved XFECBLOCKs from each interleaving array according to an embodiment of the present invention.

FIG. 24 illustrates the interleaved XFECBLOCKs from each interleaving array with parameters of $N_{xBLOCK\_TI\_MAX}=7$ and $Sshift=3$.

Figures 25, 26:
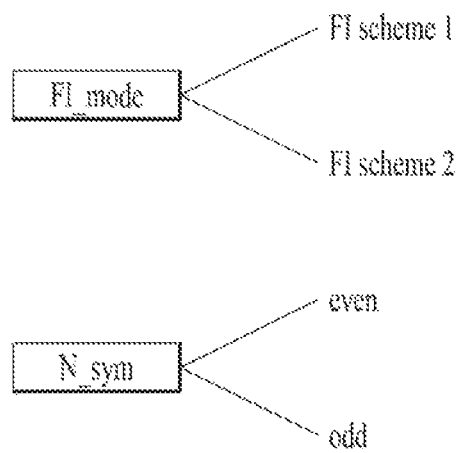
FIG. 25 illustrates signaling for single-memory deinterleaving irrespective of the number of symbols in a frame according to an embodiment of the present invention.
FIG. 26 illustrates FI schemes of FSS in signaling for single-memory deinterleaving irrespective of the number of symbols in a frame according to an embodiment of the present invention.

FIG. 25 illustrates signaling for single-memory deinterleaving irrespective of the number of symbols in a frame according to an embodiment of the present invention.

As described above, the frequency interleaver according to the present invention performs interleaving using different interleaving sequences in a plurality of OFDM symbols, but the frequency deinterleaver may perform single-memory deinterleaving on the received OFDM symbols.

The present invention proposes a method for performing single-memory deinterleaving by the frequency deinterleaver irrespective of whether the number of OFDM symbols in one frame is an even number or an odd number. To this end, the above-described architecture of the frequency interleaver may operate differently depending on whether the number of OFDM symbols is an even number or an odd number. Furthermore, signaling information related thereto may be additionally defined in the above-described preamble and/or the physical layer signal (PLS). As such, single-memory deinterleaving is not limited to a case in which the number of OFDM symbols is an even number, and may always be enabled.

Here, the PLS may be transmitted in a frame starting symbol (FSS) of every frame. Alternatively, according to another embodiment, the PLS may be transmitted in the first OFDM symbol. Otherwise, based on whether the PLS is present, signaling information corresponding to the PLS may be completely transmitted in the preamble. Or, signaling information corresponding to the preamble and/or the PLS may be transmitted in bootstrap information. The bootstrap information may be an information part located in front of the preamble.

Information about, for example, a processing operation used by the frequency interleaver of the transmitter may include an FI_mode field and an N_sym field.

The FI_mode field may be a 1-bit field which can be located in the preamble. The FI_mode field may indicate an interleaving scheme used in the FSS or the first OFDM symbol of every frame.

The interleaving scheme indicated as the FI_mode field may include FI scheme #1 and FI scheme #2.

FI scheme #1 can indicate that the frequency interleaver of the transmitter performs random writing operation and then linear reading operation on the FSS. This case may correspond to a case in which the FI_mode field value is 0. The random writing or linear reading operation may be performed in or from memory using a value generated by an arbitrary random sequence generator using, for example, a pseudo-random binary sequence (PRBS). Here, linear reading may refer to sequentially reading operation.

FI scheme #2 can indicate that the transmitter performs linear writing operation and then random reading operation on the FSS. This case may correspond to a case in which the FI_mode field value is 1. Likewise, the linear writing or random reading operation may be performed in or from memory using a value generated by an arbitrary random sequence generator using, for example, PRBS. Here, linear writing may refer to a sequentially writing operation.

In addition, the FI_mode field may indicate an interleaving scheme used in a frame edge symbol (FES) or the last OFDM symbol of every frame. The interleaving scheme applied to the FES may be indicated differently from the value of the N_sym field transmitted by the PLS. That is, the interleaving scheme indicated as the FI_mode field may differ depending on whether the number of OFDM symbols is an odd number or an even number. Mapping information between the two fields may be predefined as a table by the transmitter and the receiver.

The FI_mode field may be defined and transmitted in a part of the frame other than the preamble according to another embodiment.

The N_sym field may be a field which can be located in the PLS part. The number of bits of the N_sym field is variable according to embodiments. The N_sym field may indicate number of OFDM symbols included in one frame. As such, the receiver can acquire information about whether the number of OFDM symbols is an even number or an odd number.

Operation of the frequency deinterleaver corresponding to the frequency interleaver irrespective of the number of OFDM symbols in one frame is as described below. This frequency deinterleaver may perform single-memory deinterleaving by utilizing the proposed signaling fields irrespective of whether the number of OFDM symbols is an even number or an odd number.

Initially, the frequency deinterleaver may perform frequency deinterleaving on the FSS using information of the FI_mode field of the preamble because the frequency interleaving scheme used in the FSS is indicated as the FI_mode.

The frequency deinterleaver may perform frequency deinterleaving on the FES using signaling information of the FI_mode field and signaling information of the N_sym field of the PLS. In this case, the mapping information between the two fields may be acquired using the predefined table. A description of the predefined table will be given below.

Overall deinterleaving operation on the other symbols may be performed inversely from the interleaving operation of the transmitter. That is, on a pair of contiguously input OFDM symbols, the frequency deinterleaver may perform deinterleaving using one interleaving sequence. Here, the interleaving sequence may be an interleaving sequence used by the frequency interleaver for reading & writing. The frequency deinterleaver may perform reading & writing operation inversely using the interleaving sequence.

However, the frequency deinterleaver according to the present invention may not use a ping pong architecture using double memories. The frequency deinterleaver may perform deinterleaving on contiguously input OFDM symbols using a single memory. As such, the efficiency of using memory by the frequency deinterleaver may be increased.

FIG. 26 illustrates FI schemes of FSS in signaling for single-memory deinterleaving irrespective of the number of symbols in a frame according to an embodiment of the present invention.

An interleaving scheme applied to frequency interleaving operation may be determined using the above-described FI_mode field and the N_sym field.

In the case of FSS, when the number of OFDM symbols indicated as the N_sym field is an even number, FI scheme #1 may be performed on the FSS irrespective of the FI_mode field value.

When the number of OFDM symbols indicated as the N_sym field is an odd number, FI scheme #1 may be applied to the FSS if the FI_mode field has a value of 0, and FI scheme #2 may be applied to the FSS if the FI_mode field has a value of 1. That is, when the number of OFDM symbols is an odd number, FI schemes #1 and #2 may be alternately applied to the FSS symbols for frequency interleaving.

FIG. 27 illustrates operation of a reset mode in signaling for single-memory deinterleaving irrespective of the number of symbols in a frame according to an embodiment of the present invention.

For frequency interleaving on FES, the above-described symbol offset generator may adopt a reset mode as a new concept. The reset mode may refer to a mode in which a symbol offset value generated by the symbol offset generator is '0'.

For frequency interleaving on FES, whether to use the reset mode may be determined using the above-described FI_mode field and the N_sym field.

When the number of OFDM symbols indicated as the N_sym field is an even number, the reset mode of the symbol offset generator may not operate (off) irrespective of the value of the FI_mode field.

When the number of OFDM symbols indicated as the N_sym field is an odd number, if the value of the FI_mode field is 0, the symbol offset generator may operate in the reset mode (on). Otherwise, if the value of the FI_mode field is 1, the reset mode of the symbol offset generator may not operate (off). That is, when the number of OFDM symbols is an odd number, the reset mode may be alternately turned on and off for frequency interleaving.

FIG. 28 illustrates equations indicating input and output of the frequency interleaver in signaling for single-memory deinterleaving irrespective of the number of symbols in a frame according to an embodiment of the present invention.

As described above, OFDM symbol pairs of memory bank-A and memory bank-B may be processed through the above-described interleaving operation. As described above, for interleaving, a variety of different interleaving seeds generated by cyclically shifting one main interleaving seed may be used. Here, the interleaving seed may also be called an interleaving sequence. Alternatively, the interleaving seed may also be called an interleaving address value, an address value, or an interleaving address. Here, the term "interleaving address value(s)" can be used for referring plural address values, or for referring a interleaving seed which is a singular. That is, depending on embodiments, interleaving address value(s) can mean H(p) itself, or each addresses belong to H(p).

Input of frequency interleaving to be interleaved within one OFDM symbol may be indicated as Om,l (t50010). Here, data cells may be indicated as xm,l,0, . . . xm,l,Ndata−1. Meanwhile, p may indicate a cell index, l may indicate an OFDM symbol index, and m may indicate a frame index. That is, xm,l,p may indicate a p-th data cell of an l-th OFDM symbol of an m-th frame. Ndata may indicate the number of data cells. Nsym may indicate the number of symbols (frame signaling symbols, normal data symbols, or frame edge symbols).

Data cells which are interleaved based on the above-described operation may be indicated as Pm,l (t50020). The interleaved data cells may be indicated as vm,l,0, . . . vm,l,Ndata−1. Meanwhile, p, l, and m may have the above-described index values.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

A description is now given of frequency interleaving based on FI scheme #1. As described above, frequency interleaving may be performed using an interleaving sequence (interleaving address) of each memory bank.

Interleaving operation on an even symbol (j mod 2=0) may be mathematically expressed as given by equation t51010. On input data x, frequency interleaving may be performed using the interleaving sequence (interleaving address) to acquire output v. Here, p-th input data x may be permuted to be identical to H(p)-th output data v.

That is, on an even symbol (the first symbol), random writing operation may be performed using the interleaving sequence, and then linear reading operation for sequentially reading data may be performed. Here, the interleaving sequence (interleaving address) may be a value generated by an arbitrary random sequence generator using, for example, PRBS.

Interleaving operation on an odd symbol (j mod 2=1) may be mathematically expressed as given by equation t51020. On input data x, frequency interleaving may be performed using the interleaving sequence (interleaving address) to acquire output v. Here, H(p)-th input data x may be permuted to be identical to p-th output data v. That is, compared to the interleaving process performed on the even symbol, the interleaving sequence (interleaving address) may be applied inversely.

That is, on an odd symbol (the second symbol), a linear writing operation for sequentially writing data in memory may be performed, and then random reading operation for randomly reading the data using the interleaving sequence may be performed. Likewise, the interleaving sequence (interleaving address) may be a value generated by an arbitrary random sequence generator using, for example, PRBS.

A description is now given of frequency interleaving based on FI scheme #2.

In the case of frequency interleaving based on FI scheme #2, operation on an even/odd symbol may be performed inversely from the operation based on FI scheme #1.

That is, on the even symbol, linear writing operation may be performed and then random reading operation may be performed as given by equation t51020. In addition, on the odd symbol, random writing operation may be performed and then linear reading operation may be performed as given by equation t51010. A detailed description thereof is the same as that given above in relation to FI scheme #1.

The symbol index l may be indicated as 0, 1, . . . , Nsym−1, and the cell index p may be indicated as 0, 1, . . . , Ndata−1. According to another embodiment, the frequency interleaving scheme on an even symbol and the frequency interleaving scheme on an odd symbol may be switched. In addition, according to another embodiment, the frequency interleaving scheme based on FI scheme #1 and the frequency interleaving scheme based on FI scheme #2 may be switched.

Figure 30:
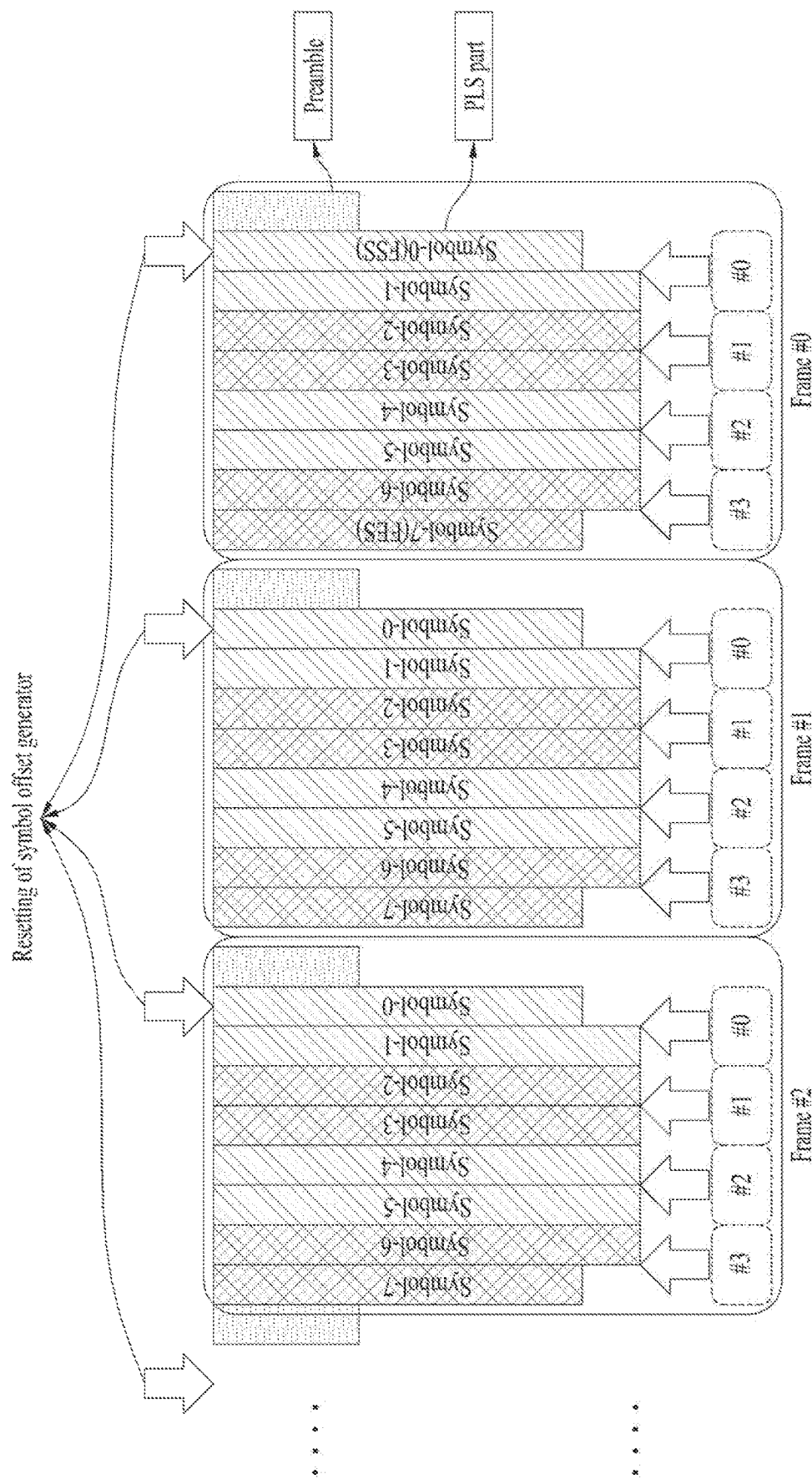
FIG. 30 illustrates an example in which the number of symbols is an even number in signaling for single-memory deinterleaving irrespective of the number of symbols in a frame according to an embodiment of the present invention.

FIG. 30 illustrates an example in which the number of symbols is an even number in signaling for single-memory deinterleaving irrespective of the number of symbols in a frame according to an embodiment of the present invention.

In the current embodiment, the N_sym field may indicate that the number of OFDM symbols in one frame is an even number. The current embodiment assumes that one frame includes one preamble and eight OFDM symbols. According to another embodiment, bootstrap information may be further included in front of the preamble. The bootstrap information is not illustrated.

In the current embodiment, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Accordingly, the first and second symbols may be processed using the same interleaving sequence. In addition, sequence #0 may be used for operation whenever each frame starts. After that, sequences #1 and #2 may be sequentially used for operation of the frequency interleaver/deinterleaver.

Figure 31:
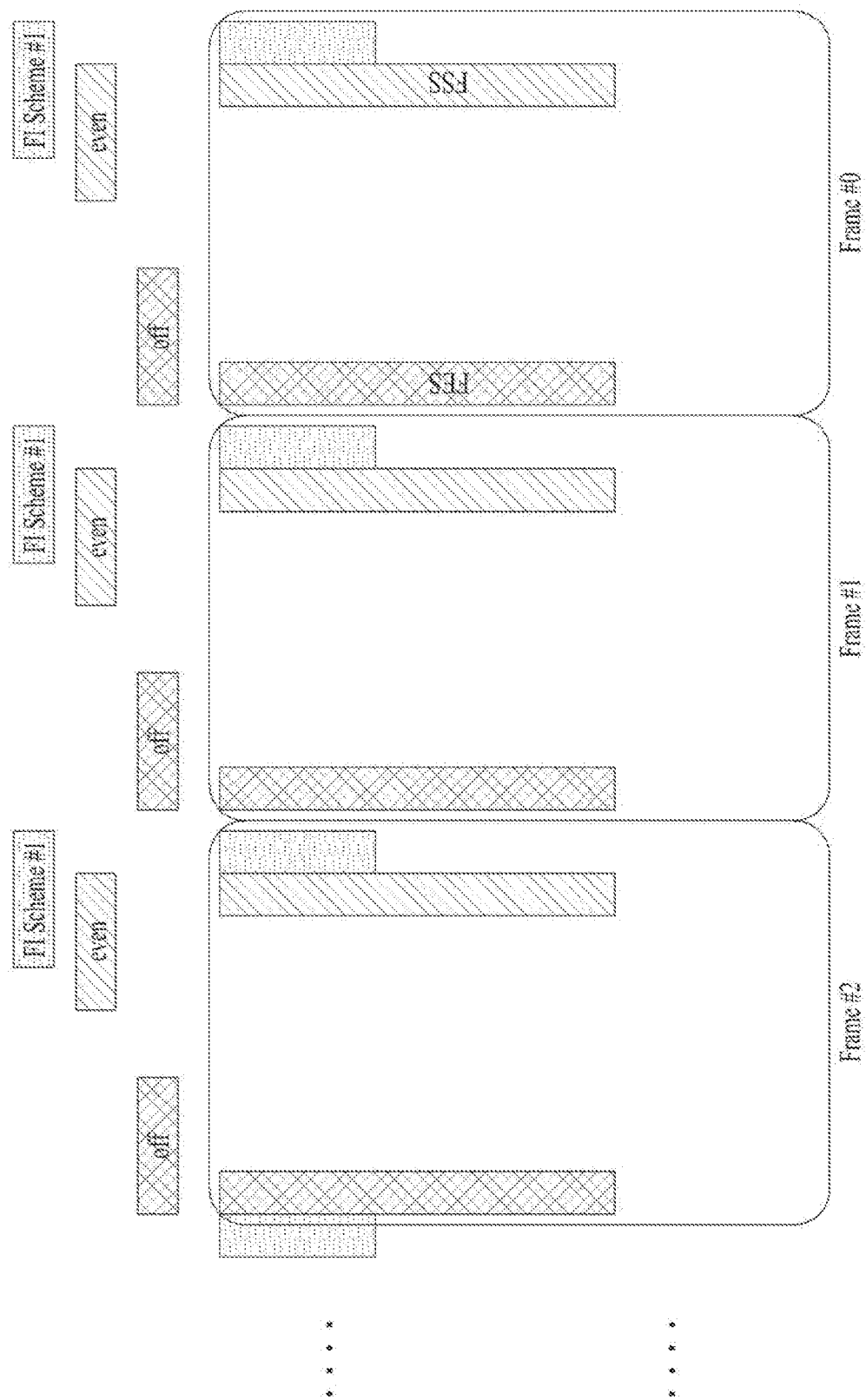
FIG. 31 illustrates an example in which the number of symbols is an even number in signaling for single-memory deinterleaving irrespective of the number of symbols in a frame according to an embodiment of the present invention.

FIG. 31 illustrates an example in which the number of symbols is an even number in signaling for single-memory deinterleaving irrespective of the number of symbols in a frame according to an embodiment of the present invention.

In the first frame, information about an interleaving scheme of the FSS may be acquired from the FI_mode field of the preamble. In the current embodiment, since the number of OFDM symbols is an even number, only FI scheme #1 may be used.

Then, the FSS may be decoded and thus N_sym information may be acquired. The N_sym information indicates that the number of symbols in the current frame is an even number. After that, the acquired FI_mode information and the N_sym information may be used when the frequency deinterleaver decodes the FES. Since the number of symbols is an even number, the symbol offset generator does not operate in the above-described reset mode. That is, the reset mode may be in an off state.

Subsequently, even in another frame, since an even number of OFDM symbols are included, the frequency deinterleaver may operate in the same manner. That is, the FI scheme to be used in the FSS is FI scheme #1, and the reset mode to be used in the FES may be in an off state.

Figure 32:
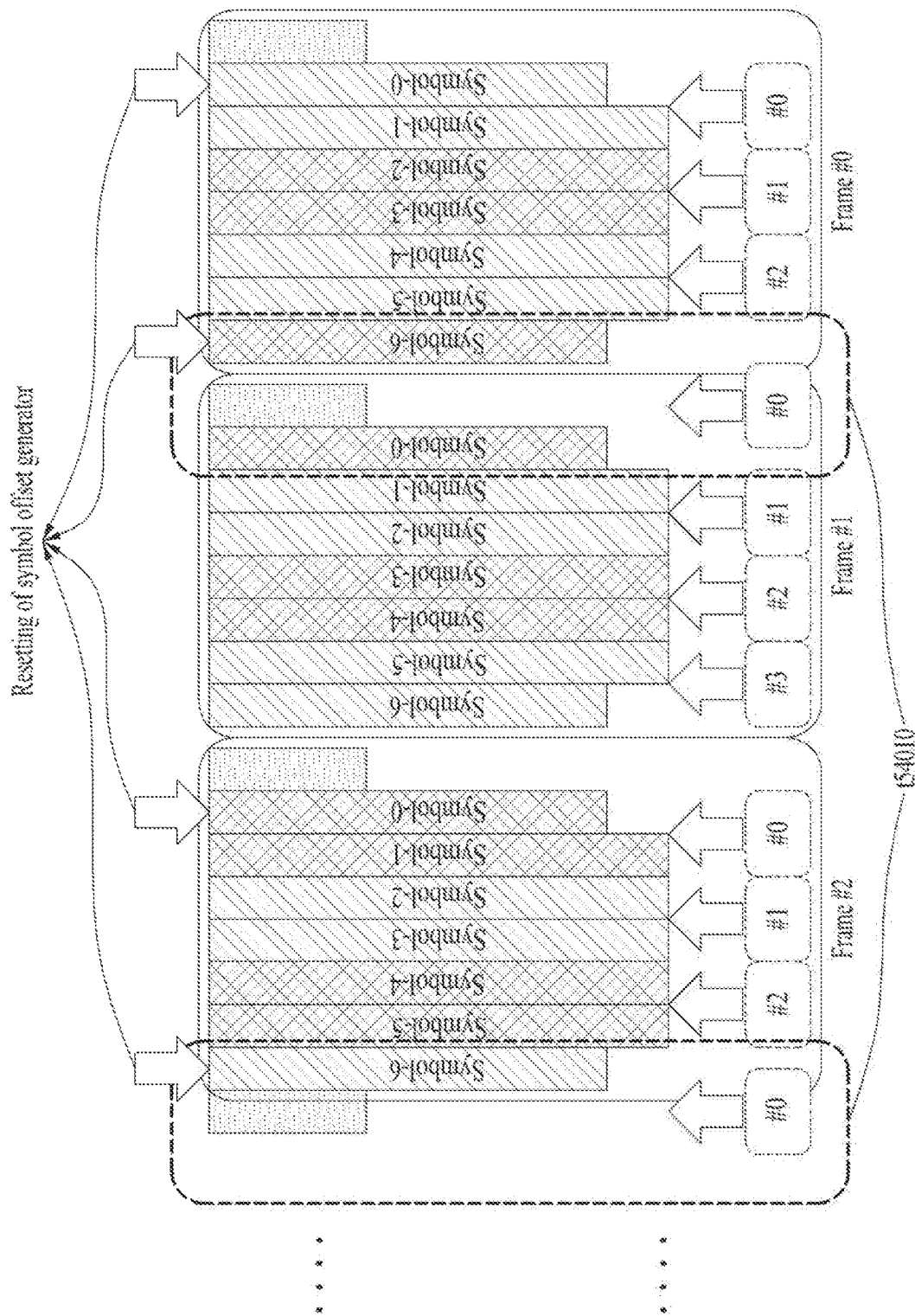
FIG. 32 illustrates an example in which the number of symbols is an odd number in signaling for single-memory deinterleaving irrespective of the number of symbols in a frame according to an embodiment of the present invention.

FIG. 32 illustrates an example in which the number of symbols is an odd number in signaling for single-memory deinterleaving irrespective of the number of symbols in a frame according to an embodiment of the present invention.

In the current embodiment, the N_sym field may indicate that the number of OFDM symbols in one frame is an odd number. The current embodiment assumes that one frame includes one preamble and seven OFDM symbols. According to another embodiment, bootstrap information may be further included in front of the preamble. The bootstrap information is not illustrated.

In the current embodiment, like the case in which the number of symbols is an even number, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Furthermore, in the FES of an arbitrary frame, the symbol offset generator may operate in a reset mode based on the values of the FI_mode field and the N_sym field. Accordingly, in the FES of the arbitrary frame, the value of the symbol offset generator may be reset or not reset to 0. These reset operations may be alternately performed on frames.

The symbol offset generator may be reset in the last symbol of the first frame, i.e., the FES. Accordingly, the interleaving sequence may be reset to sequence #0. As such, the frequency interleaver/deinterleaver may process the corresponding FES based on sequence #0 (t54010).

In the FSS of a subsequent frame, the symbol offset generator may be reset again and thus sequence #0 may be used (t54010). The symbol offset generator may not be reset in the FES of the second frame (frame #1), and may be reset again in the FES of the third frame (frame #2).

Figure 33:
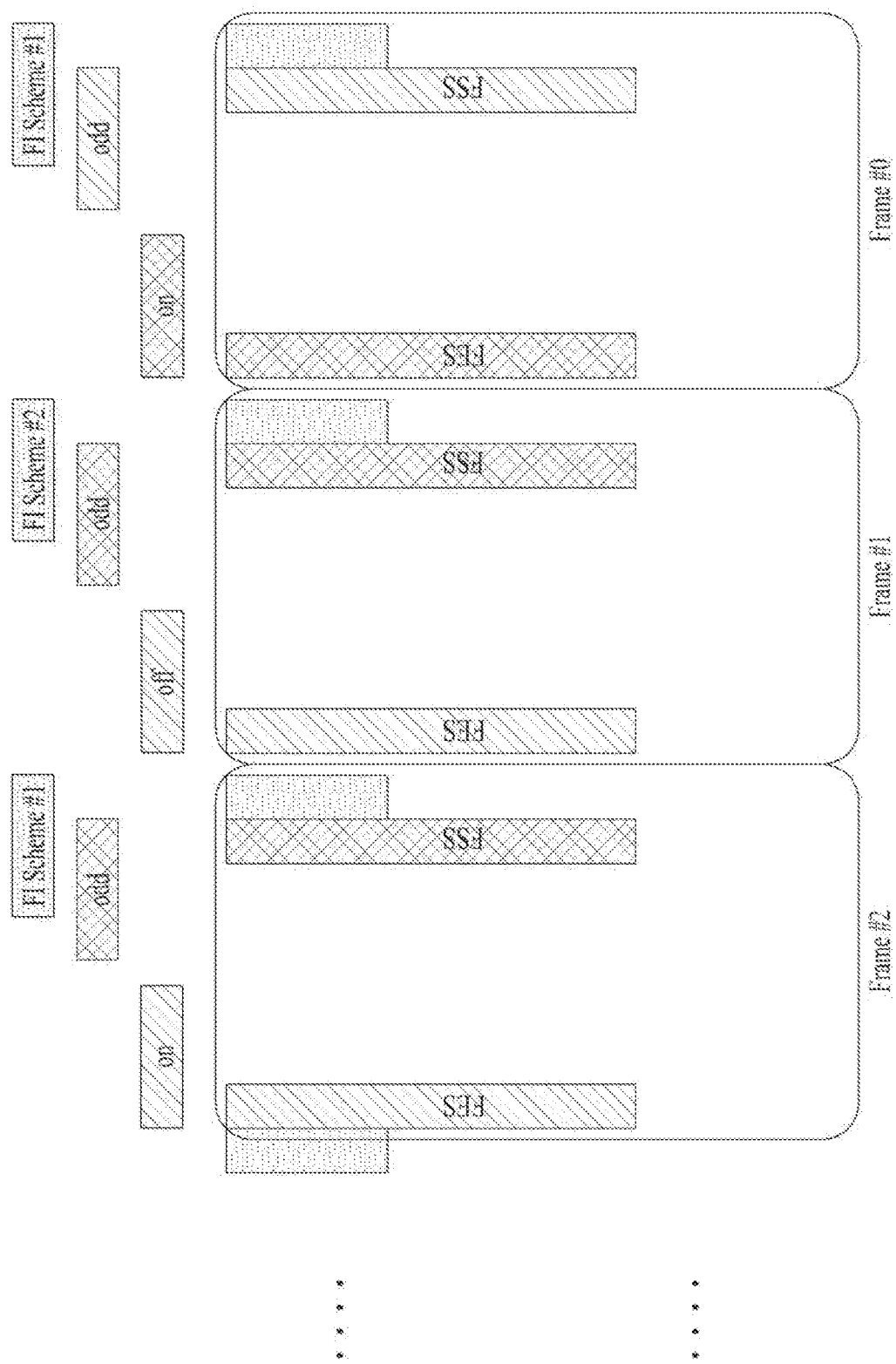
FIG. 33 illustrates an example in which the number of symbols is an odd number in signaling for single-memory deinterleaving irrespective of the number of symbols in a frame according to an embodiment of the present invention.

FIG. 33 illustrates an example in which the number of symbols is an odd number in signaling for single-memory deinterleaving irrespective of the number of symbols in a frame according to an embodiment of the present invention.

In the first frame, information about an interleaving scheme of the FSS may be acquired from the FI_mode field of the preamble. Since the number of OFDM symbols is an odd number, FI scheme #1 and FI scheme #2 may be used. In the current embodiment, FI scheme #1 is used in the first frame.

Then, the FSS may be decoded and thus N_sym information may be acquired. The N_sym information indicates that the number of symbols in the current frame is an odd number. After that, the acquired FI_mode information and the N_sym information may be used when the frequency deinterleaver decodes the FES. Since the number of symbols is an odd number and FI scheme #1 is used, the FI_mode field value is 0. Since the FI_mode is 0, the symbol offset generator may operate in the above-described reset mode. That is, the reset mode may be in an on state.

The symbol offset generator may operate in the reset mode and thus may be reset to 0. Since the FI_mode field value is 1 in the second frame, this indicates that the FSS is processed based on FI scheme #2. The N_sym field indicates that the number of symbols is an odd number. In the second frame, since the FI_mode field value is 1 and the number of symbols is an odd number, the symbol offset generator may not operate in the reset mode.

In this manner, the FI scheme to be used in the FSS may be alternately set to FI schemes #1 and #2. Furthermore, the reset mode to be used in the FES may be alternately set to be on and off. According to another embodiment, the settings may not be changed every frame.

Figure 34:
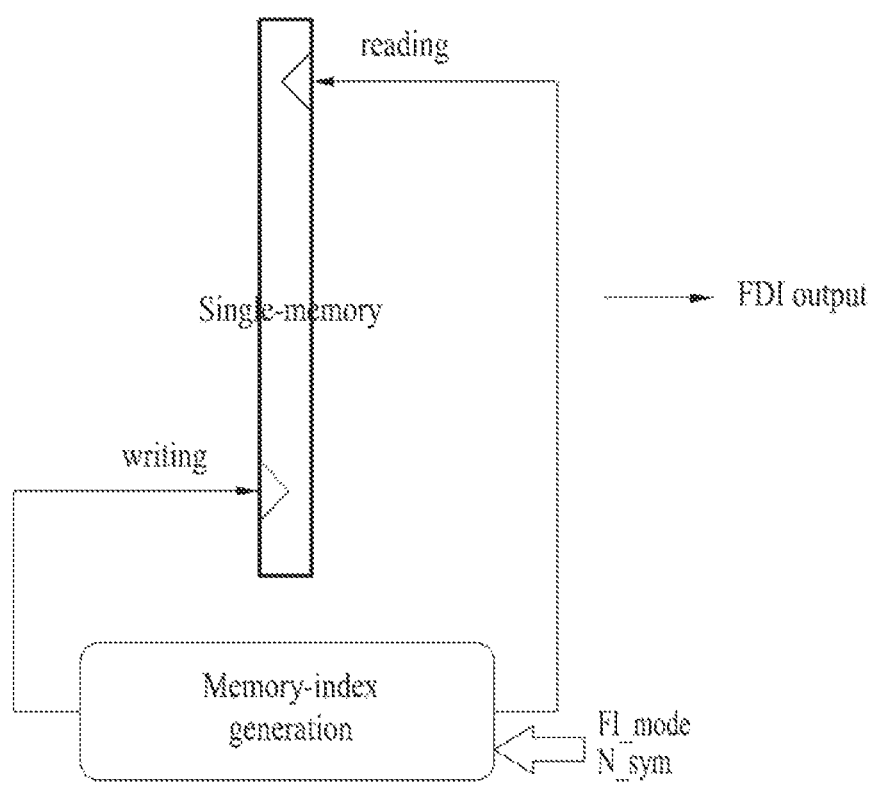
FIG. 34 illustrates operation of the frequency deinterleaver in signaling for single-memory deinterleaving irrespective of the number of symbols in a frame according to an embodiment of the present invention.

FIG. 34 illustrates operation of the frequency deinterleaver in signaling for single-memory deinterleaving irrespective of the number of symbols in a frame according to an embodiment of the present invention.

The frequency deinterleaver may perform frequency deinterleaving using information of the predefined FI_mode field and/or the N_sym field. As described above, the frequency deinterleaver may operate using a single memory. Basically, frequency deinterleaving may be inverse operation of the frequency interleaving operation performed by the transmitter, to restore the order of data.

As described above, frequency deinterleaving on the FSS may be performed based on information about the FI scheme which is acquired from the FI_mode field and the N_sym field of the preamble. Frequency deinterleaving on the FES may be performed based on information indicating whether to the reset mode operates, which is acquired using the FI_mode field and the N_sym field.

That is, on a pair of input OFDM symbols, the frequency deinterleaver may perform inverse operation of the reading/writing operation of the frequency interleaver. One interleaving sequence may be used in this operation.

However, as described above, the frequency interleaver follows the ping pong architecture using double memories, but the frequency deinterleaver may perform deinterleaving using a single memory. This single-memory frequency deinterleaving operation may be performed using information of the FI_mode field and the N_sym field. This information may allow single-memory frequency deinterleaving even on a frame having an odd number of OFDM symbols irrespective of the number of OFDM symbols.

The frequency interleaver according to the present invention may perform frequency interleaving on all data cells of the OFDM symbols. The frequency interleaver may map the data cells to available data carriers of the symbols.

The frequency interleaver according to the present invention may operate in different interleaving modes based on FFT size. For example, when the FFT size is 32K, the frequency interleaver may perform random writing/linear reading operation on an even symbol and perform linear writing/random reading operation on an odd symbol as in FI scheme #1 described above. Alternatively, when the FFT size is 16K or 8K, the frequency interleaver may perform linear reading/random writing operation on all symbols irrespective of an even/odd number.

The FFT size, which determines whether to switch the interleaving modes, may vary according to embodiments. That is, interleaving as in FI scheme #1 may be performed in the case of 32K and 16K, and interleaving irrespective of an even/odd number may be performed in the case of 8K. Alternatively, interleaving as in FI scheme #1 may be performed for all FFT sizes, or interleaving irrespective of an even/odd number may be performed for all FFT sizes. Otherwise, according to another embodiment, interleaving as in FI scheme #2 may be performed for a specific FFT size.

This frequency interleaving operation may be performed using the above-described interleaving sequence (interleaving address). The interleaving sequence may be variously generated using an offset value as described above. Alternatively, address check may be performed to generate various interleaving sequences.

Figure 35:
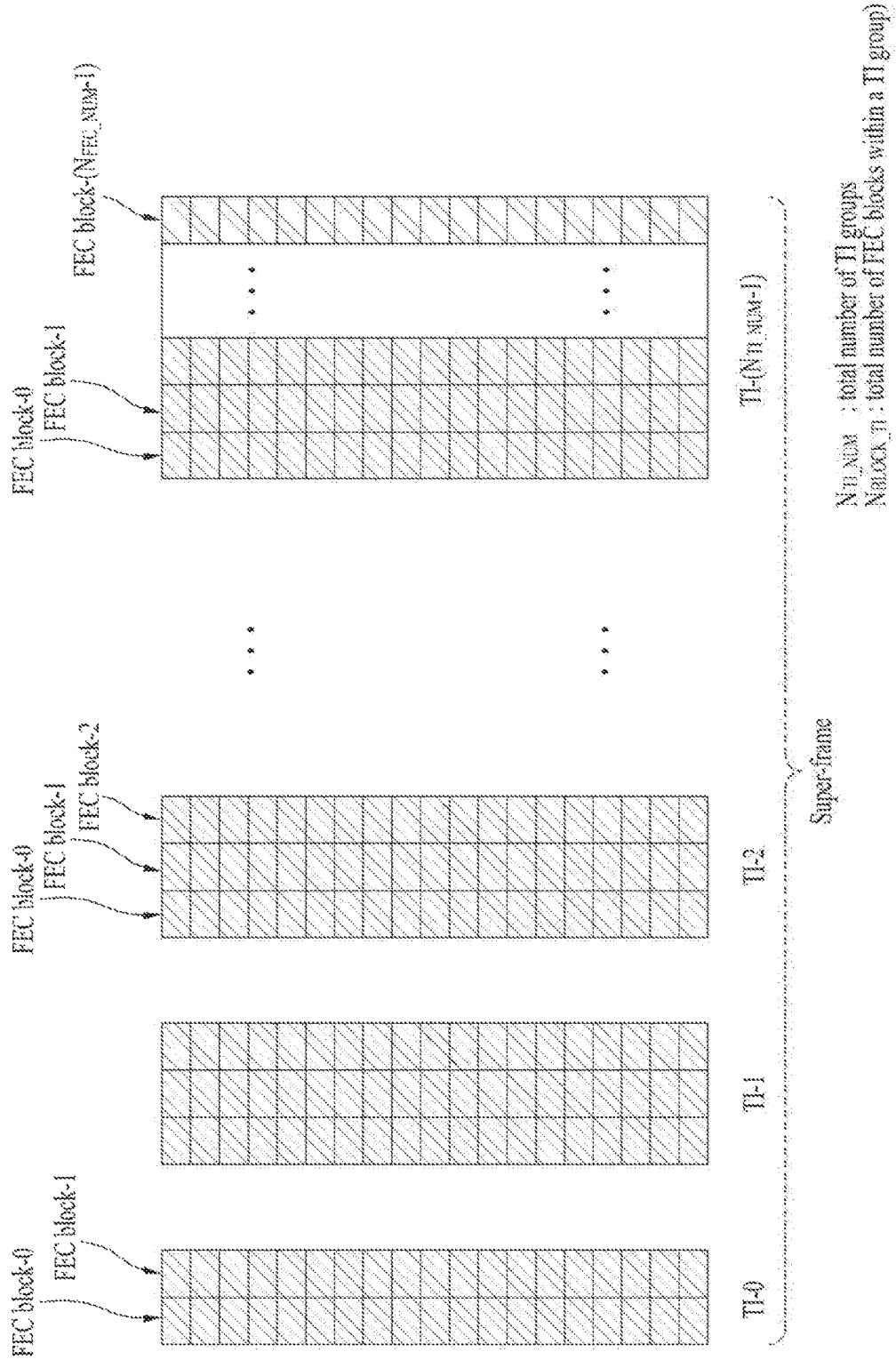
FIG. 35 illustrates the concept of a variable bit-rate system according to an embodiment of the present invention.

FIG. 35 illustrates the concept of a variable bit-rate system according to an embodiment of the present invention.

Specifically, a transport superframe, shown in FIG. 35, is composed of NTI_NUM TI groups and each TI group can include N BLOCK_TI FEC blocks. In this case, TI groups may respectively include different numbers of FEC blocks. The TI group according to an embodiment of the present invention can be defined as a block for performing time interleaving and can be used in the same meaning as the aforementioned TI block or IF. That is, one IF can include at least one TI block and the number of FEC blocks in the TI block is variable.

When TI groups include different numbers of FEC blocks, the present invention performs interleaving on the TI groups using one twisted row-column block interleaving rule in an embodiment. Accordingly, the receiver can perform deinterleaving using a single memory. A description will be given of an input FEC block memory arrangement method and reading operation of the time interleaver in consideration of variable bit-rate (VBR) transmission in which the number of FEC blocks can be changed per TI group.

Figure 36:
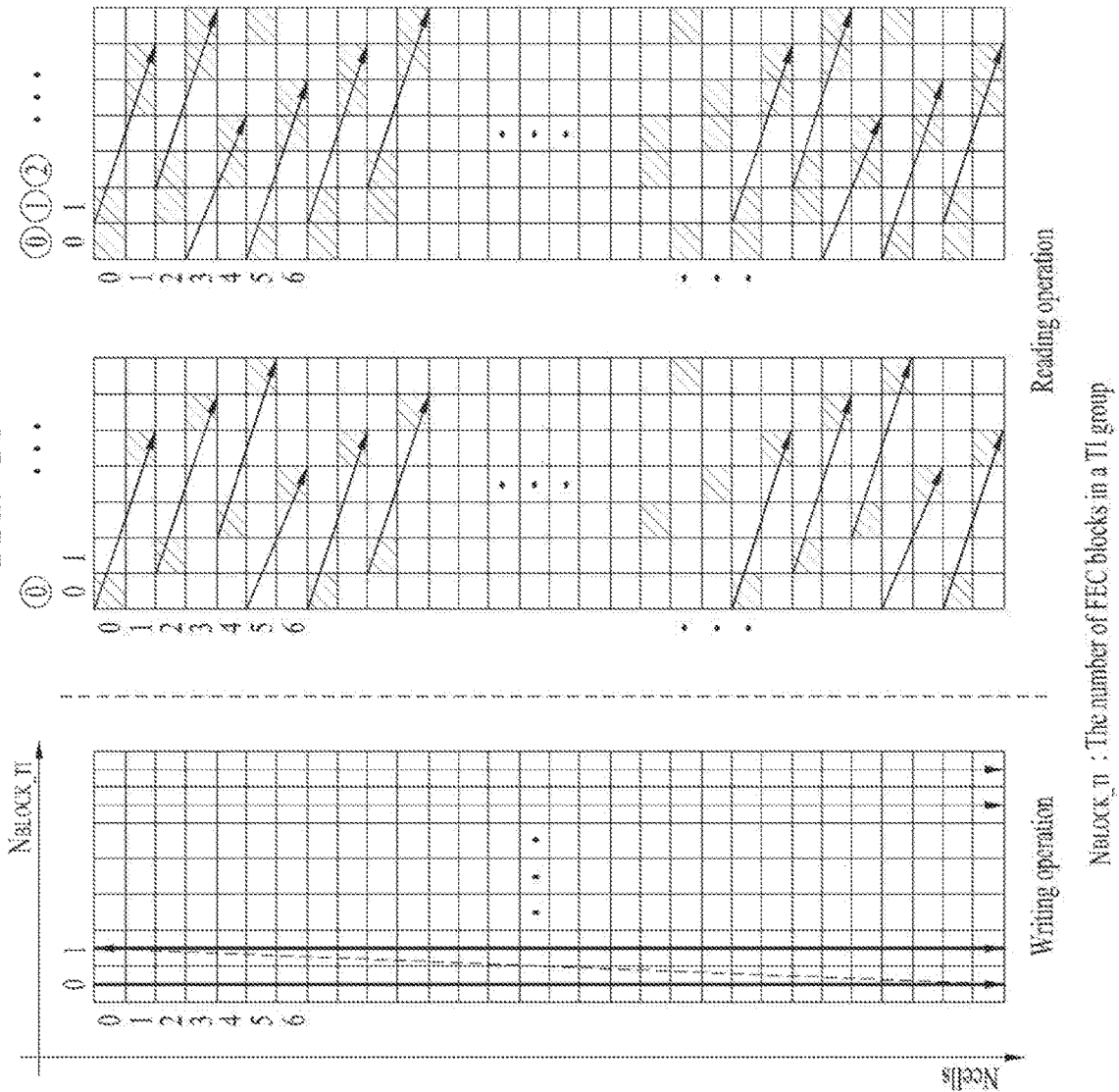
FIG. 36 illustrates writing and reading operations of block interleaving according to an embodiment of the present invention.

FIG. 36 illustrates writing and reading operations of block interleaving according to an embodiment of the present invention. Detailed descriptions about this figure was described before.

FIG. 37 shows equations representing block interleaving according to an embodiment of the present invention.

The equations shown in the figure represent block interleaving applied per TI group. As expressed by the equations, shift values can be respectively calculated in a case in which the number of FEC blocks included in a TI group is an odd number and a case in which the number of FEC blocks included in a TI group is an even number. That is, block interleaving according to an embodiment of the present invention can calculate a shift value after making the number of FEC blocks be an odd-number.

A time interleaver according to an embodiment of the present invention can determine parameters related to interleaving on the basis of a TI group having a maximum number of FEC blocks in the corresponding superframe. Accordingly, the receiver can perform deinterleaving using a single memory. Here, for a TI group having a smaller number of FEC blocks than the maximum number of FEC blocks, virtual FEC blocks corresponding to a difference between the number of FEC blocks and the maximum number of FEC blocks can be added.

Virtual FEC blocks according to an embodiment of the present invention can be inserted before actual FEC blocks. Subsequently, the time interleaver according to an embodiment of the present invention can perform interleaving on the TI groups using one twisted row-column block interleaving rule in consideration of the virtual FEC blocks. In addition, the time interleaver according to an embodiment of the present invention can perform the aforementioned skip operation when a memory-index corresponding to virtual FEC blocks is generated during reading operation. In the following writing operation, the number of FEC blocks of input TI groups is matched to the number of FEC blocks of output TI groups. Consequently, according to time interleaving according to an embodiment of the present invention, loss of data rate of data actually transmitted may be prevented through skip operation even if virtual FEC blocks are inserted in order to perform efficient single-memory deinterleaving in the receiver.

Figure 38:
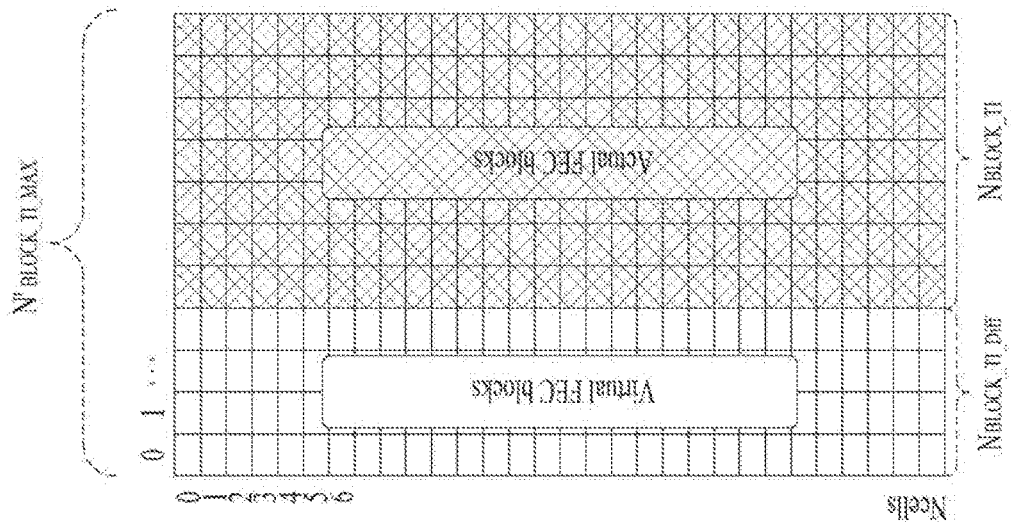
FIG. 38 illustrates virtual FEC blocks according to an embodiment of the present invention.

FIG. 38 illustrates virtual FEC blocks according to an embodiment of the present invention.

The left side of the figure shows parameters indicating a maximum number of FEC blocks in a TI group, the actual number of FEC blocks included in a TI group and a difference between the maximum number of FEC blocks and the actual number of FEC blocks, and equations for deriving the number of virtual FEC blocks.

The right side of the figure shows an embodiment of inserting virtual FEC blocks into a TI group. In this case, the virtual FEC blocks can be inserted before actual FEC blocks, as described above.

FIG. 39 shows equations representing reading operation after insertion of virtual FEC blocks according to an embodiment of the present invention.

Skip operation illustrated in the figure can skip virtual FEC blocks in reading operation.

Figure 40:
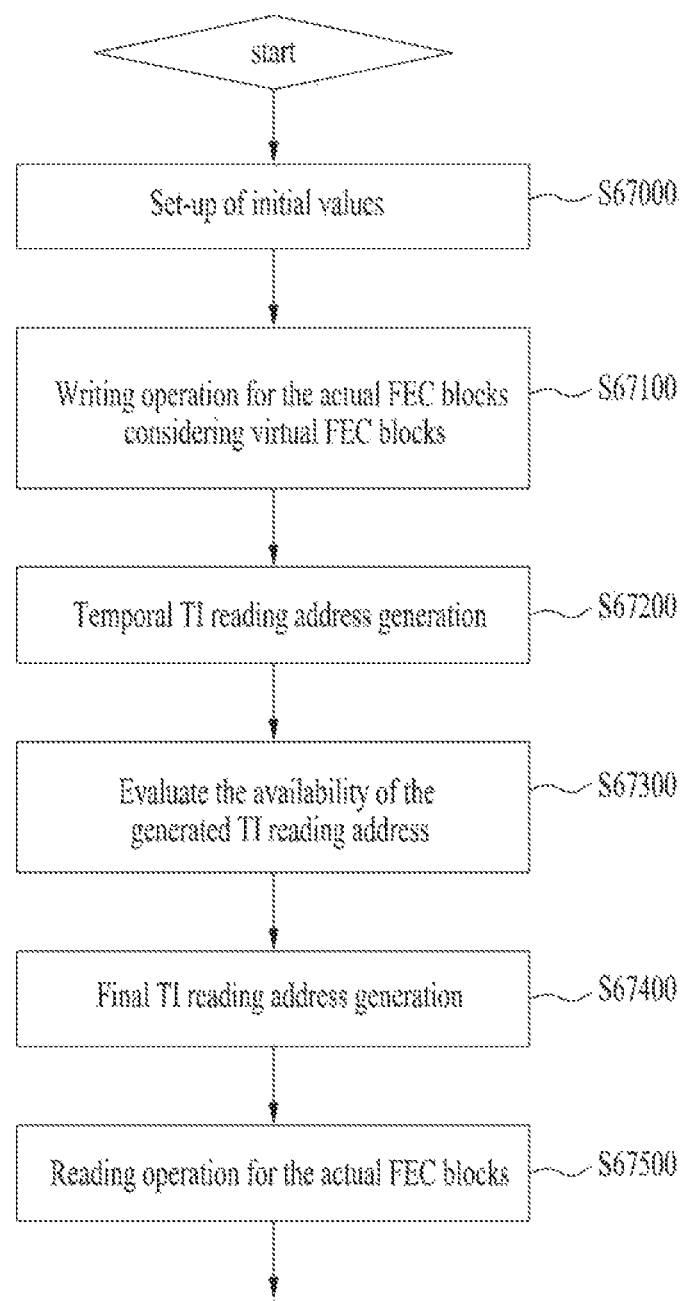
FIG. 40 is a flowchart illustrating a time interleaving process according to an embodiment of the present invention.

FIG. 40 is a flowchart illustrating a time interleaving process according to an embodiment of the present invention.

A time interleaver according to an embodiment of the present invention can setup initial values (S67000).

Then, the time interleaver according to an embodiment of the present invention can perform writing operation on actual FEC blocks in consideration of virtual FEC blocks (S67100).

The time interleaver according to an embodiment of the present invention can generate a temporal TI address (S67200).

Subsequently, the time interleaver according to an embodiment of the present invention can evaluate the availability of the generated TI reading address (S67300). Then, the time interleaver according to an embodiment of the present invention can generate a final TI reading address (S67400).

The time interleaver according to an embodiment of the present invention can read the actual FEC blocks (S67500).

FIG. 41 shows equations representing a process of determining a shift value and a maximum TI block size according to an embodiment of the present invention.

The figure shows an embodiment in which the number of TI groups is 2, the number of cells in a TI group is 30, the number of FEC blocks included in the first TI group is 5 and the number of FEC blocks included in the second TI block is 6. While a maximum number of FEC blocks is 6, 6 is an even number. Accordingly, a maximum number of FEC blocks, which is adjusted in order to obtain the shift value, can be 7 and the shift value can be calculated as 4.

FIGS. 83 to 85 illustrate a TI process of the embodiment described before.

Figure 42:
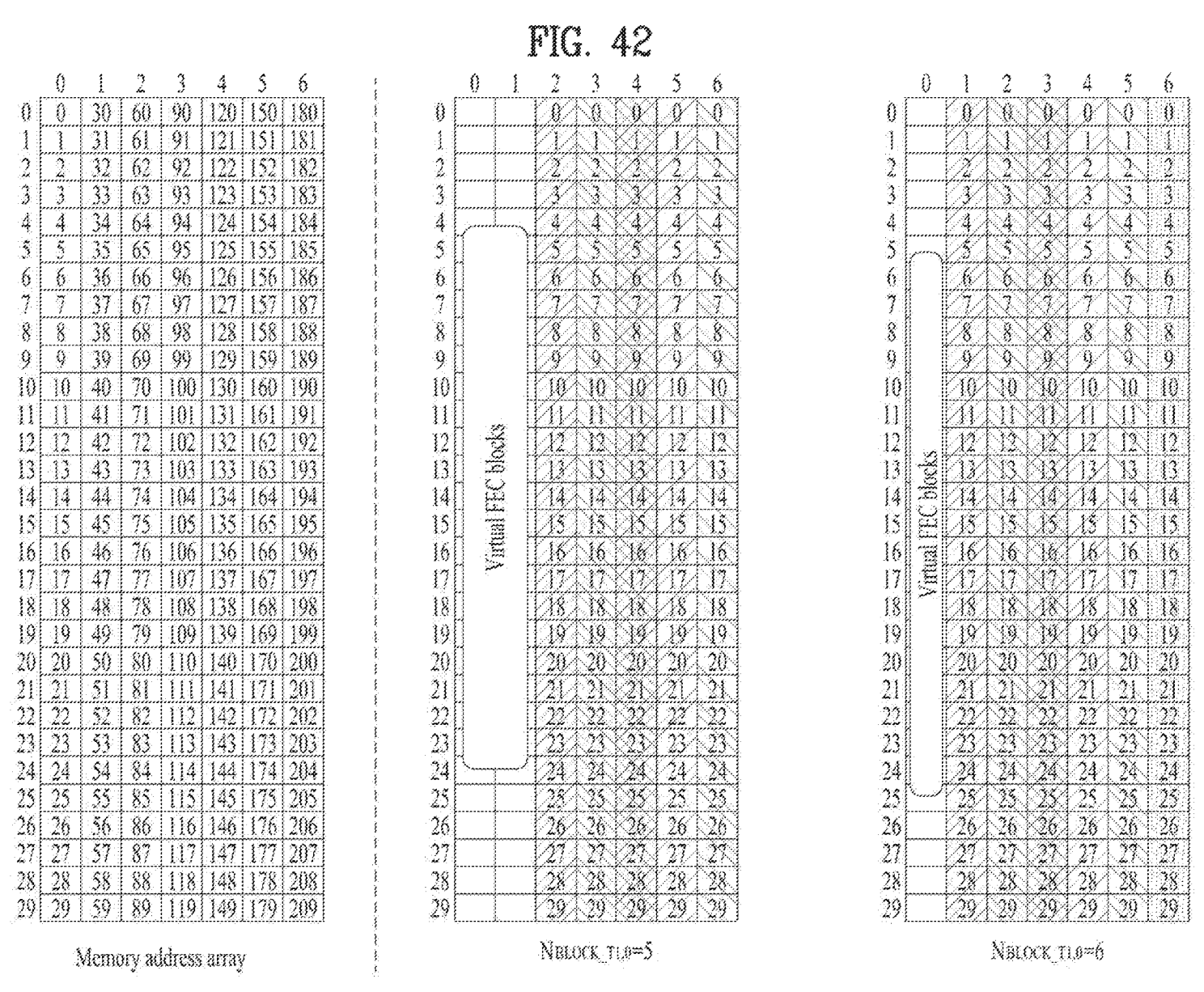

FIG. 42 illustrates writing operation according to an embodiment of the present invention.

FIG. 42 shows writing operation for the two TI groups described before.

A block shown in the left side of the figure represents a TI memory address array and blocks shown in the right side of the figure illustrate writing operation when two virtual FEC blocks and one virtual FEC block are respectively inserted into two continuous TI groups. Since the adjusted maximum number of FEC blocks is 7, as described above, two virtual FEC blocks are inserted into the first TI group and one virtual FEC block is inserted into the second TI group.

Figure 43:
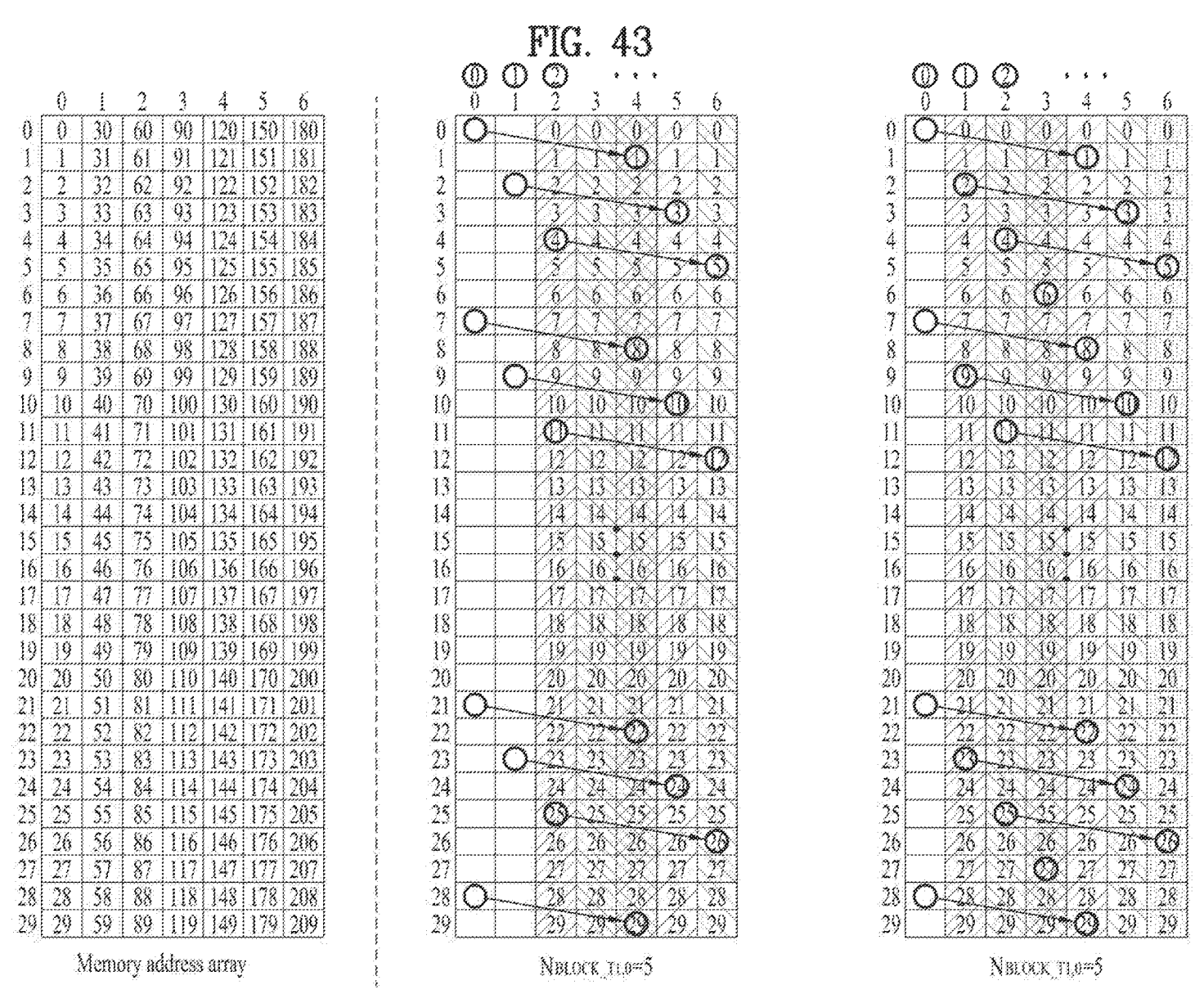

FIG. 43 illustrates reading operation according to an embodiment of the present invention.

A block shown in the left side of the figure represents a TI memory address array and blocks shown in the right side of the figure illustrate reading operation when two virtual FEC blocks and one virtual FEC block are respectively inserted into two continuous TI groups. In this case, reading operation can be performed on the virtual FEC blocks in the same manner as the reading operation performed on actual FEC blocks.

Figure 44:
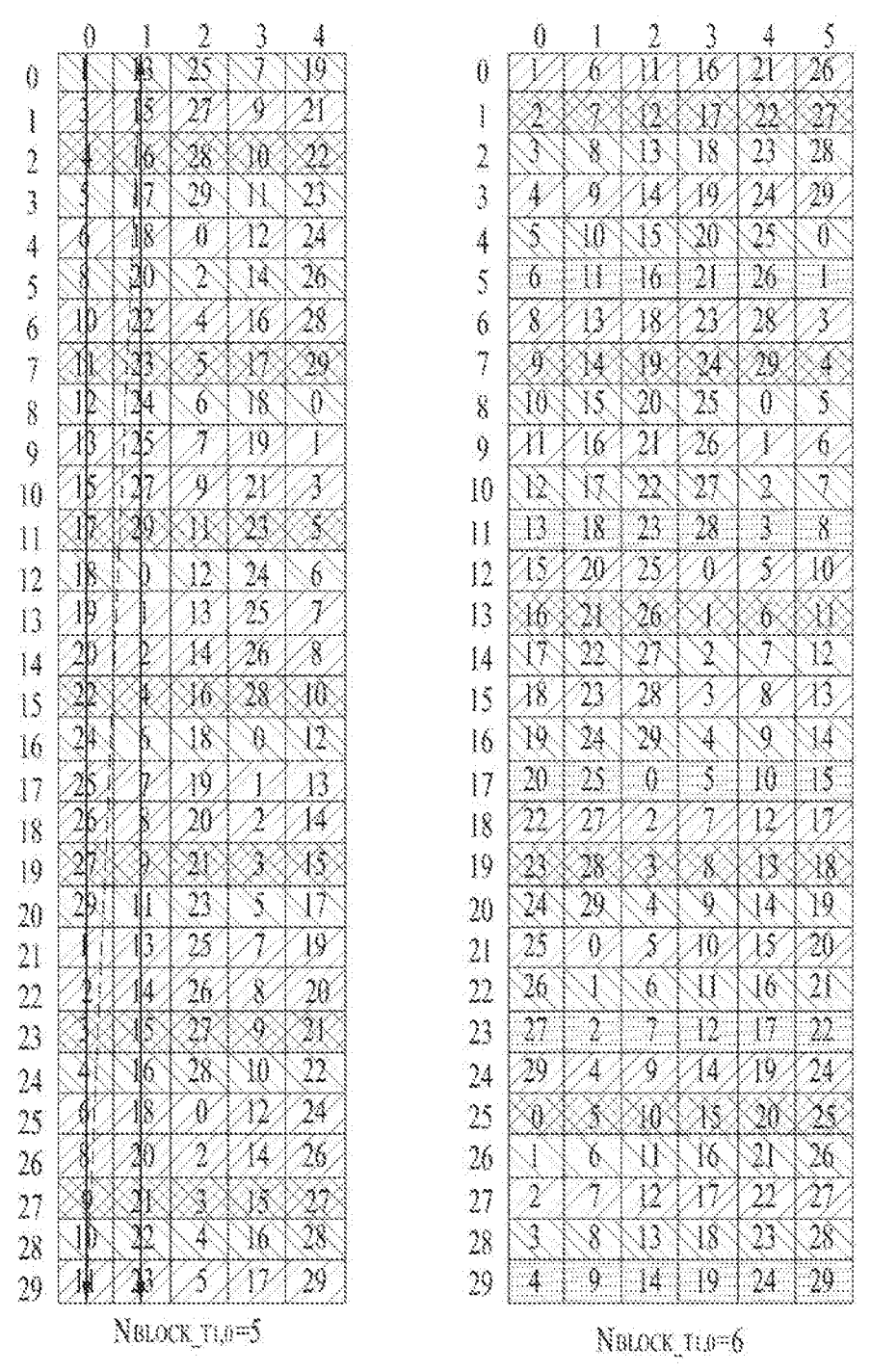

FIG. 44 illustrates a result of skip operation in reading operation according to an embodiment of the present invention.

As shown in the figure, virtual FEC blocks can be skipped in two TI groups.

FIGS. 86 to 88 illustrate time deinterleaving corresponding to a reverse of TI described before.

Figure 45:
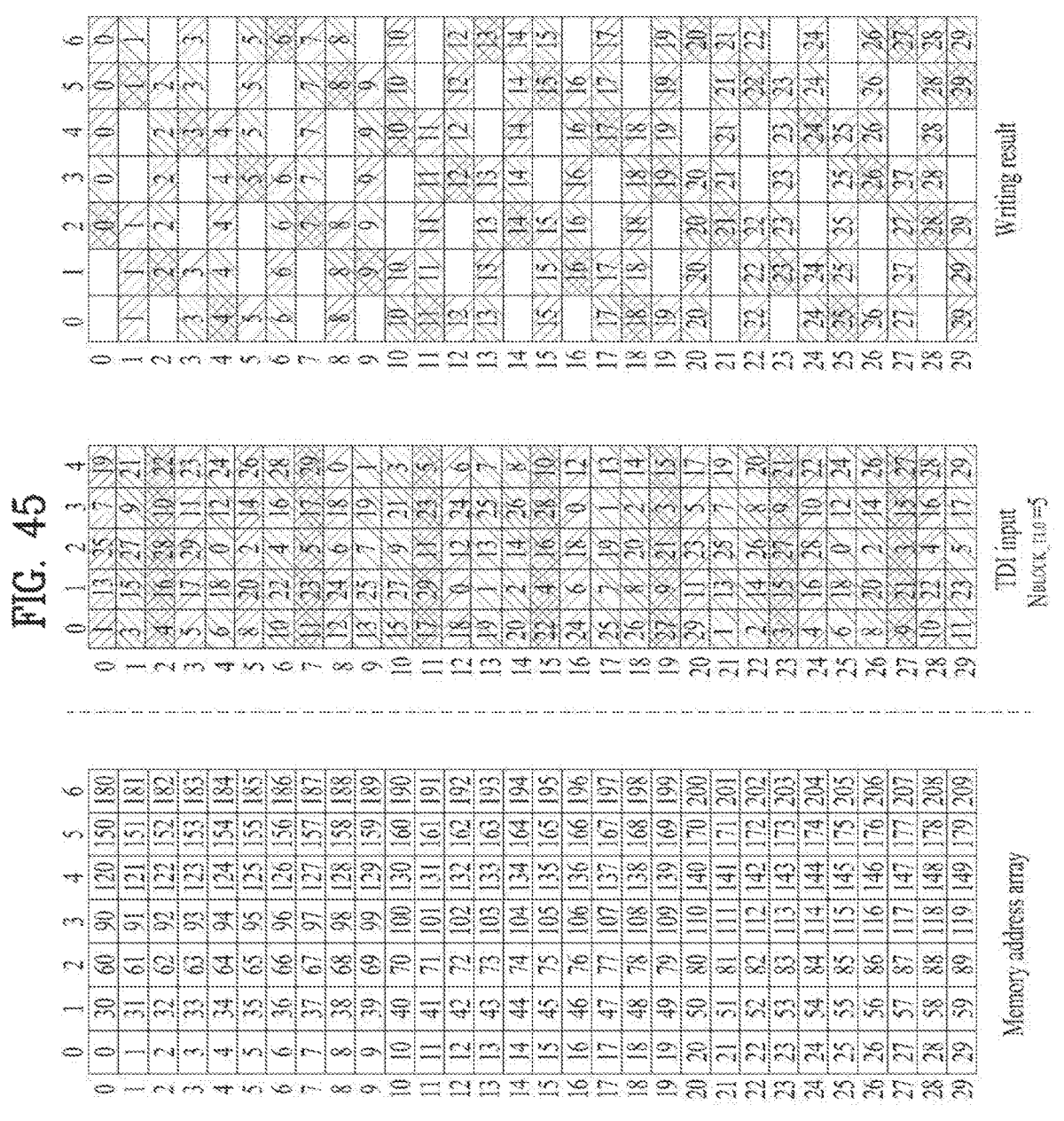
Figure 46:
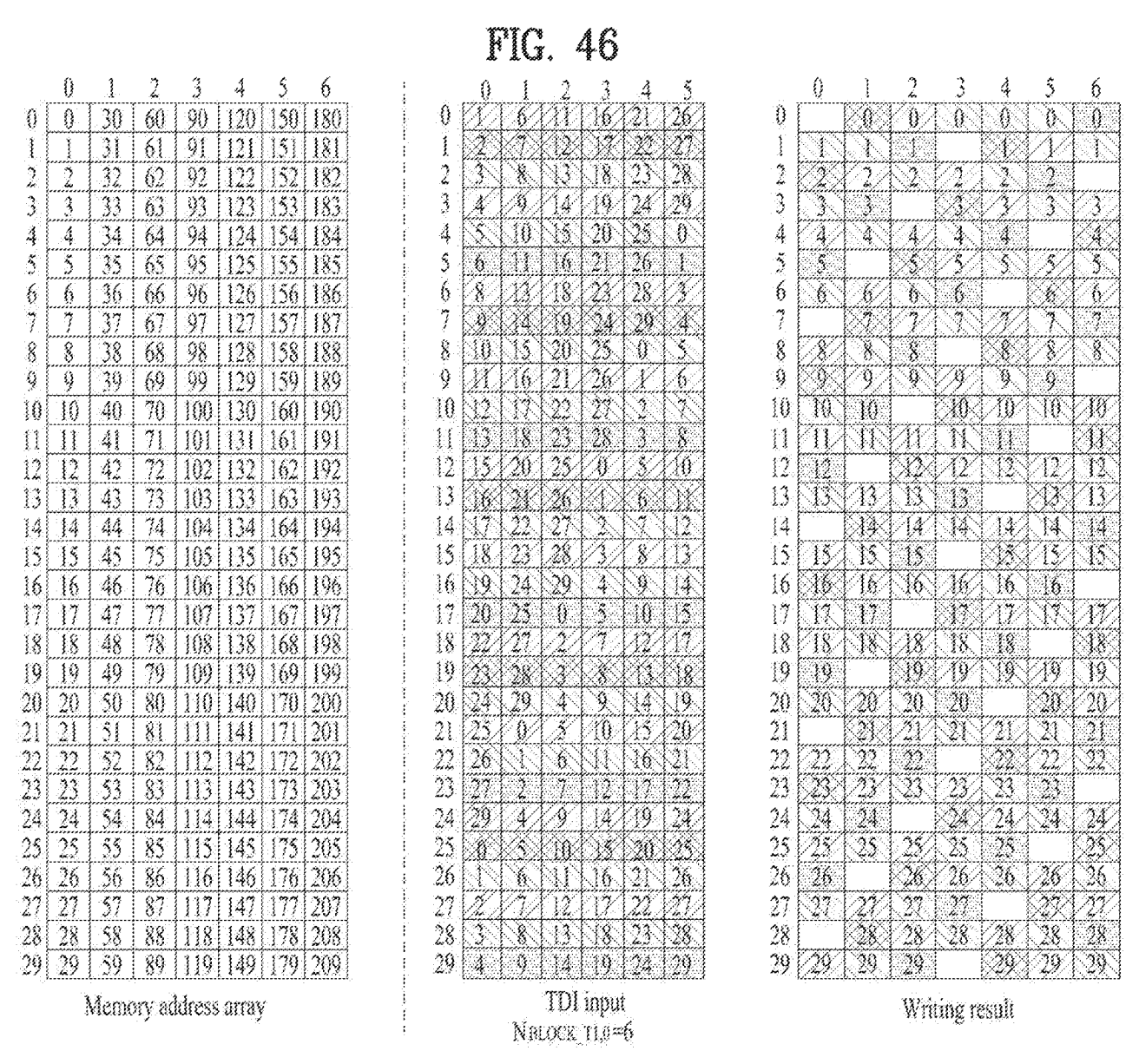

Specifically, FIG. 45 illustrates time deinterleaving for the first TI group and FIG. 46 illustrates time deinterleaving for the second TI group.

FIG. 45 shows a writing process of time deinterleaving according to an embodiment of the present invention.

A left block in the figure shows a TI memory address array, a middle block shows the first TI group input to a time deinterleaver and a right block shows a writing process performed in consideration of virtual FEC blocks that are skipped with respect to the first TI group.

As shown in the figure, two virtual FEC blocks skipped during TI can be restored for correct reading operation in the writing process. In this case, the positions and quantity of the skipped two virtual FEC blocks can be estimated through an arbitrary algorithm.

FIG. 46 illustrates a writing process of time deinterleaving according to another embodiment of the present invention.

A left block in the figure shows a TI memory address array, a middle block shows the second TI group input to the time deinterleaver and a right block shows a writing process performed in consideration of virtual FEC blocks that are skipped with respect to the second TI group.

As shown in the figure, one virtual FEC block skipped during TI can be restored for correct reading operation in the writing process. In this case, the position and quantity of the skipped one virtual FEC block can be estimated through an arbitrary algorithm.

FIG. 47 shows equations representing reading operation of time deinterleaving according to another embodiment of the present invention.

A TDI shift value used in the receiver can be determined by a shift value used in the transmitter, and skip operation can skip virtual FEC blocks in reading operation, similarly to skip operation performed in the transmitter.

Figure 48:
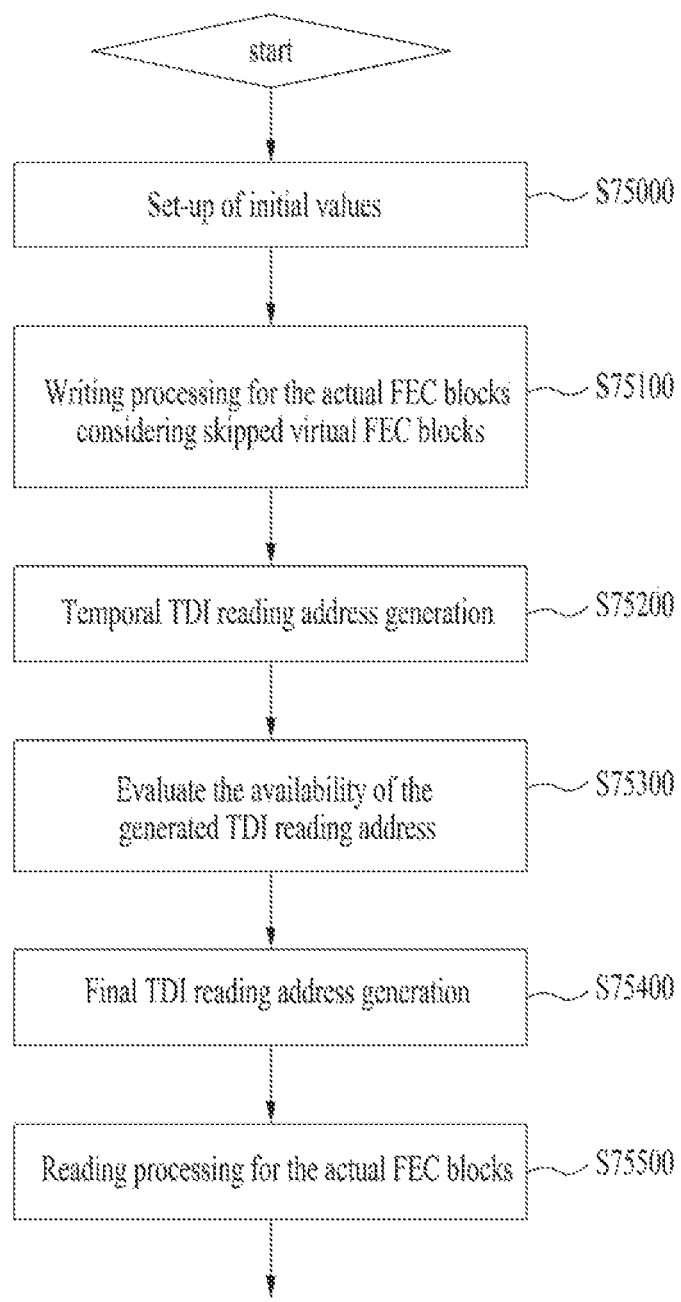
FIG. 48 is a flowchart illustrating a time deinterleaving process according to an embodiment of the present invention.

FIG. 48 is a flowchart illustrating a time deinterleaving process according to an embodiment of the present invention.

A time deinterleaver according to an embodiment of the present invention can setup initial values (S75000).

Then, the time deinterleaver according to an embodiment of the present invention can perform writing operation on actual FEC blocks in consideration of virtual FEC blocks (S75100).

Subsequently, the time deinterleaver according to an embodiment of the present invention can generate a temporal TDI reading address (S75200).

The time deinterleaver according to an embodiment of the present invention can evaluate the availability of the generated TDI reading address (S75300). Then, the time deinterleaver according to an embodiment of the present invention can generate a final TDI reading address (S75400).

Subsequently, the time deinterleaver according to an embodiment of the present invention can read the actual FEC blocks (S75500).

Figure 49:
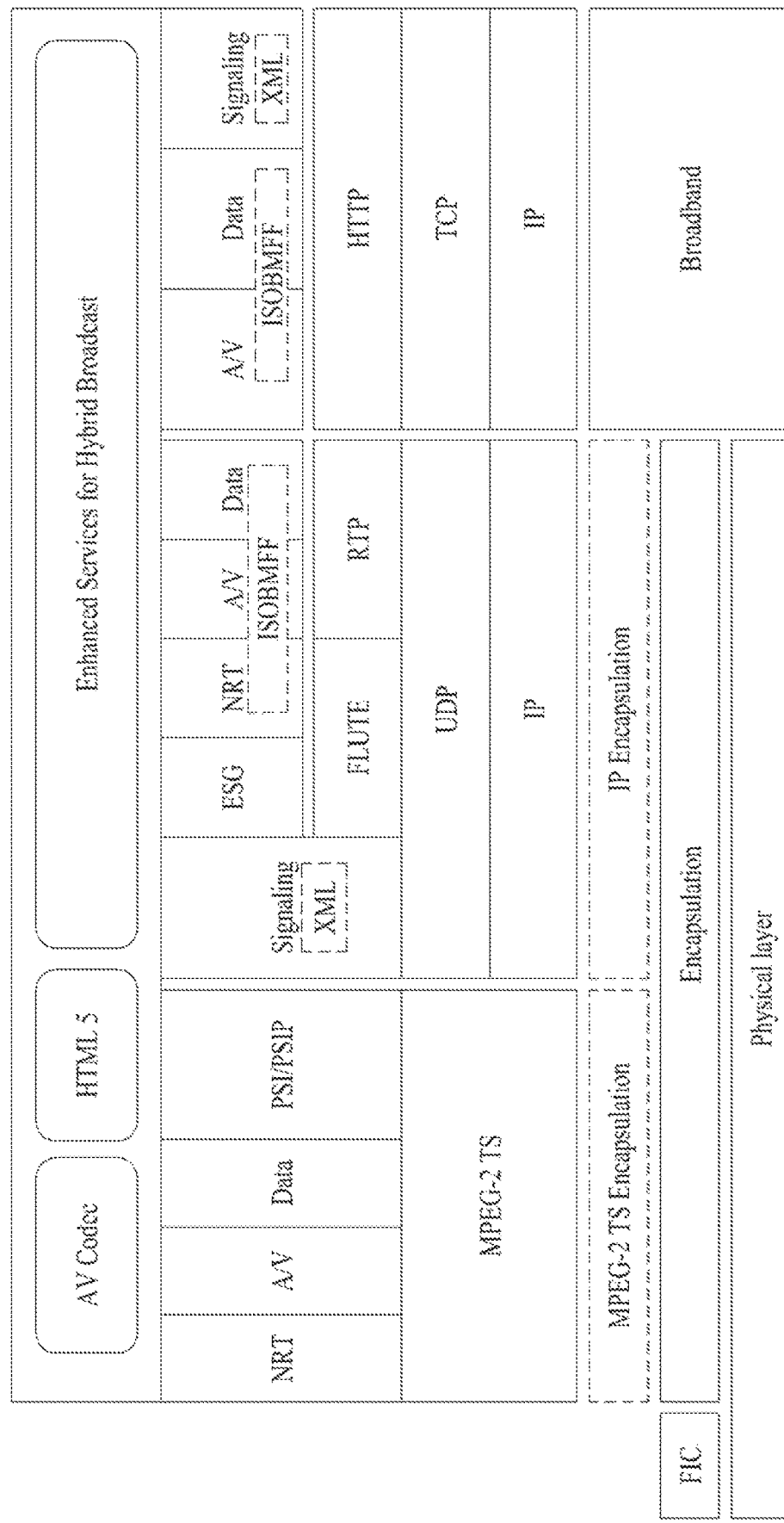
FIG. 49 is a diagram showing a protocol stack supporting a broadcast service according to one embodiment of the present invention.

FIG. 49 is a diagram showing a protocol stack supporting a broadcast service according to one embodiment of the present invention.

The broadcast service according to one embodiment of the present invention may provide not only audio/video (A/V) data but also additional services such as an HTML5 application, an interactivity service, an ACR service, a second screen service and a personalization service.

Such a broadcast service may be transmitted via a physical layer which is a broadcast signal of a terrestrial wave, a satellite, etc. In addition, the broadcast service according to one embodiment of the present invention may be transmitted via an Internet communication network (broadband).

When the broadcast service is transmitted via the physical layer which is the broadcast signal of the terrestrial wave, the satellite, etc., a broadcast reception apparatus may demodulate a broadcast signal to extract an encapsulated MPEG-2 transport stream (TS) and an encapsulated IP datagram. The broadcast reception apparatus may extract a user datagram protocol (UDP) datagram from the IP datagram. The broadcast reception apparatus may extract signaling information from the UDP datagram. At this time, the signaling information may be in XML format. In addition, the broadcast reception apparatus may extract an asynchronous layered coding/layered coding transport (ALC/LCT) packet from the UDP datagram. The broadcast reception apparatus may extract a file delivery over unidirectional transport (FLUTE) packet from the ALC/LCT packet. At this time, the FLUTE packet may include real-time audio/video/subtitle data, non-real time (NRT) data and electronic service guide (ESG) data. In addition, the broadcast reception apparatus may extract a real-time transport protocol (RTCP) packet and an RTP control protocol (RTCP) packet from the UDP datagram. The broadcast reception apparatus may extract A/V data and supplementary data from the real-time transport packet such as the RTP/RTCP packet. At this time, at least one of the NRT data, the A/V data and the supplementary data may be in ISO base media file format (BMFF). In addition, the broadcast reception apparatus may extract signaling information such as NRT data, A/V or PSI/PSIP from the MPEG-2 TS packet or the IP packet. At this time, the signaling information may be in XML or binary format.

When the broadcast service is transmitted via the Internet communication network (broadband), the broadcast reception apparatus may receive an IP packet from the Internet communication network. The broadcast reception apparatus may extract a TCP packet from the IP packet. The broadcast reception apparatus may extract an HTTP packet from the TCP packet. The broadcast reception apparatus may extract AN, supplementary data, signaling data, etc. from the HTTP packet. At this time, at least one of the A/V and the supplementary data may be in ISO BMFF. In addition, the signaling information may be in XML format.

Figure 50:
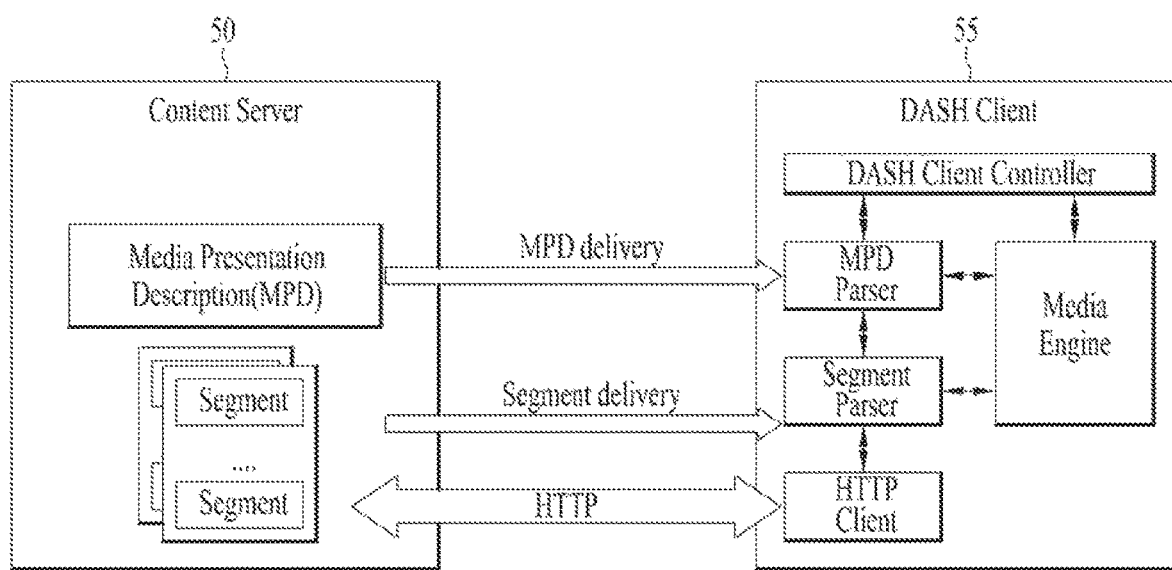
FIG. 50 is a diagram showing a transport layer of a broadcast service according to one embodiment of the present invention.

FIG. 50 is a diagram showing a transport layer of a broadcast service according to one embodiment of the present invention.

Transmission and reception of media content via the IP network according to one embodiment of the present invention is divided into transmission and reception of a transport packet including actual media content and transmission and reception of media content presentation information. The broadcast reception apparatus 100 receives media content presentation information and receives a transport packet including media content. At this time, the media content presentation information indicates information necessary for media content presentation. The media content presentation information may include at least one of spatial information and temporal information necessary for media content presentation. The broadcast reception apparatus 100 presents the media content based on the media content presentation information.

In a detailed embodiment, the media content may be transmitted and received via the IP network according to the MMT standard. At this time, the content server 50 transmits a presentation information (PI) document including the media content presentation information. In addition, the content server 50 transmits an MMT protocol (MMTP) packet including media content according to a request of the broadcast reception apparatus 100. The broadcast reception apparatus 100 receives a PI document. The broadcast reception apparatus 100 receives a transport packet including media content. The broadcast reception apparatus 100 extracts the media content from the transport packet including the media content. The broadcast reception apparatus 100 presents the media content based on the PI document.

In another detailed embodiment, as in the embodiment of FIG. 50, the media content may be transmitted and received via the IP network according to the MPEG-DASH standard.

In FIG. 50, the content server 50 transmits a media presentation description (MPD) including the media content presentation information. In a detailed embodiment, the MPD may be transmitted by an external server other than the content server 50. The content server 50 transmits a segment including media content according to a request of the broadcast reception apparatus 100. The broadcast reception apparatus 100 receives the MPD. The broadcast reception apparatus 100 requests the media content from the content server based on the MPD. The broadcast reception apparatus 100 receives the transport packet including the media content according to the request. The broadcast reception apparatus 100 presents the media content based on the MPD. The broadcast reception apparatus 100 may include a DASH client in the controller 110. The DASH client may include an MPD parser for parsing the MPD, a segment parser for parsing a segment, an HTTP client for transmitting an HTTP request message and receiving an HTTP response message via an IP transmitter/receiver 130 and a media engine for presenting media.

Figure 51:
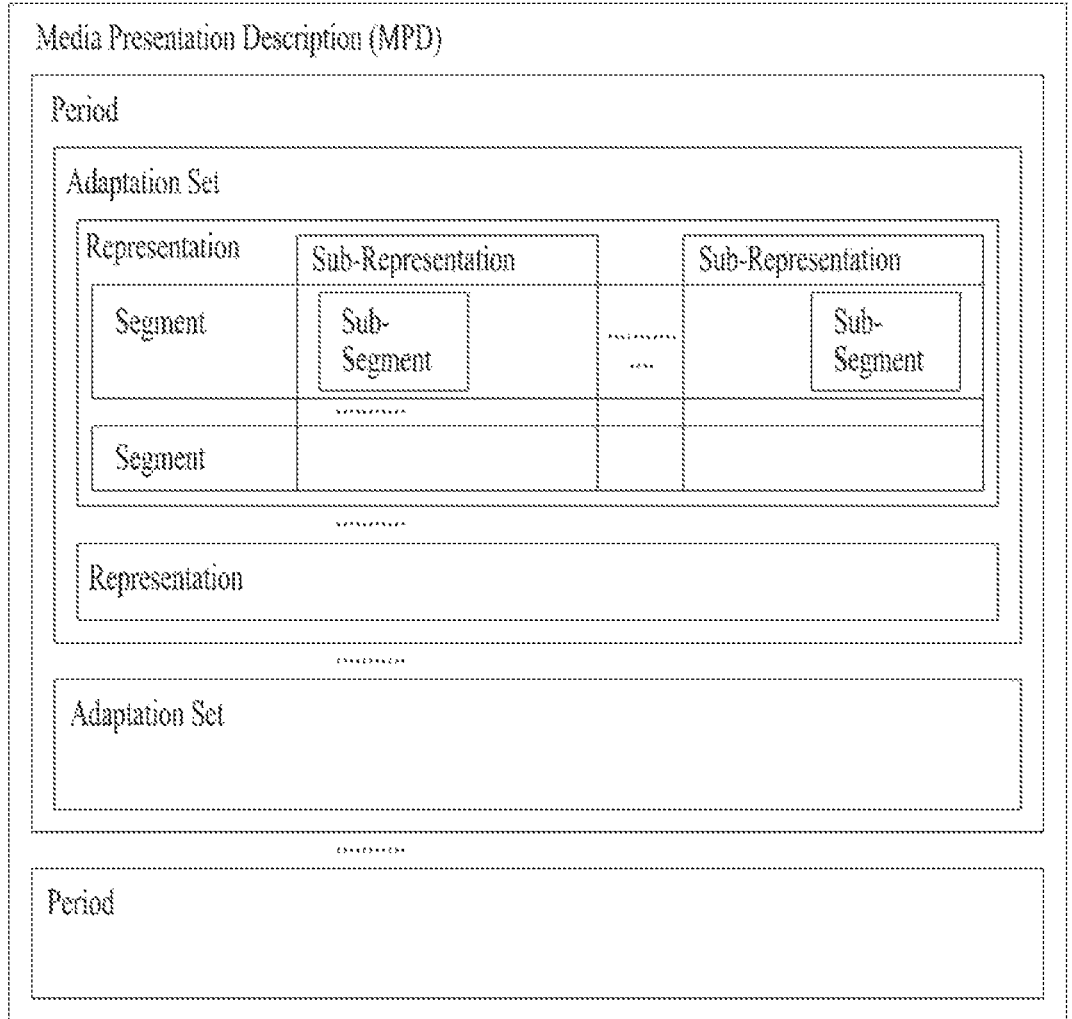
FIG. 51 is a diagram showing the configuration of a media content transmission and reception system via an IP network according to one embodiment of the present invention.

FIG. 51 is a diagram showing the structure of a media presentation description (MPD) according to one embodiment of the present invention. The MPD may include a period element, an adaptation set element and a representation element.

The period element includes information on a period. The MPD may include information on a plurality of periods. The period indicates a consecutive time interval of media content presentation.

The adaptation set element includes information on an adaptation set. The MPD may include information on a plurality of adaptation sets. The adaptation set is a set of media components including one or more interchangeable media content components. The adaptation set may include one or more representations. Each adaptation set may include audio of different languages or subtitles of different languages.

The representation element includes information on a representation. The MPD may include information on a plurality of representations. The representation is a set of one or more media components and a plurality of differently encoded representations may exist in the same media content component. Meanwhile, if bitstream switching is possible, the broadcast reception apparatus 100 may switch from a received representation to another representation based on information updated during media content presentation. In particular, the broadcast reception apparatus 100 may switch a received representation into another representation according to bandwidth environment. The representation may be divided into a plurality of segments.

The segment is a unit of media content data. The representation may be transmitted as a segment or a portion of a segment according to the request of the media content receiver 30 using an HTTP GET or HTTP partial GET method defined in HTTP 1.1 (RFC 2616).

In addition, the segment may include a plurality of sub segments. The sub segment may mean a smallest unit indexed at a segment level. The segment may include an initialization segment, a media segment, an index segment, a bitstream switching segment, etc.

Figure 52:
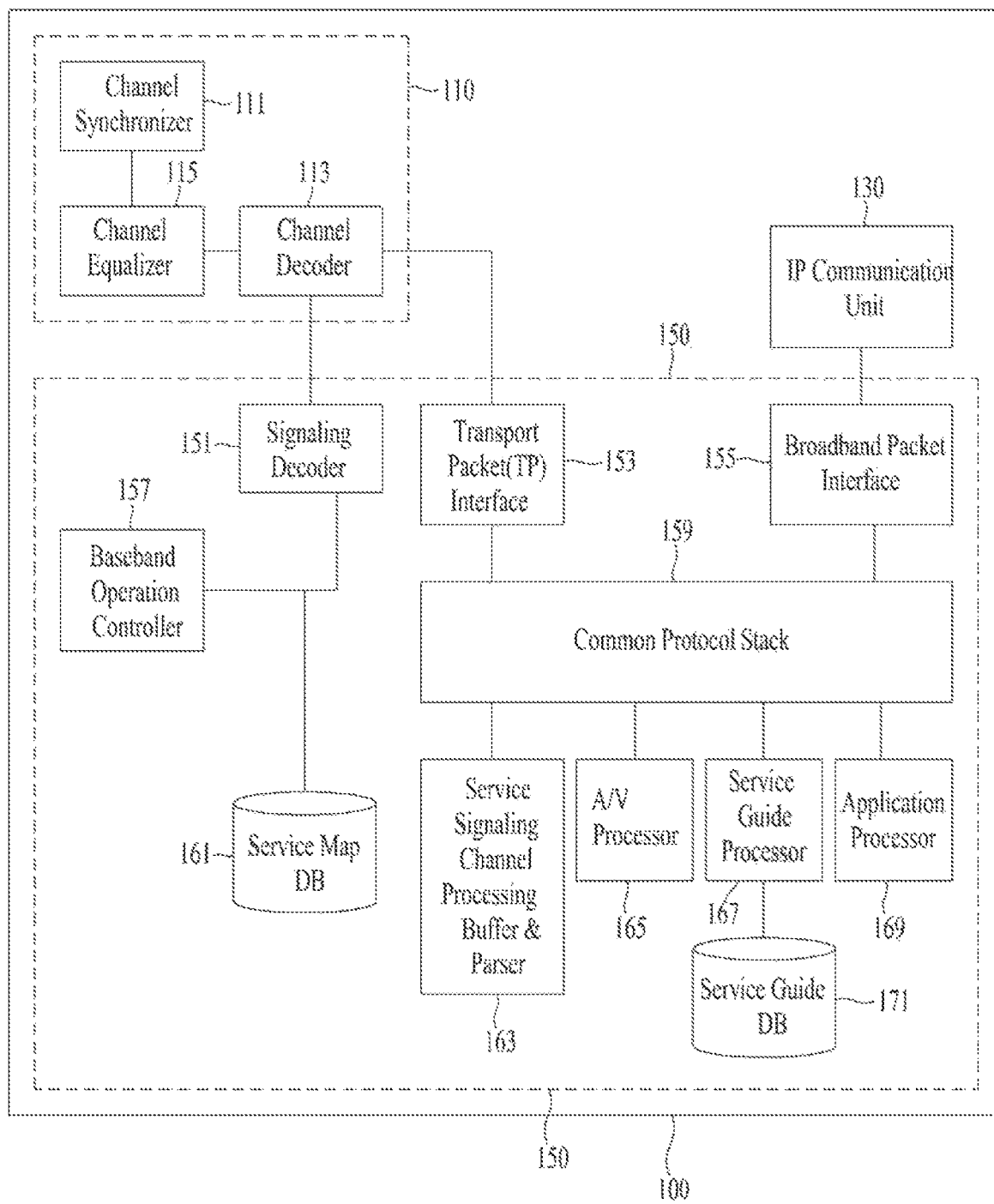
FIG. 52 is a diagram showing the structure of a media presentation description (MPD) according to one embodiment of the present invention.

FIG. 52 is a diagram showing a transport layer of a broadcast service according to one embodiment of the present invention.

A broadcast transmission apparatus 300 may transmit a broadcast service via a broadcast signal composed of a plurality of layers. Among the plurality of layers for transmitting the broadcast service, a transport layer for transmitting and receiving a raw broadcast signal via a physical medium may be referred to as a physical layer. The broadcast transmission apparatus 300 may transmit a broadcast service and broadcast service related data via one or more physical layer pipes (PLPs) over one or a plurality of frequencies. At this time, the PLP is a series of logical data delivery paths capable of being identified on the physical layer. The PLP may also be referred to as a data pipe. One broadcast service may include a plurality of components. At this time, each component may be any one of audio, video and data components. Each broadcaster may transmit an encapsulated broadcast service via one or a plurality of PLPs using the broadcast transmission apparatus 300. More specifically, the broadcaster may transmit a plurality of components included in one service through a plurality of PLPs using the broadcast transmission apparatus 300. Alternatively, the broadcaster may transmit a plurality of components included in one service via one PLP using the broadcast transmission apparatus 300. For example, in the embodiment of FIG. 52, Broadcast #1 may transmit signaling information via one PLP (PLP #0) using the broadcast transmission apparatus 300. In addition, in the embodiment of FIG. 52, Broadcast #1 transmits Component 1 and Component 2 included in a first broadcast service via different PLPs PLP #1 and PLP #2 using the broadcast transmission apparatus 300. In the embodiment of FIG. 52, Broadcast # N transmits Component 1 and Component 2 included in Services #1 via PLP # N. At this time, a real-time broadcast service may be encapsulated into any one of IP, user datagram protocol (UDP) and protocol for real-time content transmission, e.g., real-time transport protocol (RTP). Even non-real-time content and non-real-time data may be encapsulated into any one packet of an IP, a user datagram protocol (UDP) and a content transmission protocol, e.g., FLUTE. Accordingly, the physical layer frame transmitted by the broadcast transmission apparatus 300 may include a plurality of PLPs for delivering one or more components. Accordingly, the broadcast reception apparatus 100 should confirm all PLPs in order to scan the broadcast service for acquiring broadcast service connection information. Therefore, there is a need for a broadcast transmission method and a broadcast reception method for enabling the broadcast reception apparatus 100 to efficiently scan the broadcast service.

Figure 53:
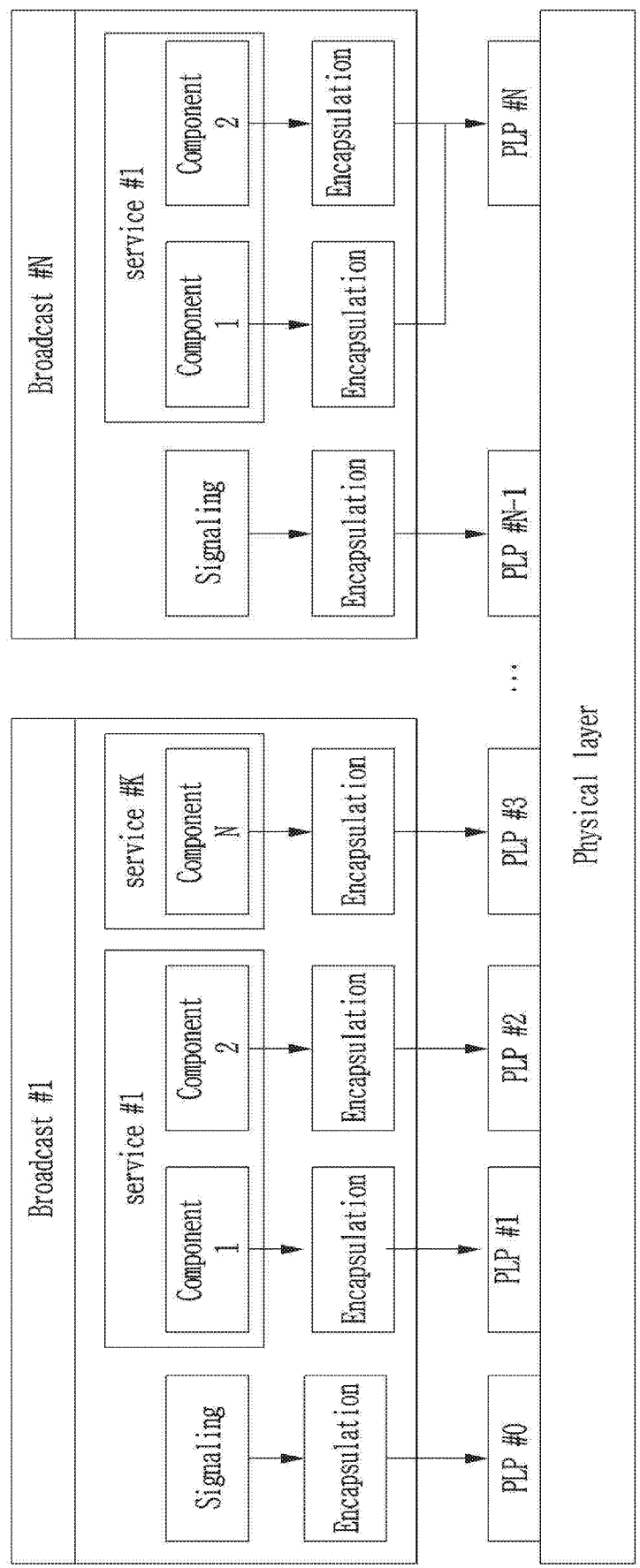
FIG. 53 is a diagram showing the configuration of a broadcast reception apparatus according to one embodiment of the present invention.

FIG. 53 is a diagram showing the configuration of a broadcast reception apparatus according to one embodiment of the present invention.

In the embodiment of FIG. 53, the broadcast reception apparatus 100 includes a receiver 120 and a controller 150. The receiver 120 includes a broadcast receiver 110 and an Internet protocol (IP) communication unit 130.

The broadcast receiver 110 includes a channel synchronizer 111, a channel equalizer 113 and a channel decoder 115.

The channel synchronizer 110 synchronizes a symbol frequency with timing in a manner that a broadcast signal received at baseband can be decoded.

The channel equalizer 113 compensates for distortion of the synchronized broadcast signal. More specifically, the channel equalizer 113 compensates for distortion of the synchronized broadcast signal by multipath, Dopper effect, etc.

The channel decoder 115 decodes the broadcast signal, distortion of which is compensated for. More specifically, the channel decoder 115 extracts a transport frame from the broadcast signal, distortion of which is compensated for. At this time, the channel decoder 115 may perform forward error correction (FEC).

The IP communication unit 130 receives and transmits data via an Internet network.

The controller 150 includes a signaling decoder 151, a transport packet interface 153, a broadband packet interface 155, a baseband operation controller 157, a common protocol stack 159, a service map database 161, a service signaling channel processing buffer and parser 163, an A/V processor 165, a broadcast service guide processor 167, an application processor 169 and a service guide database 171.

The signaling decoder 151 decodes the signaling data of the broadcast signal.

The transport packet interface 153 extracts a transport packet from the broadcast signal. At this time, the transport packet interface 153 may extract data such as signaling information or an IP datagram from the extracted transport packet.

The broadband packet interface 155 extracts an IP packet from the data received from the Internet network. At this time, the broadband packet interface 155 may extract signaling information or an IP datagram from the IP packet.

The baseband operation controller 157 controls operation related to reception of broadcast information from the baseband.

The common protocol stack 159 extracts audio or video from the transport packet.

The A/V processor 547 processes audio or video.

The service signaling channel processing buffer and parser 163 parses and buffers signaling information for signaling a broadcast service. More specifically, the service signaling channel processing buffer and parser 163 may parse and buffer signaling information for signaling the broadcast service from the IP datagram.

The service map database 165 stores a broadcast service list including information on broadcast services.

The service guide processor 167 processes terrestrial broadcast service guide data of the program of a terrestrial broadcast service.

The application processor 169 extracts and processes application related information from the broadcast signal.

The service guide database 171 stores program information of the broadcast service.

Figure 54:
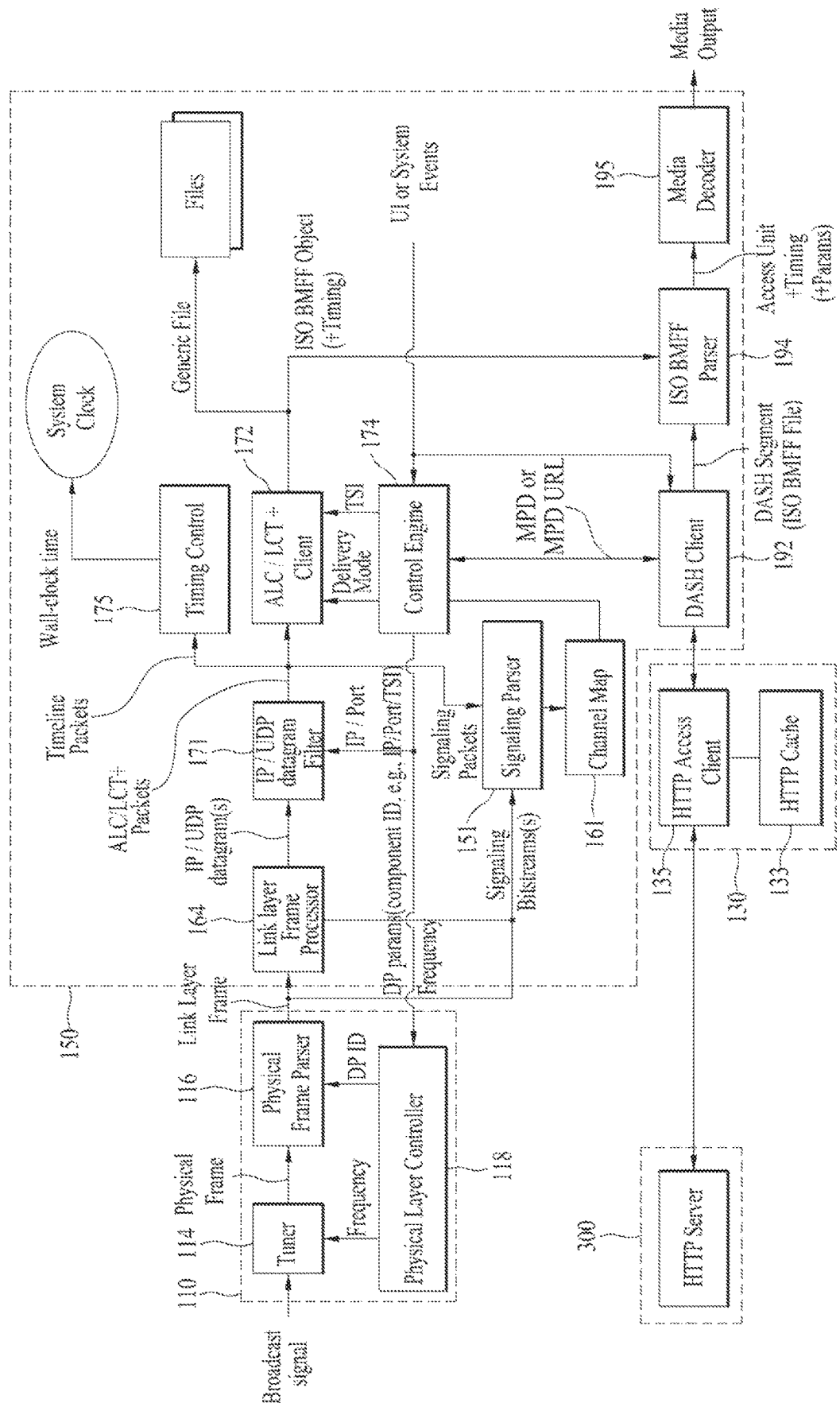
FIGS. 54 to 55 are diagrams showing the configuration of a broadcast reception apparatus according to another embodiment of the present invention.
Figure 55:
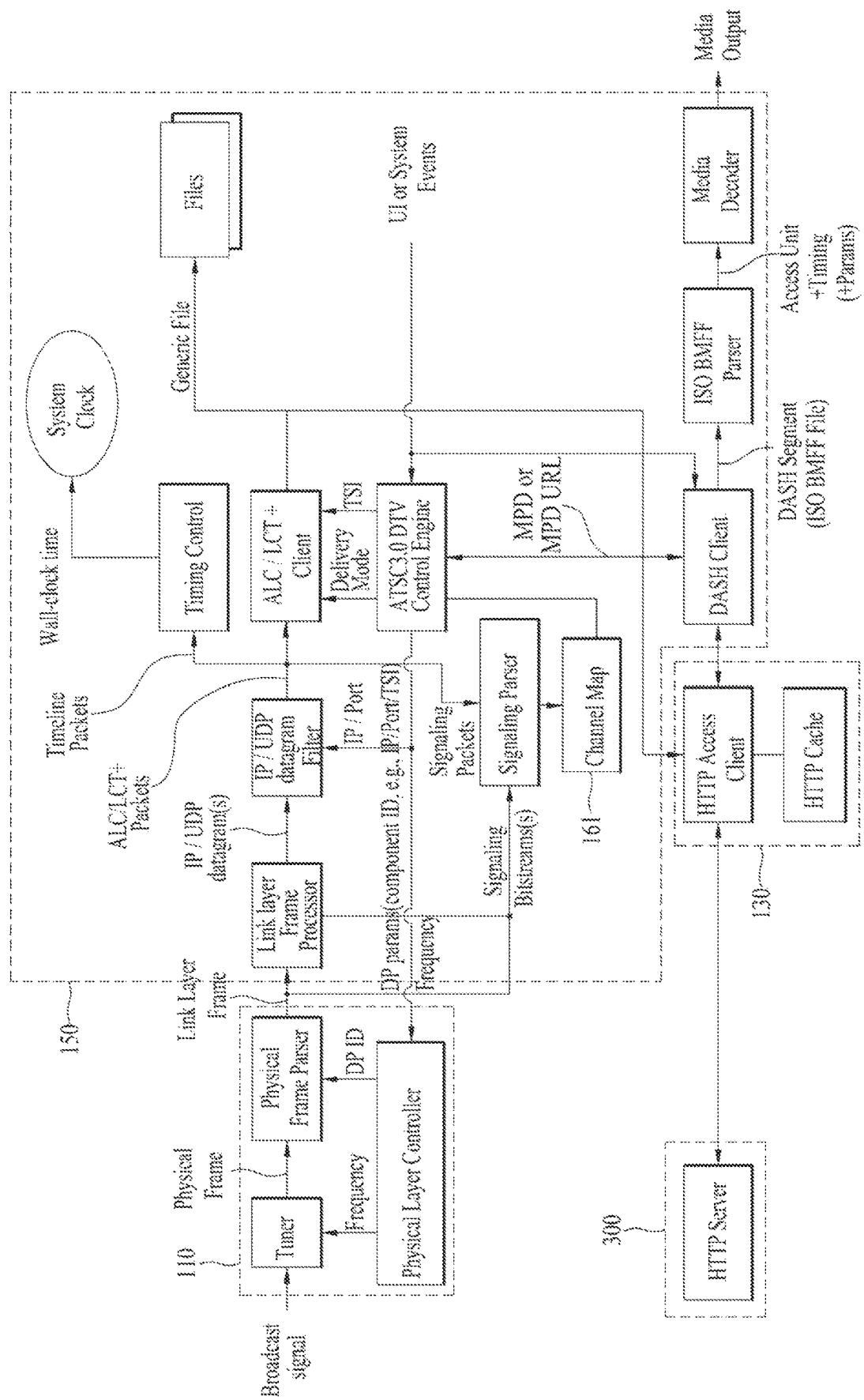

FIGS. 54 to 55 are diagrams showing the configuration of a broadcast reception apparatus according to another embodiment of the present invention.

In the embodiment of FIGS. 54 to 55, the broadcast reception apparatus 100 includes a broadcast receiver 110, an Internet protocol communication unit 130 and a controller 150.

The broadcast receiver 110 may include a tuner 114, a physical frame parser 116 and a physical layer controller 118.

The tuner 114 receives a broadcast signal via a broadcast channel and extracts a physical frame. The physical frame is a transmission unit of a physical layer. The physical frame parser 116 parses the received physical frame and acquires a link layer frame.

The physical layer controller 118 controls operation of the tuner 114 and the physical frame parser 116. In one embodiment, the physical layer controller 118 may control the tuner 114 using RF information of the broadcast channel. More specifically, when the physical layer controller 118 transmits frequency information to the tuner 114, the tuner 114 may acquire the physical frame corresponding to the received frequency information from the broadcast signal.

In another embodiment, the physical layer controller 118 may control operation of the physical layer parser 116 via the identifier of a physical layer pipe. More specifically, the physical layer controller 118 transmits identification information for identifying a specific physical layer pipe among a plurality of physical layer pipes configuring the physical layer pipe to the physical frame parser 116. The physical frame parser 116 may identify the physical layer pipe based on the received identification information and acquire a link layer frame from the identified physical layer pipe.

The controller 150 includes a link layer frame parser 164, an IP/UDP datagram filter 171, a DTV control engine 174, an ALC/LCT+ client 172, a timing control unit 175, a DASH client 192, an ISO BMFF parser 194 and a media decoder 195.

The link layer frame parser 164 extracts data from the link layer frame. More specifically, the link layer frame parser 164 may acquire link layer signaling from the link layer frame. In addition, the link layer frame parser 164 may acquire an IP/UDP datagram from the link layer frame.

The IP/UDP datagram filter 171 filters a specific IP/UDP datagram from the IP/UDP datagram received from the link layer frame parser 164.

The ALC/LCT+ client 172 processes an application layer transport packet. The application layer transport packet may include an ALC/LCT+ packet. More specifically, the ALC/LCT+ client 172 may collect a plurality of application layer transport packets and generate one or more ISO BMFF media file format objects.

The timing control unit 175 processes a packet including system time information. The timing control unit 175 controls a system clock according to the processed result.

The DASH client 182 processes real-time streaming or adaptive media streaming. More specifically, the DASH client 192 may process adaptive media streaming based on the HTTP and acquires a DASH segment. At this time, the DASH segment may be in the form of an ISO BMFF object.

The ISO BMFF parser 194 extracts audio/video data from the ISO BMFF object received from the DASH client 192. At this time, the ISO BMFF parser 194 may extract audio/video data in access units. In addition, the ISO BMFF 194 may acquire timing information for audio/video from the ISO BMFF object.

The media decoder 195 decodes the received audio and video data. In addition, the media decoder 195 presents the decoded result via a media output unit.

The DTV control engine 174 is an interface between modules. More specifically, the DTV control engine 174 may deliver parameters necessary for operation of each module to control operation of each module.

The Internet protocol communication unit 130 may include an HTTP access client 135. The HTTP access client 135 may transmit/receive a request or a response to the request to/from an HTTP server.

Figure 56:
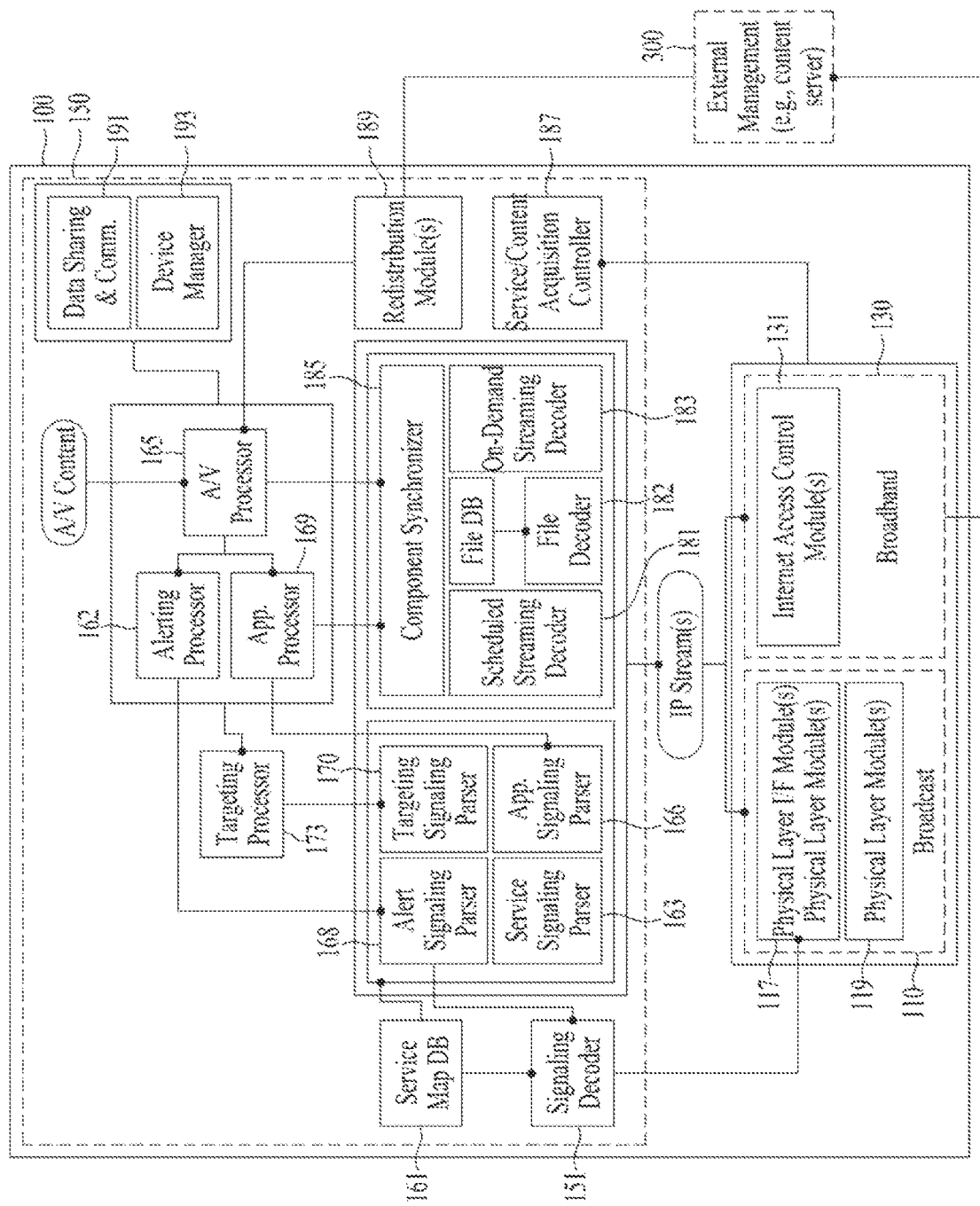
FIG. 56 is a diagram showing the configuration of a broadcast reception apparatus according to another embodiment of the present invention.

FIG. 56 is a diagram showing the configuration of a broadcast reception apparatus according to another embodiment of the present invention.

In the embodiment of FIG. 56, the broadcast reception apparatus 100 includes a broadcast receiver 110, an Internet protocol (IP) communication unit 130 and a controller 150.

The broadcast receiver 110 may include one or a plurality of processors, one or a plurality of circuits and one or a plurality of hardware modules for performing a plurality of functions performed by the broadcast receiver 110. More specifically, the broadcast receiver 110 may be a system on chip (SOC) in which several semiconductor parts are integrated. At this time, the SOC may be a semiconductor device in which various multimedia parts such as graphics, audio, video, modem, etc., a processor, and a semiconductor memory such as a DRAM are integrated. The broadcast receiver 110 may include a physical layer module 119 and a physical layer IP frame module 117. The physical layer module 119 receives and processes a broadcast related signal via a broadcast channel of a broadcast network. The physical layer IP frame module 117 converts a data packet of an IP datagram acquired from the physical layer module 119 into a specific frame. For example, the physical layer module 119 may convert the IP datagram, etc. into an RS frame, a GSE, etc.

The IP communication unit 130 may include one or a plurality of processors, one or a plurality of circuits and one or a plurality of hardware modules for performing a plurality of functions performed by the IP communication unit 130. More specifically, the IP communication unit 130 may be a system on chip (SOC) in which several semiconductor parts are integrated. At this time, the SOC may be a semiconductor device in which various multimedia parts such as graphics, audio, video, modem, etc., a processor, and a semiconductor memory such as a DRAM are integrated. The IP communication unit 130 may include an Internet access control module 131. The Internet access control module 131 controls operation of the broadcast reception apparatus 100 for acquiring at least one of a service, content and signaling data via an Internet communication network (broadband).

The controller 150 may include one or a plurality of processors, one or a plurality of circuits and one or a plurality of hardware modules for performing a plurality of functions performed by the controller 150. More specifically, the controller 150 may be a system on chip (SOC) in which several semiconductor parts are integrated. At this time, the SOC may be a semiconductor device in which various multimedia parts such as graphics, audio, video, modem, etc., a processor, and a semiconductor memory such as a DRAM are integrated. The controller 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alert processor 162, an application processor 169, a scheduled streaming decoder 181, a file decoder 182, a user request streaming decoder 183, a file database 184, a component synchronizer 185, a service/content acquisition controller 187, a redistribution module 189, a device manager 193 and a data sharing unit 191.

The service/content acquisition controller 187 controls operation of a receiver for acquiring a service, content and signaling data related to the service or content acquired via the broadcast network or the Internet communication network.

The signaling decoder 151 decodes the signaling information.

The service signaling parser 163 parses the service signaling information.

The application signaling parser 166 extracts and parses the signaling information related to the service. At this time, the signaling information related to the service may be signaling information related to service scan. In addition, the signaling information related to the service may be signaling information related to the content provided via the service.

The alert signaling parser 168 extracts and parses the signaling information related to alert.

The targeting signaling parser 170 extracts and parses information for personalization of the service or content or information for signaling targeting information.

The targeting processor 173 processes information for personalizing the service content.

The alert processor 162 processes signaling information related to alert.

The application processor 169 controls execution of an application and application related information. More specifically, the application processor 169 processes the state of the downloaded application and display parameters.

The A/V processor 161 processes operation related to rendering of audio/video based on the decoded audio or video, application data, etc.

The scheduled streaming decoder 181 decodes scheduled streaming which is content streamed according to the schedule previously decided by a content provider such as a broadcaster.

The file decoder 182 decodes the decoded file. In particular, the file decoder 182 decodes the file downloaded via the Internet communication network.

The user request streaming decoder 183 decodes content (on demand content) provided by a user request.

The file database 184 stores the file. More specifically, the file database 184 may store the file downloaded via the Internet communication network.

The component synchronizer 185 synchronizes content or services. More specifically, the component synchronizer 185 synchronizes the presentation time of the content acquired via at least one of the scheduled streaming decoder 181, the file decoder 182 and the user request streaming decoder 183.

The service/content acquisition controller 187 controls operation of the receiver for acquiring at least one of a service, content and signaling information related to the service or content.

The redistribution module 189 performs operation for supporting acquisition of at least one of the service, content, information related to the service and information related to the content when the service or the content is not received via the broadcast network. More specifically, the redistribution module may request at least one of the service, the content, the information related to the service and the information related to the content from an external management device 300. At this time, the external management device 300 may be a content server.

The device manager 193 manages a connectable external device. More specifically, the device manager 193 may perform at least one of addition, deletion and update of the external device. In addition, the external device may be connected to and exchange data with the broadcast reception apparatus 100.

The data sharing unit 191 may perform data transmission operation between the broadcast reception apparatus 100 and the external device and processes exchange related information. More specifically, the data sharing unit 191 may transmit A/V data or signaling information to the external device. In addition, the data sharing unit 191 may receive A/V data or signaling information from the external device.

Figure 57:
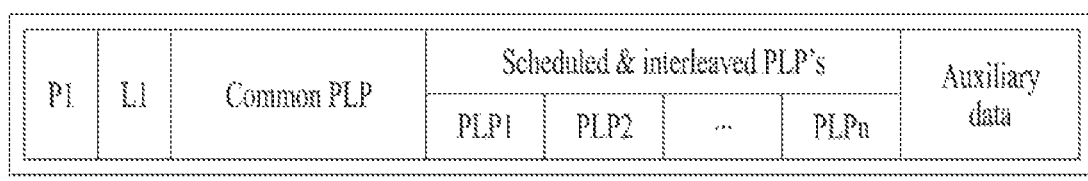
FIG. 57 is a diagram showing a broadcast transport frame according to one embodiment of the present invention.

FIG. 57 is a diagram showing a broadcast transport frame according to one embodiment of the present invention.

In the embodiment of FIG. 57, the broadcast transport frame includes a P1 part, an L1 part, a common PLP part, an interleaved PLP (scheduled & interleaved PLP) part and an auxiliary data part.

In the embodiment of FIG. 57, the broadcast transmission apparatus transmits information on transport signal detection via the P1 part of the broadcast transport frame. In addition, the broadcast transmission apparatus may transmit tuning information for broadcast signal tuning via the P1 part.

In the embodiment of FIG. 57, the broadcast transmission apparatus transmits the configuration of the broadcast transport frame and the characteristics of each PLP via the L1 part. At this time, the broadcast reception apparatus 100 may decode the L1 part based on P1 and acquire the configuration of the broadcast transport frame and the characteristics of each PLP.

In the embodiment of FIG. 57, the broadcast transmission apparatus may transmit information commonly applied to the PLPs via the common PLP part. According to the detailed embodiment, the broadcast transmission frame may not include the common PLP part.

In the embodiment of FIG. 57, the broadcast transmission apparatus transmits a plurality of components included in a broadcast service via the interleaved PLP part. At this time, the interleaved PLP part includes a plurality of PLPs.

In the embodiment of FIG. 57, the broadcast transmission apparatus may signal information on through which PLP the component configuring the broadcast service is signaled via the L1 part or the common PLP part. The broadcast reception apparatus 100 should decode the plurality of PLPs of the interleaved PLP part in order to acquire the detailed broadcast service information, for broadcast service scan.

Unlike the embodiment of FIG. 57, the broadcast transmission apparatus may transmit a broadcast transport frame including a separate part including information on the component included in the broadcast service and the broadcast service transmitted via the broadcast transport frame. At this time, the broadcast reception apparatus 100 may rapidly acquire the broadcast service and information on the components included in the broadcast service via a separate part. This will be described with reference to FIG. 56.

Figure 58:
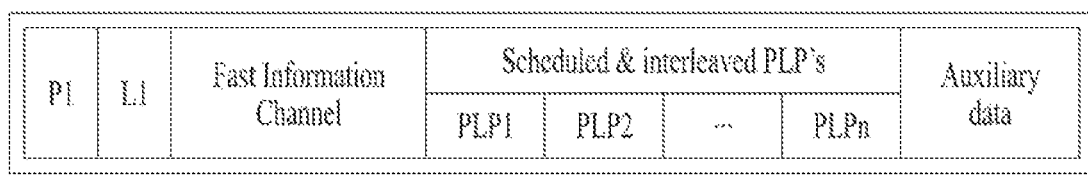
FIG. 58 is a diagram showing a broadcast transport frame according to another embodiment of the present invention.

FIG. 58 is a diagram showing a broadcast transport frame according to another embodiment of the present invention.

In the embodiment of FIG. 58, the broadcast transport frame includes a P1 part, an L1 part, a fast information channel (FIC) part, an interleaved PLP (scheduled & interleaved PLP) part and an auxiliary data part.

Parts other than the FIC part are equal to those of the embodiment of FIG. 57.

The broadcast transmission apparatus transmits fast information via the FIC part. The fast information may include configuration information of the broadcast stream transmitted via the transport frame, brief broadcast service information and service signaling related to the service/component. The broadcast reception apparatus 100 may scan the broadcast service based on the FIC part. More specifically, the broadcast reception apparatus 100 may extract the information on the broadcast service from the FIC part.

Figure 59:
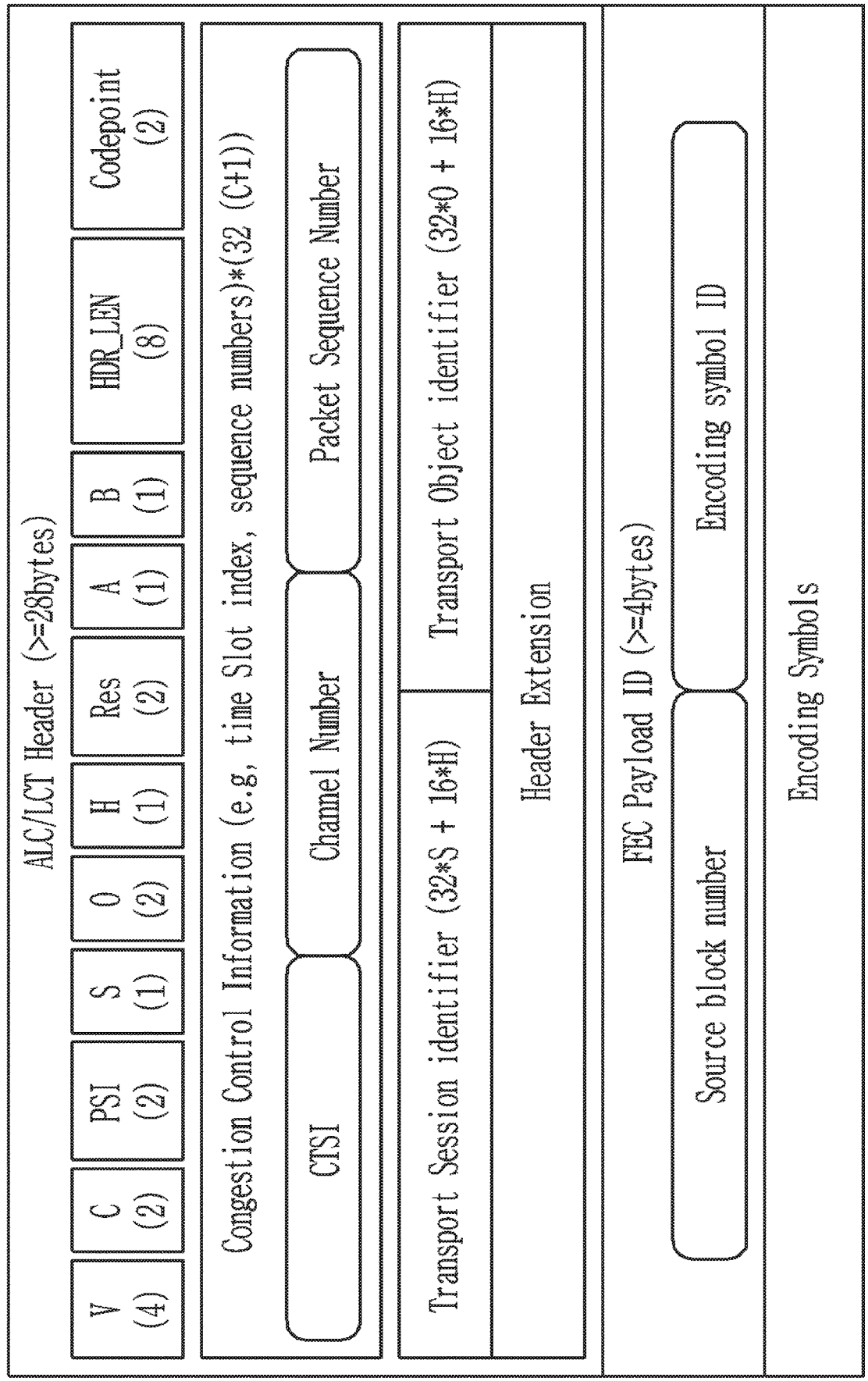
FIG. 59 is a diagram showing the configuration of a transport packet according to one embodiment of the present invention.

FIG. 59 is a diagram showing the configuration of a transport packet according to one embodiment of the present invention. The transport packet shown in FIG. 59 may use a transport protocol supporting reliable data transmission. In a detailed embodiment, the reliable data transmission protocol may be asynchronous layered coding (ALC). In another embodiment, the reliable data transmission protocol may be layered coding transport (LCT).

The packet header according to one embodiment of the present invention may include version information of the packet. More specifically, the packet header may include version information of the transport packet which uses the transport protocol. In the embodiment, the above-described information may be a V field. In addition, the V field may have a size of 4 bits.

In addition, the packet header according to one embodiment of the present invention may include information associated with the length of congestion control information. More specifically, the packet header may include the length of the congestion control information and information on a multiple of the basic unit of the length of the congestion control information.

In a detailed embodiment, the above-described information may be a C field. In one embodiment, the C field may be set to 0x00. In this case, the length of the congestion control information is 32 bits. In another embodiment, the C field may be set to 0x01. In this case, the length of the congestion control information may be 64 bits. In another embodiment, the C field may be set to 0x02. In this case, the length of the congestion control information may be 96 bits. In another embodiment, the C field may be set to 0x03. In this case, the length of the congestion control information may be 128 bits. The C field may have a size of 2 bits.

In addition, the packet header according to one embodiment may include information specialized for the protocol. In a detailed embodiment, the above-described information may be a PSI field. In addition, the PSI field may have a size of 2 bits.

In addition, the packet header according to one embodiment of the present invention may include information associated with the length of the field indicating the identification information of the transport session. More specifically, the packet header may include multiple information of the field indicating the identification information of the transport session. The above-described information may be an S field. The S field may have a size of 1 bit.

In addition, the packet header according to one embodiment of the present invention may include information associated with the length of the field indicating the identification information of the transport object. More specifically, the packet header may include multiple information multiplied with the basic unit of the length of the identification information of the transport object. The above-described information may be an O field. The O field may have a size of 2 bits.

In addition, the packet header according to one embodiment of the present invention may include additional information associated with the length of the field indicating the identification information of the transport session. The packet header may include additional information associated with the length of the field indicating the identification information of the transport object. The additional information may be information indicating whether half-word is added. Since the field indicating the identification information of the transport packet and the field indicating the identification information of the transport object should be present, the S field and the H field or the O field and the H field may not simultaneously indicate 0 (zero).

In addition, the packet header according to one embodiment of the present invention may include information indicating that the session is finished or is about to be finished. The above-described information may be an A field. In a detailed embodiment, the A field may be set to 1 in order to indicate that the session is finished or is about to be finished. Accordingly, generally, the A field may be set to 0. When the broadcast transmission apparatus sets the A field to 1, it is indicated that the last packet is being transmitted via the session. When the A field is set to 1, the broadcast transmission apparatus should maintain the A field to 1 until transmission of all packets following the corresponding packet is finished. In addition, the broadcast reception apparatus may recognize that the broadcast transmission apparatus is about to stop packet transmission via the session when the A field is set to 1. In other words, the broadcast reception apparatus may recognize that packet transmission is no longer performed when the A field is set to 1. In one embodiment, the A field may have a size of 1 bit.

In addition, the packet header according to one embodiment of the present invention may include information indicating that object transmission is finished or is about to be finished. The above-described information may be a B field. In a detailed embodiment, the broadcast transmission apparatus may set the B field to 1 when object transmission is about to be finished. Accordingly, generally, the B field may be set to 0. When the information for identifying the transport object is not present in the transport packet, the B field may be set to 1. This may indicate that transmission of the object in the session identified by out-of-band information is about to be finished. In addition, the B field may be set to 1 when the last packet for the object is transmitted. In addition, the B field may be set to 1 when the last packet for the object is transmitted for several seconds. The broadcast transmission apparatus should set the B field to 1 until transmission of the packet following the corresponding packet is finished, when the B field of the packet for a specific object is set to 1. The broadcast reception apparatus 100 may recognize that the broadcast transmission apparatus will stop transmission of the packet for the object when the B field is set to 1. In other words, the broadcast reception apparatus 100 may recognize that the object is no longer transmitted via the session, from the B field set to 1. In one embodiment, the B field may have a size of 1 bit.

In addition, the packet header according to one embodiment of the present invention may include information indicating the total length of the header. The above-described information may be an HDR_LEN field. The HDR_LEN field may be a multiple of 32 bits. In a detailed embodiment, when the HDR_LEN field is set to 5, the total length of the packet header may be 160 bits which is a multiple of 32. In addition, the HDR_LEN field may be 8 bits.

In addition, the packet header according one embodiment of the present invention may include information related to encoding or decoding of the payload included in the corresponding packet. The above-described information may be referred to as a codepoint field. In one embodiment, the codepoint field may have a size of 8 bits.

In addition, the packet header according to one embodiment of the present invention may include congestion control information. The above-described information may be referred to as a congestion control information (hereinafter, CCI) field. In a detailed embodiment, the CCI field may include at least one of a current time slot index (CTSI) field, a channel number field and a packet sequence number field.

In addition, the packet header according to one embodiment of the present invention may include information for identifying the transport session. The above-described information may be a transport session identifier (hereinafter, TSI). In addition, the field in the packet header including TSI information may be a TSI field.

In addition, the packet header according to one embodiment of the present invention may include information for identifying the object transmitted via the transport session. The above-described information may be a transport object identifier (hereinafter, TOI). In addition, the field in the packet header including the TOI information may be a TOI field.

In addition, the packet header according to one embodiment of the present invention may include information for transmitting additional information. The above-described information may be referred to as a header extension field. In one embodiment, the additional information may be time information related to presentation of the transport object. In another embodiment, the additional information may be time information related to decoding of the transport object.

In addition, the transport packet according to one embodiment of the present invention may include payload identification information. In one embodiment, the identification information may be payload identification information associated with a forward error correction (FEC) scheme. Here, FEC is a type of the payload format defined in RFC 5109. The FEC may be used in the RTP or SRTP. The above-described information may be an FEC payload ID field.

In one embodiment, the FEC payload ID field may include information for identifying the source block of the object. The above-described information may be a source block number field. For example, when the source block number field is set to N, the source block in the object may be numbered from 0 to N−1.

In another embodiment, the FEC payload ID field may include information for identifying a specific encoding symbol. The above-described information may be an encoding ID field.

In addition, in one embodiment of the present invention, the transport packet may include data in a payload. The field including the above-described data may be an encoding symbol(s) field. In one embodiment, the broadcast reception apparatus 100 may extract the encoding symbol(s) field and reconfigure the object. More specifically, the data in the encoding symbol(s) field may be generated from the source block transmitted via the packet payload.

Figure 60:
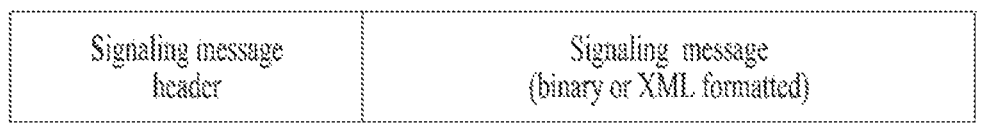
FIG. 60 is a diagram showing the configuration of a service signaling message according to one embodiment of the present invention.

FIG. 60 is a diagram showing the configuration of a service signaling message according to one embodiment of the present invention. More specifically, FIG. 60 shows the syntax of the service signaling message header according to one embodiment of the present invention. The service signaling message according to one embodiment of the present invention may include a signaling message header and a signaling message. At this time, the signaling message may be represented in binary or XML format. In addition, the service signaling message may be included in the payload of the transport protocol packet.

The signaling message header according to the embodiment of FIG. 60 may include the identification information for identifying the signaling message. For example, the signaling message may be in the form of a section. In this case, the identification information of the signaling message may indicate the identifier (ID) of the signaling table section. The field indicating the identification information of the signaling message may be signaling_id. In a detailed embodiment, the signaling_id field may have a size of 8 bits.

The signaling message header according to the embodiment of FIG. 60 may include length information indicating the length of the signaling message. The field indicating the length information of the signaling message may be signaling_length. In a detailed embodiment, the signaling_length field may have a size of 12 bits.

In addition, the signaling message header according to the embodiment of FIG. 60 may include identifier extension information for extending the identifier of the signaling message. At this time, the identifier extension information may be information for identifying signaling along with signaling identifier information. The field indicating the identifier extension information of the signaling message may be signaling_id_extension.

At this time, the identifier extension information may include protocol version information of the signaling message. The field indicating the protocol version information of the signaling message may be protocol_version. In a detailed embodiment, the protocol_version field may have a size of 8 bits.

In addition, the signaling message header according to the embodiment of FIG. 60 may include the version information of the signaling message. The version information of the signaling message may be changed when the information included in the signaling message is changed. The field indicating the version information of the signaling message may be version_number. In a detailed embodiment, the version_number field may have a size of 5 bits.

In addition, the signaling message header according to the embodiment of FIG. 60 may include information indicating whether the signaling message is currently available. The field indicating whether the signaling message is available may be current_next_indicator. For example, when the current_next_indicator field is 1, the current_next_indicator field may indicate that the signaling message is available. As another example, when the current_next_indicator field is 0, the current_next_indicator field may indicate that the signaling message is not available and another signaling message including the same signaling identification information, signaling identifier extension information or fragment number information is available.

In addition, the signaling message header according to the embodiment of FIG. 60 may include fragment number information of the signaling message. One signaling message may be divided into a plurality of fragments and transmitted. Accordingly, information for identifying the plurality of fragments by the receiver may be fragment number information. The field indicating the fragment number information may be a fragment_number field. In a detailed embodiment, the fragment_number field may have a size of 8 bits.

In addition, the signaling message header according to the embodiment of FIG. 60 may include number information of a last fragment when one signaling message is divided into a plurality of fragments. For example, when information on a last fragment number is 3, this indicates that the signaling message is divided into three fragments. In addition, this may indicate that the fragment including the fragment number of 3 includes the last data of the signaling message. The field indicating the number information of the last fragment may be last_fragment_number. In a detailed embodiment, the last_fragment_number field may have a size of 8 bits.

FIG. 61 is a diagram showing the configuration of a service signaling message according to one embodiment of the present invention. More specifically, FIG. 61 shows the syntax of the service signaling message header according to one embodiment of the present invention. The service signaling message according to one embodiment of the present invention may include a signaling message header and a signaling message. At this time, the signaling message may be represented in binary or XML format. In addition, the service signaling message may be included in the payload of the transport protocol packet.

The signaling message header according to the embodiment of FIG. 61 may include identifier information for identifying the signaling message. For example, the signaling message may be in the form of a section. In this case, the identifier information of the signaling message may indicate the identifier (ID) of the signaling table section. The field indicating the identifier information of the signaling message may be signaling_id. In a detailed embodiment, the signaling_id field may have a size of 8 bits.

The signaling message header according to the embodiment of FIG. 61 may include length information indicating the length of the signaling message. The field indicating the length information of the signaling message may be signaling_length. In a detailed embodiment, the signaling_length field may have a size of 12 bits.

The signaling message header according to the embodiment of FIG. 61 may have identifier extension information for extending the identifier of the signaling message. At this time, the identifier extension information may be information for identifying signaling along with signaling identifier information. The field indicating the identifier extension information of the signaling message may be signaling_id_extension.

At this time, the identifier extension information may include protocol version information of the signaling message. The field indicating the protocol version information of the signaling message may be protocol_version. In a detailed embodiment, the protocol_version field may have a size of 8 bits.

In addition, the signaling message header according to the embodiment of FIG. 61 may include the version information of the signaling message. The version information of the signaling message may be changed when the information included in the signaling message is changed. The field indicating the version information of the signaling message may be version_number. In a detailed embodiment, the version_number field may have a size of 5 bits.

In addition, the signaling message header according to the embodiment of FIG. 61 may include information indicating whether the signaling message is currently available. The field indicating whether the signaling message is available may be current_next_indicator. For example, when the current_next_indicator field is 1, the current_next_indicator field may indicate that the signaling message is available. As another example, when the current_next_indicator field is 0, the current_next_indicator field may indicate that the signaling message is not available and another signaling message including the same signaling identification information, signaling identifier extension information or fragment number information is available.

In addition, the signaling message header according to the embodiment of FIG. 61 may include the format information of the signaling message included in the payload. As described above, the signaling message may be represented in binary or XML format. In addition, the signaling message may be represented in other formats. Accordingly, the format information may indicate the format of the signaling message included in the payload and may indicate binary, XML, etc., for example. The field indicating the format information may be a payload_format field. In a detailed embodiment, the payload_format field may have a size of 2 bits.

In addition, the signaling message header according to the embodiment of FIG. 61 may include valid time information of the signaling message included in the payload. The valid time information of the signaling message may include information on the valid time of the signaling message. After the time defined in this field, the signaling message is no longer valid. The field indicating the valid time information may be an expiration field. In a detailed embodiment, the expiration field may have a size of 32 bits.

In addition, the signaling message header according to the embodiment of FIG. 61 may include fragment number information of the signaling message. One signaling message may be divided into a plurality of fragments and transmitted. Information for identifying the plurality of fragments by the receiver may be fragment number information. The field indicating the fragment number information may be a fragment_number field. In a detailed embodiment, the fragment_number field may have a size of 8 bits.

In addition, the signaling message header according to the embodiment of FIG. 61 may include number information of a last fragment when one signaling message is divided into a plurality of fragments. For example, when information on a last fragment number is 3, this indicates that the signaling message is divided into three fragments. In addition, this may indicate that the fragment including the fragment number of 3 includes the last data of the signaling message. The field indicating the number information of the last fragment may be last_fragment_number. In a detailed embodiment, the last_fragment_number field may have a size of 8 bits.

FIG. 62 is a diagram showing the configuration of a broadcast service signaling message in a next generation broadcast system according to one embodiment of the present invention. The broadcast service signaling message according to one embodiment is for a broadcast service signaling method for enabling the broadcast reception apparatus 100 to receive at least one of a broadcast service and content in the next generation broadcast system.

The broadcast service signaling method according to the embodiment of FIG. 62 may be based on the configuration of the signaling message shown in FIG. 60. The broadcast service signaling message according to the embodiment of FIG. 62 may be transmitted via a service signaling channel. At this time, the service signaling channel may be a physical layer pipe for directly transmitting the service signaling information for broadcast service scan without passing through other layers. In a detailed embodiment, the service signaling channel may be referred to as at least one of a fast information channel (FIC), low layer signaling (LLS) and an application layer transport session. The broadcast service signaling message according to the embodiment of FIG. 62 may be in an XML format.

The service signaling message according to the embodiment of FIG. 62 may include information on the number of services included therein. More specifically, one service signaling message may include a plurality of services and include information on the number of services included therein. The information on the number of services may be a num_services field. In a detailed embodiment, the num_services field may have a size of 8 bits.

In addition, the service signaling message according to the embodiment of FIG. 62 may include identifier information of the service. The identifier information may be a service_id field. In a detailed embodiment, the service_id field may have a size of 16 bits.

In addition, the service signaling message according to the embodiment of FIG. 62 may include service type information. The service type information may be a service_type field. In a detailed embodiment, when the service_type field has a value of 0x00, the service type indicated by the signaling message may be a scheduled audio service.

In another embodiment, when the service_type field has a value of 0x01, the service type indicated by the signaling message may be a scheduled audio/video service. At this time, the scheduled audio/video service may be an audio/video service broadcast according to a predetermined schedule.

In another embodiment, when the service_type field has a value of 0x02, the service type indicated by the signaling message may be an on-demand service. At this time, the on-demand service may be an audio/video service presented by the request of the user. In addition, the on-demand service may be a service having a concept opposed to that of the scheduled audio/video service.

In another embodiment, when the service_type field has a value of 0x03, the service type indicated by the signaling message may be an app-based service. At this time, the app-based service is not a real-time broadcast service but is a non-real-time service and is provided via an application. The app-based service may include at least one of a service associated with a real-time broadcast service and a service not associated with the real-time broadcast service. The broadcast reception apparatus 100 may download an application and provide an app-based service.

In another embodiment, when the service_type field has a value of 0x04, the service type indicated by the signaling message may be a rights issuer service. At this time, the rights issuer service may be provided to only a person who has rights to receive a service.

In another embodiment, when the service_type field has a value of 0x05, the service type indicated by the signaling message may be a service guide service. At this time, the service guide service may provide information on a provided service. For example, the information on the provided service may be a broadcast schedule.

In addition, the service signaling message according to the embodiment of FIG. 62 may include service name information. The service name information may be a short_service_name field.

In addition, the service signaling message according to the embodiment of FIG. 62 may include length information of the short_service_name field. The length information of the short_service_name field may be a short_service_name_length field.

In addition, the service signaling message according to the embodiment of FIG. 62 may include may include broadcast service channel number information associated with a service. The associated broadcast service channel number information may be a channel_number field.

In addition, the service signaling message according to the embodiment of FIG. 62 may include data necessary for the broadcast reception apparatus to acquire a timebase or a signaling message according to the transport mode. The data necessary to acquire the timebase or the signaling message may be a bootstrap( ) field.

The transport mode may be at least one of a timebase transport mode and a signaling transmission mode. The timebase transport mode may be a transport mode for timebase including metadata for a timeline used for a broadcast service. The timeline is a series of time information for media content. More specifically, the timeline may be a series of reference times which is a media content presentation criterion. Information on the timebase transport mode may be a timebase_transport_mode field.

In addition, the signaling transmission mode may be a mode for transmitting a signaling message used in a broadcast service. The information on the signaling transport mode may be a signaling_transport_mode field.

FIG. 63 is a diagram showing the meaning of the value of a timebase_transport_mode field and a signaling_transport_mode field in a service signaling message according to one embodiment of the present invention.

The timebase transport mode may include a mode in which the broadcast reception apparatus 100 acquires the timebase of the broadcast service via an IP datagram in the same broadcast stream. According to the embodiment, when the timebase_transport_mode field has a value of 0x00, the timebase_transport_mode field may indicate that the broadcast reception apparatus may acquire the timebase of the broadcast service via the IP datagram in the same broadcast stream.

In addition, the signaling transport mode may include a mode in which the broadcast reception apparatus 100 acquires the signaling message used for the broadcast service via an IP datagram in the same broadcast stream. According to another embodiment, when the signaling_transport_mode field has a value of 0x00, the signaling_transport_mode field may indicate that the broadcast reception apparatus acquires the signaling message used for the broadcast service via the IP datagram in the same broadcast stream. The same broadcast stream may mean the same broadcast stream as the broadcast stream used for the broadcast reception apparatus to receive the current service signaling message. In addition, the IP datagram may be a transport unit in which the component configuring the broadcast service or content is encapsulated according to the Internet protocol. In this case, the bootstrap( ) field of the timebase and the signaling message may follow the shown syntax. The shown syntax may be represented in XML format.

FIG. 64 is a diagram showing the syntax of the bootstrap( ) field when the timebase_transport_mode field and the signaling_transport_mode field have a value of 0x00 in one embodiment of the present invention.

In the embodiment, bootstrap data may include information on an IP address format of an IP datagram including the timebase or the signaling message. The information on the IP address format may be an IP_version_flag field. The information on the IP address format may indicate that the IP address format of the IP datagram is IPv4. In one embodiment, when the information on the IP address format is 0, the information on the IP address may indicate that the IP address format of the IP datagram is IPv4. The information on the IP address format may indicate that the IP address format of the IP datagram is IPv6. In one embodiment, when the information on the IP address format is 1, the information on the IP address may indicate that the IP address format of the IP datagram is IPv6.

In the embodiment, the bootstrap data may include information indicating whether the IP datagram including the timebase or the signaling message includes a source IP address. At this time, the source 1P address may be a source address of the IP datagram. Information indicating whether the IP datagram includes the source IP address may be a source_IP_address_flag field. In one embodiment, when the source_IP_address_flag field is 1, this may indicate that the IP datagram includes the source IP address.

In the embodiment, the bootstrap data may include information indicating whether the IP datagram including the timebase or the signaling message includes a destination IP address. At this time, the destination IP address may be a destination address of the IP datagram. Information indicating whether the IP datagram includes the destination IP address may be a destination_IP_address_flag field. In one embodiment, when the destination_IP_address_flag field is 1, this may indicate that the IP datagram includes the destination IP address.

In the embodiment, the bootstrap data may include source IP address information of the IP datagram including the timebase or the signaling message. The source IP address information may be a source_IP_address field.

In the embodiment of FIG. 63, the bootstrap data may include destination IP address information of the IP datagram including the timebase or the signaling message. The destination IP address information may be a destination_IP_address field.

In the embodiment, the bootstrap data may include information on the number of flow ports of the IP datagram including the timebase or the signaling message. At this time, the port may be a passage for receiving the flow of the IP datagram. The information indicating the number of user datagram protocol (UDP) ports of the IP datagram may be a port_num_count field.

In the embodiment, the bootstrap data may include information on a user data protocol (UDP) port number of the IP datagram including the timebase or the signaling message. The user datagram protocol (UDP) is a communication protocol for unidirectionally sending information via the Internet without exchanging information.

The description now returns to FIG. 63.

The timebase transport mode may include a mode in which the broadcast reception apparatus 100 acquires the timebase of the broadcast service via the IP datagram in a different broadcast stream. According to another embodiment of FIG. 63, when the timebase_transport_mode field has a value of 0x01, the timebase_transport_mode field may indicate that the timebase of the broadcast service is acquired via the IP datagram in the different broadcast stream. The different broadcast stream may mean the broadcast stream different from the broadcast stream for receiving the current service signaling message.

In addition, the signaling transmission mode may include a mode in which the broadcast reception apparatus 100 acquires the signaling message used for the broadcast service via the IP datagram in the different broadcast stream. According to another embodiment, when the signaling_transport_mode field has a value of 0x01, the signaling_transport_mode field may indicate that the signaling message used for the broadcast service is acquired via the IP datagram in the different broadcast stream. In this case, the bootstrap( ) field of the timebase and the signaling message may follow the syntax shown in FIG. 65. The syntax shown in FIG. 65 may be represented in XML format.

The bootstrap data according to the embodiment of FIG. 65 may include identifier information of a broadcaster for transmitting the signaling message. More specifically, the bootstrap data may include unique identifier information of a specific broadcaster for transmitting the signaling message via a specific frequency or a transport frame. The identifier information of the broadcaster may be a broadcasting_id field. In addition, the identifier information of the broadcaster may be identifier information of the transport stream for transmitting the broadcast service.

The description now returns to FIG. 63.

The timebase transport mode may include a mode in which the broadcast reception apparatus 100 acquires the timebase via a session based flow in the same broadcast stream.

According to another embodiment of FIG. 63, when the timebase_transport_mode field has a value of 0x02, this may indicate that the timebase of the broadcast service is acquired via the session based flow in the same broadcast stream. The signaling transport mode may include a mode in which the broadcast reception apparatus 100 acquires the signaling message via a session based flow in the same broadcast stream. The signaling transport mode may include a mode in which the broadcast reception apparatus 100 acquires the signaling message used for the broadcast service via the session based flow in the same broadcast stream. When the signaling_transport_mode field has a value of 0x02, this may indicate that the signaling message used for the broadcast service is acquired via the application layer transport session based flow in the same broadcast stream. At this time, the application layer transport session based flow may be any one of an asynchronous layered coding (ALC)/layered coding transport (LCT) session and a file delivery over unidirectional transport (FLUTE) session.

In this case, the bootstrap( ) field of the timebase and the signaling message may follow the syntax shown in FIG. 66. The syntax shown in FIG. 66 may be represented in XML format.

The bootstrap data according to the embodiment of FIG. 66 may include transport session identifier information of an application layer for transmitting an application layer transport packet including the timebase or the signaling message. At this time, the session for transmitting the transport packet may be any one of an ALC/LCT session and a FLUTE session. The transport session identifier information of the application layer may be a tsi field.

The description now returns to FIG. 63.

The timebase transport mode may include a mode in which the broadcast reception apparatus 100 acquires the timebase via a session based flow in the different broadcast stream. According to another embodiment of FIG. 63, when the timebase_transport_mode field has a value of 0x03, this may indicate that the timebase of the broadcast service is acquired via the session based flow in the different broadcast stream. The signaling transport mode may include a mode in which the broadcast reception apparatus 100 acquires the signaling message via a session based flow in the same broadcast stream. When the signaling_transport_mode field has a value of 0x03, this may indicate that the signaling message used for the broadcast service is acquired via the application layer transport session based flow in the different broadcast stream. At this time, the application layer transport session based flow may be any one of an asynchronous layered coding (ALC)/layered coding transport (LCT) session and a file delivery over unidirectional transport (FLUTE) session.

In this case, the bootstrap( ) field of the timebase and the signaling message may follow the syntax shown in FIG. 67. The syntax shown in FIG. 67 may be represented in XML format.

The bootstrap data according to the embodiment of FIG. 67 may include identifier information of a broadcaster for transmitting the signaling message. More specifically, the bootstrap data may include unique identifier information of a specific broadcaster for transmitting the signaling message via a specific frequency or a transport frame. The identifier information of the broadcaster may be a broadcasting_id field. In addition, the identifier information of the broadcaster may be identifier information of the transport stream of the broadcast service.

The description returns to FIG. 63.

The timebase transport mode may include a mode in which the broadcast reception apparatus 100 acquires the timebase via a packet based flow in the same broadcast stream. According to another embodiment of FIG. 39, when the timebase_transport_mode field has a value of 0x04, this may indicate that the timebase of the broadcast service is acquired via the packet based flow in the same broadcast stream. At this time, the packet based flow may be an MPEG media transport (MMT) packet flow.

The signaling transport mode may include a mode in which the broadcast reception apparatus 100 acquires the signaling message via the packet based flow in the same broadcast stream. When the signaling_transport_mode field has a value of 0x04, this may indicate that the signaling message used for the broadcast service is acquired via the transport packet based flow in the same broadcast stream. At this time, the packet based flow may be an MMT packet flow.

In this case, the bootstrap( ) field of the timebase and the signaling message may follow the syntax shown in FIG. 44. The syntax shown in FIG. 44 may be represented in XML format.

The bootstrap data according to the embodiment of FIG. 44 may include identifier information of a transport packet for transmitting the timebase or the signaling message. The identifier information of the transport packet may be a packet_id field. The identifier information of the transport packet may be identifier information of the MPEG-2 transport stream.

The description returns to FIG. 63.

The timebase transport mode may include a mode in which the broadcast reception apparatus 100 acquires the timebase via a packet based flow in the different broadcast stream.

According to another embodiment of FIG. 63, when the timebase_transport_mode field has a value of 0x05, this may indicate that the timebase of the broadcast service is acquired via the packet based flow in the different broadcast stream. At this time, the packet based flow may be an MPEG media transport packet flow.

The signaling transport mode may include a mode in which the broadcast reception apparatus 100 acquires the signaling message via a packet based flow in the different broadcast stream. When the signaling_transport_mode field has a value of 0x05, this may indicate that the signaling message used for the broadcast service is acquired via the packet based flow in the different broadcast stream. At this time, the packet based flow may be an MMT packet flow.

In this case, the bootstrap( ) field of the timebase and the signaling message may follow the syntax shown in FIG. 69. The syntax shown in FIG. 69 may be represented in XML format.

The bootstrap data according to the embodiment of FIG. 69 may include identifier information of a broadcaster for transmitting the signaling message. More specifically, the bootstrap data may include unique identifier information of a specific broadcaster for transmitting the signaling message via a specific frequency or a transport frame. The identifier information of the broadcaster may be a broadcasting_id field. In addition, the identifier information of the broadcaster may be identifier information of the transport stream of the broadcast service.

The bootstrap data according to the embodiment of FIG. 69 may include identifier information of a transport packet for transmitting the timebase or the signaling message. The identifier information of the transport packet may be a packet_id field. The identifier information of the transport packet may be identifier information of an MPEG-2 transport stream.

The description returns to FIG. 63.

The timebase transport mode may include a mode in which the broadcast reception apparatus 100 acquires the timebase via a URL.

According to another embodiment of FIG. 63, when the timebase_transport_mode field has a value of 0x06, this may indicate that the timebase of the broadcast service is acquired via the URL. The signaling transport mode may include a mode in which the broadcast reception apparatus 100 acquires the signaling message via the URL. When the signaling_transport_mode field has a value of 0x06, this may indicate that the signaling message used for the broadcast service is acquired via the identifier for identifying the reception address of the signaling message used for the broadcast service. At this time, the identifier for identifying the reception address of the signaling message used for the broadcast service may be a URL.

In this case, the bootstrap( ) field of the timebase and the signaling message may follow the syntax shown in FIG. 70. The syntax shown in FIG. 70 may be represented in XML format.

The bootstrap data according to the embodiment of FIG. 70 may include length information of the URL where the timebase or the signaling message of the broadcast service is downloaded. The URL length information may be a URL_length field.

The bootstrap data according to the embodiment of FIG. 70 may include actual data of the URL where the timebase or the signaling message of the broadcast service is downloaded. The actual data of the URL may be a URL_char field.

FIG. 71 is a diagram showing a process of acquiring a timebase and a service signaling message in the embodiments of FIGS. 62 to 70.

As shown in FIG. 71, the broadcast reception apparatus 100 according to one embodiment of the present invention may acquire the timebase via a packet based transport protocol. More specifically, the broadcast reception apparatus 100 may acquire the timebase via an IP/UDP flow using a service signaling message. In addition, the broadcast reception apparatus 100 according to one embodiment of the present invention may acquire a service related signaling message via a session based transport protocol. More specifically, the broadcast reception apparatus 100 may acquire a service related signaling message via an ALC/LCT transport session.

FIG. 72 is a diagram showing the configuration of a broadcast service signaling message in a next generation broadcast system according to one embodiment of the present invention. The broadcast service signaling message according to one embodiment is for a service signaling method for enabling the broadcast reception apparatus to receive a broadcast service and content in the next generation broadcast system. The broadcast service signaling method according to the embodiment may be based on the above-described signaling message configuration. The broadcast service signaling message according to the embodiment may be transmitted via a service signaling channel. At this time, the service signaling channel may be a physical layer pipe for directly transmitting the service signaling information for broadcast service scan without passing through other layers.

In a detailed embodiment, the signaling channel may be referred to as at least one of a fast information channel (FIC), low layer signaling (LLS) and an application layer transport session. The broadcast service signaling message according to the embodiment may be represented in XML format.

The service signaling message according to the embodiment of FIG. 72 may include information indicating whether the service signaling message includes information necessary to acquire the timebase. At this time, the timebase may include metadata for the timeline used for the broadcast service. The timeline is a series of time information for media content. Information indicating whether information for acquiring the timebase is included may be a timeline_transport_flag field. In one embodiment, when the timeline_transport_flag field has a value of 1, this may indicate that the service signaling message includes information for transmitting the timeline.

The service signaling message according to the embodiment of the present invention may include data necessary for the broadcast reception apparatus to acquire the timeline or the signaling message according to the transport mode. The data for acquiring the timeline or the signaling message may be a bootstrap_data( ) field.

The transport mode may be at least one of a timebase transport mode and a signaling transport mode. The timebase transport mode may be a transport mode for the timebase including metadata for the timeline used for the broadcast service. The information on the timebase transport mode may be a timebase_transport_mode field.

In addition, the signaling transport mode may be a mode for transmitting the signaling message used for the broadcast service. The information on the signaling transport mode may be a signaling_transport_mode field.

In addition, the meaning of the bootstrap_data( ) field according to the timeline_transport_mode field and the signaling_transport_mode field may be equal to the above description.

FIG. 73 is a diagram showing the configuration of a broadcast service signaling message in a next generation broadcast system according to one embodiment of the present invention. The broadcast service signaling message according to one embodiment is a service signaling method for enabling the broadcast reception apparatus to receive a broadcast service and content in the next generation broadcast system. The broadcast service signaling method according to the embodiment may be based on the above-described signaling message configuration. The broadcast service signaling message according to the embodiment may be transmitted via a service signaling channel. At this time, the service signaling channel may be a physical layer pipe for directly transmitting the service signaling information for broadcast service scan without passing through other layers. In a detailed embodiment, the signaling channel may be referred to as at least one of a fast information channel (FIC), low layer signaling (LLS) and an application layer transport session. The broadcast service signaling message according to the embodiment of FIG. 72 may be represented in XML format.

The service signaling message according to the embodiment may include information indicating whether the service signaling message includes information necessary to acquire the timebase. At this time, the timebase may include metadata for the timeline used for the broadcast service. The timeline is a series of time information for media content. Information indicating whether information for acquiring the timebase is included may be a timeline_transport_flag field. In one embodiment, when the timeline_transport_flag field has a value of 1, this may indicate that the service signaling message includes information for transmitting the timeline.

The service signaling message according to the embodiment may include information indicating whether the signaling message includes data necessary to acquire the service signaling message. At this time, the signaling message may be media presentation data (MPD) used for the broadcast service or a signaling message related to an MPD URL. The information indicating whether the information necessary to acquire the signaling message is included may be an MPD_transport_flag field. In one embodiment, when the MPD_transport_flag field has a value of 1, this may indicate that the service signaling message includes MPD or information on transmission of the signaling message related to the MPD URL. HTTP based adaptive media streaming may be referred to as dynamic adaptive streaming over HTTP (DASH). In adaptive media streaming, detailed information for enabling the broadcast reception apparatus to acquire the segment configuring the broadcast service and content may be referred to as MPD. The MPD may be represented in XML format. The MPD URL related signaling message may include address information capable of acquiring the MPD.

In addition, the service signaling message according to the embodiment may indicate whether the service signaling message includes acquisition path information of component data. At this time, the component may be the unit of content data for providing the broadcast service. The information indicating whether the acquisition path information of the component data is included may be a component_location_transport_flag field. In one embodiment, when the component_location_transport_flag field has a value of 1, the component_location_transport_flag field may indicate that the service signaling message includes the acquisition path information of the component data.

In addition, the service signaling message according to the embodiment may indicate whether information necessary to acquire an application related signaling message is included. The information indicating whether the information necessary to acquire the application related signaling message is included may be an app_signaling_transport_flag field. In one embodiment, when the app_signaling_transport_flag field has a value of 1, the app_signaling_transport_flag field may indicate that the service signaling message includes acquisition path information of the component data.

In addition, the service signaling message according to the embodiment may indicate whether signaling message transmission related information is included. The information indicating whether the signaling message transmission related information is included may be a signaling_transport_flag field. In one embodiment, when the signaling_transport_flag field has a value of 1, the signaling_transport_flag field may indicate that the service signaling message includes the signaling message transmission related information. When the service signaling message does not include the above-described MPD related signaling, component acquisition path information and application related signaling information, the broadcast reception apparatus may acquire the MPD related signaling, component acquisition path information and application related signaling information via the signaling message transport path.

The service signaling message according to the embodiment may indicate a mode for transmitting the timebase used for the broadcast service. The information on the mode for transmitting the timebase may be a timebase_transport_mode field.

The service signaling message according to the embodiment may indicate a mode for transmitting an MPD or MPD URL related signaling message used for the broadcast service. The information on the mode for transmitting an MPD or MPD URL related signaling message may be an MPD_transport_mode field.

The service signaling message according to the embodiment may indicate a mode for transmitting a component location signaling message including the acquisition path of the component data used for the broadcast service. The information on the mode for transmitting the component location signaling message including the acquisition path of the component data may be a component_location_transport_mode field.

The service signaling message according to the embodiment may indicate a mode for transmitting an application related signaling message used for the broadcast service. The information for transmitting the application related signaling message may be an app_signaling_transport_mode field.

The service signaling message according to the embodiment may indicate a mode for transmitting a service related signaling message used for the broadcast service. The information on the mode for transmitting the service related signaling message may be a signaling_transport_mode field.

The meanings of the values of the timebase_transport_mode field, the MPD_transport_mode field, the component_location_transport_mode field, the app_signaling_ transport_mode field and the signaling_transport_mode field will now be described.

FIG. 74 is a diagram showing the meaning of the value of each transport mode. The X_transport_mode may include a timebase_transport_mode, an MPD_transport_mode, a component_location_transport_mode, an app_signaling_transport_mode and a signaling_transport_mode. The detailed meaning of the value of each transport mode is equal to the above description.

The service signaling message according to the embodiment of FIG. 73 may include information necessary for the broadcast reception apparatus to acquire the timeline or the signaling message according to the value of each mode. The information necessary to acquire the timebase or the signaling message may be a bootstrap_data( ) field. More specifically, the information included in the bootstrap_data( ) is equal to the above description.

FIG. 75 is a diagram showing the configuration of a signaling message for signaling a component data acquisition path of a broadcast service in a next generation broadcast system. In the next generation broadcast system, one broadcast service may be composed of one or more components. Based on the signaling message according to the embodiment, the broadcast reception apparatus may acquire information on the acquisition path of the component data and related application in the broadcast stream. At this time, the signaling message according to the embodiment may be represented in XML format.

The signaling message according to the embodiment may include information indicating that the signaling message is a message for signaling a component location. The information indicating that the signaling message is the message for signaling the component location may be a signaling_id field. In a detailed embodiment, the signaling_id field may have a size of 8 bits.

In addition, the signaling message according to the embodiment may include extension information indicating that the signaling message is a message for signaling a component location. At this time, the extension information includes a protocol version of a message for signaling a component location. The extension information may be a signaling_id_extension field.

In addition, the signaling message according to the embodiment of FIG. 50 may include version information of the message for signaling the component location. At this time, the version information may indicate that the information of the message for signaling the component location has been changed. The version information may be a version_number field.

In addition, the signaling message according to the embodiment may include identifier information of an associated broadcast service. At this time, the identifier information of the associated broadcast service may be a service_id field.

In addition, the signaling message according to the embodiment may include the number of components associated with the broadcast service. At this time, the number of associated components may be a num_component field.

In addition, the signaling message according to the embodiment may include the identifier of each component. For example, the component identifier may be configured by combining the MPD@id, period@id and representation@id of MPEG DASH. At this time, the identifier information of each component may be a component_id field.

In addition, the signaling message according to the embodiment may include the length of the component_id field. At this time, the length information of the component_id field may be a component_id_length field.

In addition, the signaling message according to the embodiment may include frequency information indicating a frequency capable of acquiring the component data. The component data may include a DASH segment. At this time, the frequency information capable of acquiring the component data may be a frequency_number field.

In addition, the signaling message according to the embodiment may include a unique identifier of a broadcaster. The broadcaster may transmit component data via a transmitted transport frame or a specific frequency. At this time, the unique identifier information of the broadcaster may be a broadcast_id field.

In addition, the signaling message according to the embodiment may include the identifier of a physical layer pipe for transmitting component data. At this time, the identifier information of the physical layer pipe for transmitting the component data may be a datapipe_id field.

In addition, the signaling message according to the embodiment may include an IP address format of an IP datagram including component data. The information on the IP address format may be an IP_version_flag field. The information on the IP address format of the IP datagram may be an IP_version_flag field. In a detailed embodiment, when the value of the IP_version_flag field is 0, this may indicate IPv4 and, when the value of the IP_version_flag field is 1, this may indicate IPv6.

In addition, the signaling message according to the embodiment may include information indicating whether the IP datagram including the component data includes a source IP address. Information indicating whether the IP datagram includes the source IP address may be a source_IP_address_flag field. In one embodiment, when the source_IP_address_flag field is 1, this may indicate that the IP datagram includes the source IP address.

In addition, the signaling message according to the embodiment may include information indicating whether the IP datagram including the component data includes a destination IP address. Information indicating whether the IP datagram includes the destination IP address may be a destination_IP_address_flag field. In one embodiment, when the destination_IP_address_flag field is 1, this may indicate that the IP datagram includes the destination IP address.

In addition, the signaling message according to the embodiment may include source IP address information of the IP datagram including the component data. In one embodiment, when the source_IP_address_flag field has a value of 1, the signaling message may include source IP address information. The source IP address information may be a source_IP_address field.

In addition, the signaling message according to the embodiment may include destination IP address information of the IP datagram including the component data. In one embodiment, when the destination_IP_address_flag field has a value of 1, the signaling message may include destination IP address information. The destination IP address information may be a destination_IP_address field.

In addition, the signaling message according to the embodiment may include UDP port number information of the IP datagram including the component data. The UDP port number information may be a UDP_port_num field.

In addition, the signaling message according to the embodiment may include transport session identifier information of the application layer for transmitting the transport packet including the component data. The session for transmitting the transport packet may be at least one of an ALC/LCT session and a FLUTE session. The identifier information of the session may be a tsi field.

In addition, the signaling message according to the embodiment may include identifier information of the transport packet including the component data. The identifier information of the transport packet may be a packet_id field.

In addition, the signaling message according to the embodiment may include the number of application signaling messages associated with the broadcast service. At this time, the broadcast service may be identified according to the service_id field. The information on the number of application signaling messages may be a num_app_signaling field.

In addition, the signaling message according to the embodiment may include identifier information of the application signaling message. The identifier information of the application signaling message may be an app_signaling_id field.

In addition, the signaling message according to the embodiment may include length information of the app_signaling_id field. The length information of the app-signaling_id_field may be an app_signaling_id_length field.

In addition, the signaling message according to the embodiment may include data for the path capable of acquiring the data of the application included in the signaling message associated with the identifier of the application signaling message. The information on the path for acquiring the data of the application included in the signaling message associated with the identifier of the application signaling message may be an app_delivery-info( ) field.

FIG. 76 is a diagram showing the syntax of an app_delevery_info( ) field according to one embodiment of the present invention.

The data for the path capable of acquiring the data of the application included in the signaling message associated with the identifier of the application signaling message according to the embodiment may include information indicating whether the application or associated data is transmitted via different broadcast streams. The information indicating whether the application or associated data is transmitted via different broadcast streams may be a broadcasting_flag field.

In addition, the data for the path capable of acquiring the data of the application included in the signaling message associated with the identifier of the application signaling message according to the embodiment may include the IP address format of the IP datagram including the application or associated data. The information on the IP address format of the IP datagram may be an IP_version_flag field. In one embodiment, when the IP_version_flag field is 0, this may indicate that the IP datagram including the application or associated data uses IPv4 and, when the IP_version_flag field is 1, this may indicate that the IP datagram including the application or associated data uses IPv6.

In addition, the data for the path capable of acquiring the data of the application included in the signaling message associated with the identifier of the application signaling message according to the embodiment may include information indicating whether the IP datagram including the application or associated data includes a source IP address. At this time, the associated data may be data necessary to execute the application.

The information indicating whether the IP datagram including the application or associated data includes the source IP address may be a source_IP_address_flag field. In one embodiment, when the source_IP_address_flag field is 1, this may indicate that the IP datagram includes a source IP address.

In addition, the data for the path capable of acquiring the data of the application included in the signaling message associated with the identifier of the application signaling message according to the embodiment may include information indicating whether the IP datagram including the application or associated data includes a destination IP address. The information indicating whether the IP datagram including the application or associated data includes the destination IP address may be a destination_IP_address_flag field. In one embodiment, when the destination_IP_address_flag field is 1, this may indicate that the IP datagram includes a destination IP address.

In addition, the data for the path capable of acquiring the data of the application included in the signaling message associated with the identifier of the application signaling message according to the embodiment may include a unique identifier of a broadcaster for transmitting the application or associated identifier.

In order words, the data for the path capable of acquiring the data of the application included in the signaling message associated with the identifier of the application signaling message according to the embodiment may include the identifier of a broadcast service transport stream. The unique identifier information of the broadcaster for transmitting the application or associated data via a transmitted transport frame or a specific frequency may be a broadcast_id field.

In addition, the data for the path capable of acquiring the data of the application included in the signaling message associated with the identifier of the application signaling message according to the embodiment may include a source IP address of the IP datagram including the application or associated data, when the source_IP_address_flag field has a value of 1. The source IP address information of the IP datagram including the application or associated data may be a source_IP_address field.

In addition, the data for the path capable of acquiring the data of the application included in the signaling message associated with the identifier of the application signaling message according to the embodiment may include a destination IP address of the IP datagram including the application or associated data, when the destination_IP_address_flag field has a value of 1. The destination IP address information of the IP datagram including the application or associated data may be a destination_IP_address field.

In addition, the data for the path capable of acquiring the data of the application included in the signaling message associated with the identifier of the application signaling message according to the embodiment may include information on the number of flow ports of the IP datagram including the application or associated data. The information indicating the number of flow ports of the IP datagram including the application or associated data may be a port_num_count field.

In addition, the data for the path capable of acquiring the data of the application included in the signaling message associated with the identifier of the application signaling message according to the embodiment may include information on the UDP port number of the IP datagram including the application or associated data. The information on the UDP port number of the IP datagram including the application or associated data may be a destination_UDP_port_number field.

In addition, the data for the path capable of acquiring the data of the application included in the signaling message associated with the identifier of the application signaling message according to the embodiment may include the identifier of a transport session for transmitting the application or associated data. The transport session for transmitting the application or associated data may be any one of an ALC/LCT session and a FLUTE session. The identifier information of the transport session for transmitting the application or associated data may be a tsi field.

FIG. 77 is a diagram showing the syntax of an app_delevery_info( ) field according to another embodiment of the present invention.

The data for the path capable of acquiring the data of the application included in the signaling message associated with the identifier of the application signaling message according to the embodiment may include the identifier of the transport packet for transmitting the application or associated data. The transport packet for transmitting the application or associated data may follow a protocol based on a packet based transport flow. For example, the packet based transport flow may include an MPEG media transport protocol. The identifier information of the transport packet for transmitting the application or associated data may be a packet_id field.

FIG. 78 is a diagram showing component location signaling including path information capable of acquiring one or more component data configuring a broadcast service. More specifically, FIG. 78 shows information on a path capable of acquiring component data including a DASH segment when one or more components configuring the broadcast service are represented by the DASH segment.

Figure 79:
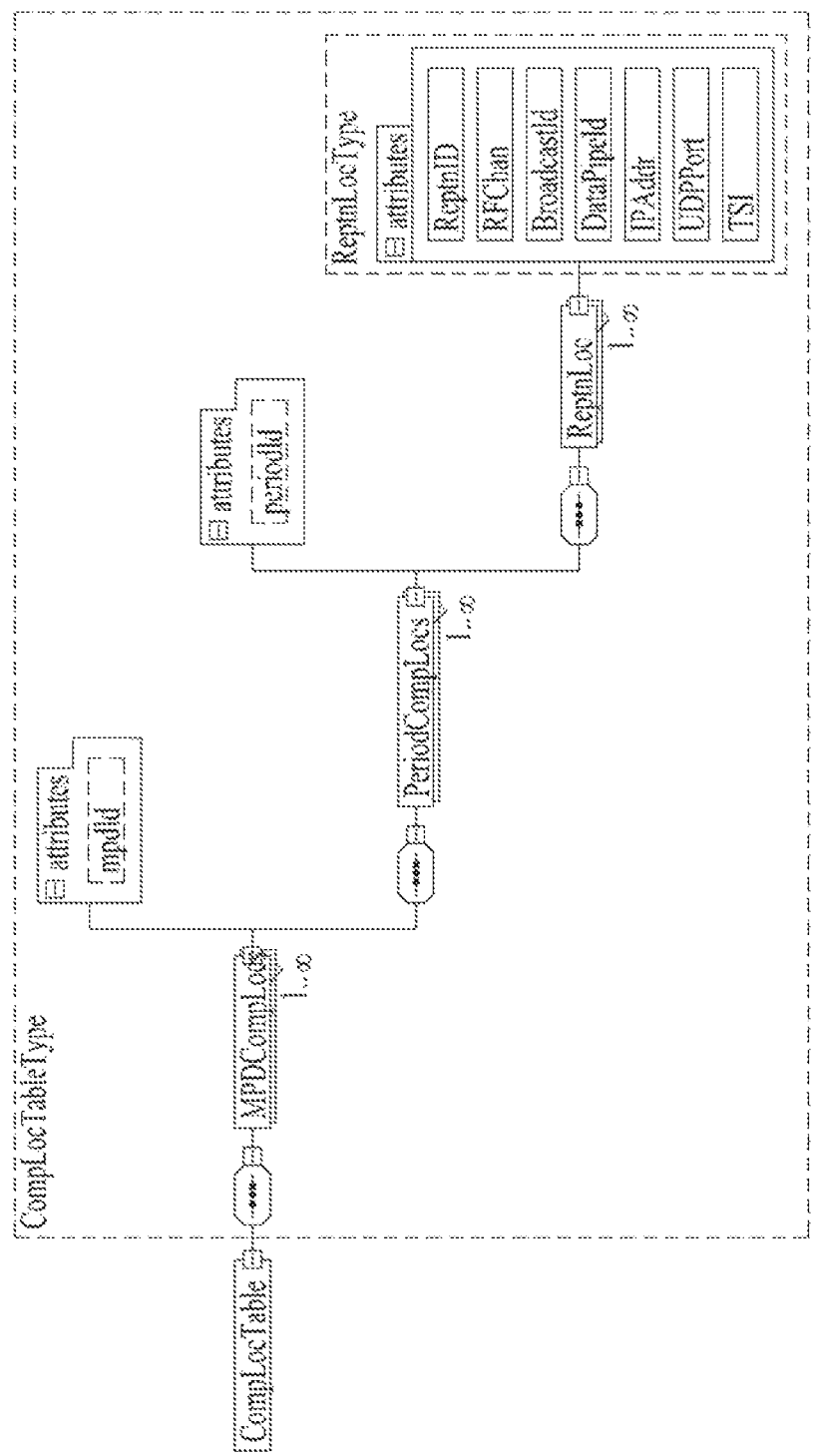
FIG. 79 is a diagram showing the configuration of the component location signaling of FIG. 78.

FIG. 79 is a diagram showing the configuration of the component location signaling of FIG. 78.

The component location signaling according to the embodiment may include identifier information of the MPEG DASH MPD associated with the broadcast service. The identifier information of the MPEG DASH MPD may be an mpdip field.

In addition, the component location signaling according to the embodiment may include the identifier of period attributes in the MPEG DASH MPD. The identifier information of the period attributes in the MPEG DASH MPD may be a periodid field.

In addition, the component location signaling according to the embodiment may include the identifier of representation attributes in the period indicated by the periodid field. The identifier information of the representation attributes in the period may be a ReptnID field.

In addition, the component location signaling according to the embodiment may include a frequency number capable of acquiring the DASH segment included in the representation attributes in the period indicated by the ReptnID field. The frequency number capable of acquiring the DASH segment may be an RF channel number. The information on the frequency number capable of acquiring the DASH segment may be an RFChan field.

In addition, the component location signaling according to the embodiment may include the unique identifier of the broadcaster for transmitting the DASH segment through a specific frequency or a transmitted transport frame. The information on the unique identifier of the broadcaster for transmitting the DASH segment may be a Broadcastingid field.

In addition, the component location signaling according to the embodiment may include the identifier of the physical layer pipe for delivering the DASH segment. The physical layer pipe may be a data pipe transmitted via the physical layer. The information on the identifier of the physical layer pipe for delivering the DASH segment may be a DataPipeId field.

In addition, the component location signaling according to the embodiment may include the destination IP address of the IP datagram including the DASH segment. The destination IP address information of the IP datagram including the DASH segment may be an IPAdd field.

In addition, the component location signaling according to the embodiment may include the UDP port number of the IP datagram including the DASH segment. The information on the UDP port number of the IP datagram including the DASH segment may be a UDPPort field.

In addition, the component location signaling according to the embodiment may include the identifier of the transport session for transmitting the transport packet including the DASH segment. The identifier of the session for transmitting the transport packet may be at least one of the ALC/LCT session and the FLUTE session. The information on the identifier of the session for transmitting the transport packet may be a TSI field.

In addition, the component location signaling according to the embodiment may include the identifier of the transport packet including the DASH segment. The information on the identifier of the transport packet may be a PacketId field.

FIG. 80 is a diagram showing other information included in signaling of a broadcast service in a next generation broadcast system in one embodiment of the present invention. The signaling of the service may include information on a service identifier (id), a service type, a service name, a channel number, a timebase location, a delivery mode, bootstrap info, MPD, an MPD signaling location, a component signaling location, an app signaling location and/or an object flow.

The service identifier may indicate information for identifying the service and may be expressed by id attributes.

The service type information may indicate the type of the service and may be expressed by serviceType attributes.

The service name information may indicate the name of the service and may be expressed by serviceName attributes.

The channel number information may indicate information on the channel number related to the service and may be expressed by channelNumber attributes.

The timebase location information may indicate the location where the timebase can be acquired and may be expressed by a TimebaseLocation element. Here, the timebase may indicate information indicating metadata for setting the timeline for synchronizing the components included in the service.

The delivery mode information included in the timebase location information may indicate the delivery mode of the timebase.

The bootstrap information included in the timebase location information may include the bootstrap information of the timebase according to the delivery mode.

The MPD may indicate the MPD associated with the service.

The MPD signaling location information may indicate the location where signaling related to the MPD or MPD URL can be acquired.

The delivery mode information included in the MPD signaling location may indicate the delivery mode of the MPD location signaling.

The bootstrap info information included in the MPD signaling location may include the bootstrap information of the MPD or the MPD URL according to the delivery mode.

The component signaling location information may indicate component location signaling information associated with the service.

The delivery mode information included in the component signaling location information may indicate the delivery mode of the component location signaling.

The bootstrap info information included in the component signaling location information may include the bootstrap information of the component location signaling according to the delivery mode.

The app signaling location information may indicate the location where the application signaling can be acquired.

The delivery mode information included in the app signaling location information may indicate the delivery mode of the application signaling.

The bootstrap info information included in the app signaling location information may include the bootstrap information of the application signaling according to the delivery mode.

The object flow information may include information on the related object flows for transmitting the components of the service.

FIG. 81 is a diagram showing a delivery mode included in service signaling of a next generation broadcast system according to one embodiment of the present invention.

As described above, the delivery mode may be included in each location element as attributes. The delivery mode may be distinguished as follows according to the value thereof.

When the value of the delivery mode is 0x00, this may indicate that IPv4/IPv6 flows are transmitted through the same broadcast or cellular network as the broadcast stream for receiving the service signaling message.

When the value of the delivery mode is 0x01, this may indicate that IPv4/IPv6 flows are transmitted through different broadcast networks.

When the value of the delivery mode is 0x02, this may indicate that session-based flows may be transmitted through the same broadcast network. Here, the session-based flow may mean an ALC/LCT or FLUTE session according to the embodiment.

When the value of the delivery mode is 0x03, this may indicate that session-based flows may be transmitted through different broadcast networks. Here, the session-based flow may mean an ALC/LCT or FLUTE session according to the embodiment.

When the value of the delivery mode is 0x04, this may indicate that packet-based flows may be transmitted through the same broadcast network. Here, the packet-based flow may mean MMT packet based transmission according to the embodiment.

When the value of the delivery mode is 0x05, this may indicate that packet-based flows may be transmitted through different broadcast networks. Here, the packet-based flow may mean MMT packet based transmission according to the embodiment.

When the value of the delivery mode is 0x06, this may indicate that the location is designated by the URL.

The values 0x07 to 0xFF of the delivery mode are not set and are used to indicate the other delivery modes.

As described above, the information included in the timebase location, the MPD signaling location, the component signaling location and the app signaling location element may be transmitted via the path equal to or different from that of the service signaling according to the delivery mode.

FIG. 82 is a diagram showing information on a bootstrap included in service signaling of a next generation broadcast system according to one embodiment of the present invention. The information on the bootstrap may be expressed by the BootstrapInfo element as follows.

The BootstrapInfo element described in the above-described signaling message may include information for enabling a receiver to acquire timebase information, MPD or MPD URL information, component signaling information, application signaling information, etc. That is, as described above, the BootstrapInfo may be included in each location element. Therefore, the BootstrapInfo element may include information on an IP address, a port number, a transport session identifier and/or an associated packet identifier.

More specifically, the BootstrapInfo element may include attributes such as RFchannel, broadcastID, datapipeID (PLPID), sourceIP, desitinationIP, destinationPort, tsi, URL, packetid, etc. The information included in the BootstrapInfo element may be changed according to the delivery mode included in the location element to which the BootstrapInfo element belongs.

The RFchannel attribute may include information on a radio frequency channel carrying a broadcast stream.

The broadcastID attribute may indicate the identifier of the broadcaster for transmitting the broadcast stream.

The datapipeID (PLPID) attribute may indicate the identifier of the physical layer data pipe carrying IP datagrams. The datapipeID may be expressed by PLPID and the PLPID may indicate the identifier of the physical layer pipe.

The sourceIP attribute may indicate the source address of the IP datagrams carrying associated data.

The destinationIP attribute may indicate the destination address of the IP datagrams carrying associated data.

The destinationPort attribute may indicate the destination port number of the IP datagrams carrying associated data.

The tsi attribute may indicate the identifier of the transport session for delivering transport packets carrying associated data.

The URL attribute may indicate the URL where associated data can be acquired.

The packetid attribute may indicate the identifier of the transport packets carrying associated data.

Hereinafter, the objectFlow element of the information included in the signaling for the broadcast service shown in FIG. 80 will be described with reference to FIG. 83.

FIG. 83 is a diagram showing information included in signaling for an object flow. Each object flow may be a flow for transmitting one or more components configuring the service. Therefore, one service may include information on one or more object flows.

The object flow may include id, objectFormat, contentType and/or contentEncoding attributes. In addition, the object flow may include a file element and the file element may include contentLocation and/or TOI attributes. In addition, the object flow may include a FileTemplate element and the FileTemplate element may include contentLocTemplate, startTOI, endTOI and/or scale attributes. In addition, the object flow may include an ObjectGroup element and the ObjectGroup element may include contentLocation, startTOI and/or end TOI attributes. In addition, the object flow may include the above-described BootstrapInfo element.

The id may indicate the identifier of the object flow. When the DASH segment is delivered via this object flow, the id can be equal to a combination of the MPD identifier, the period identifier and the DASH representation identifier.

The objectFormat may indicate the format of the objects in this object flow as described above.

The contentType may indicate the media content component type for this object flow.

The contentEncoding may indicate the encoding method of the objects delivered via this object flow.

The file element may include information on the file.

The contentLocation of the file element may indicate the location where the file can be acquired. When the DASH segment is delivered via this object flow, the contentLocation may be equal to the DASH segment URL.

The TOI attribute of the file element is a transport object identifier and may indicate the identifier of the transport object.

The FileTemplate element may include information on a file template.

The contentLocTemplate of the FileTemplate element may indicate the template used to generate the location where the file can be acquired.

The startTOI of the FileTemplate element may indicate a first TOI delivered via this object flow.

The endTOI of the FileTemplate element may indicate a last TOI delivered via this object flow.

The scale attribute of the FileTemplate element may indicate information on the scale between TIO values in this object flow.

The ObjectGroup element may include information on the group of the transport objects delivered via this object flow.

The contentLocation of the ObjectGroup element may indicate the location of the content associated with this object group.

The startTOI of the ObjectGroup element may indicate a first TOI delivered via this object group.

The endTOI of the ObjectGroup element may indicate a last TOI delivered via this object group.

The BootstrapInfo element may include the bootstrap information of this object flow.

The objectFormat attributes of the information included in the signaling for the object flow according to the embodiment of FIG. 83 may include information on the format of the payload included in this object delivered via the object flow. In a first embodiment, the object format attributes of the object flow may indicate that the payload included in the flow includes a generic file supporting real-time streaming. The object format according to the first embodiment may be a generic file.

In a second embodiment, the object format attributes of the object flow may indicate that the payload included in the flow includes a data file supporting real-time streaming. For example, the object format attributes according to the second embodiment may indicate the DASH segment in the ISOBMFF. In a third embodiment, the object format attributes of the object flow may indicate that the payload included in the flow includes a data file represented in the HTTP entity format in order to support real-time streaming. The HTTP entity may be one entity for transmitting content according to HTTP.

Hereinafter, the File Template element of the information included in the signaling for the object flow shown in FIG. 83 will be described with reference to FIG. 84.

FIG. 84 is a diagram showing a combination of information for representing a file template in one embodiment of the present invention. The file template may be represented by a combination of Representation@id and segment number. For example, when the DASH segment is transmitted, as shown in FIG. 60, Representation@id and segment number may be combined to dynamically generate information on the content location of each file. As a result, the broadcast reception apparatus can efficiently acquire the flow of the transport packets including a specific component according to the dynamically generated content location information.

FIG. 85 is a diagram showing an object flow included in service signaling according to one embodiment of the present invention.

The object flow may further include a default attribute @isDefault along with the object format attributes described with reference to FIG. 83. That is, the object flow may include id, objectFormat, contentType, contentEncoding and/or isDefault attributes. In addition, the object flow may include a File element and the File element may include contentLocation and/or TOI attributes. The object flow may include a FileTemplate element and the FileTemplate element may include contentLocTemplate, startTOI, endTOI and/or scale attributes. In addition, the object flow may include an ObjectGroup element and the ObjectGroup element may include contentLocation, startTOI and/or endTOI attributes. In addition, the object flow may include the above-described BootstrapInfo element.

The id may indicate the identifier of this object flow. When the DASH segment is delivered via this object flow, the id can be equal to a combination of the MPD identifier, the period identifier and the DASH representation identifier.

The objectFormat may indicate the format of the objects in this object flow as described above.

The contentType may indicate the media content component type for this object flow.

The contentEncoding may indicate the encoding method of the objects delivered via this object flow.

The isDefault may indicate whether the payload included in the object delivered via the object flow includes component data used by default. For example, this may indicate whether the receiver basically receives and represents the component data delivered via this object flow without receiving and processing additional signaling information such as DASH MPD.

The file element may include information on the file.

The contentLocation of the file element may indicate the location where the file can be acquired. When the DASH segment is delivered via this object flow, the contentLocation may be equal to the DASH segment URL.

The TOI attribute of the file element is a transport object identifier and may indicate the identifier of the transport object.

The FileTemplate element may include information on a file template.

The contentLocTemplate of the FileTemplate element may indicate the template used to generate the location where the file can be acquired.

The startTOI of the FileTemplate element may indicate a first TOI delivered via this object flow.

The endTOI of the FileTemplate element may indicate a last TOI delivered via this object flow.

The scale attribute of the FileTemplate element may indicate information on the scale between TOI values in this object flow.

The ObjectGroup element may include information on the group of transport objects delivered via this object flow.

The contentLocation of the ObjectGroup element may indicate the location of the content associated with this object group.

The startTOI of the ObjectGroup element may indicate a first TOI delivered via this object group.

The endTOI of the ObjectGroup element may indicate a last TOI delivered via this object group.

The BootstrapInfo element may include the bootstrap information of this object flow.

FIG. 86 is a diagram showing other information included in signaling of a broadcast service in a next generation broadcast system in one embodiment of the present invention. An existing FLUTE client may receive a file description table (FDT) and then a broadcast reception apparatus may receive a file according to the FDT. However, this method is not suitable for transmission and reception of the file via the real-time broadcast service. In other words, the FLUTE protocol may not be suitably applied to the real-time broadcast service using a unidirectional transport protocol. Accordingly, in one embodiment of the present invention, the service signaling may include FDT information.

More specifically, as shown in FIG. 86, the FDTInstance element according to one embodiment of the present invention may include an @id attribute (element). The @id attribute may indicate the specific identifier of the FDT instance. Accordingly, the broadcast reception apparatus may identify the FDT instance via the @id attribute to dynamically generate the FDT instance. In addition, the broadcast reception apparatus may receive and process real-time streaming data represented in the form of the file according to the generated FDT instance (The other attributes should be described).

In addition, the FDTInstance element according to one embodiment of the present invention may include an @Expires attribute. The @Expires attribute may include information on the expiration information of the FDTInstance. Accordingly, the broadcast reception apparatus 100 may discard the expired FDTInstance according to the @Expires attribute.

In addition, the FDTInstance element according to one embodiment of the present invention may include an @Complete attribute. In one embodiment, when the @Complete attribute has a true value, the @Complete attribute may indicate that the future FDTInstance to be provided in the same session does not include new data.

In addition, the FDTInstance element according to one embodiment of the present invention may include an @Content-Location attribute. The @Content-Location attribute may be assigned a valid URI.

In addition, the FDTInstance element according to one embodiment of the present invention may include an @TOI attribute. The @TOI attribute is necessarily assigned a valid TOI value.

In addition, the FDTInstance element according to one embodiment of the present invention may include an @Content-Length attribute. The @Content-Length attribute may be the actual length information of the file content.

In addition, the FDTInstance element according to one embodiment of the present invention may include an @Transfer-Length attribute. The @Transfer-Length attribute may be the transfer length of file content.

In addition, the FDTInstance element according to one embodiment of the present invention may include an @Content-Encoding attribute. The @Content-Encoding attribute may be encoding information of file content.

In addition, the FDTInstance element according to one embodiment of the present invention may include an @Content-Type attribute. The @Content-Type attribute may be type information of file content.

FIG. 87 is a diagram showing signaling information for transport session information of a session level according to one embodiment of the present invention. When real-time or non-real-time content is transmitted using an LCT based protocol, signaling information describing the transport session information of a session level, such as a TSID, may be used. The TSID may be transmitted via some of the signaling message using various methods such as an in-band method of transport content or an out-of-band method using a separate path.

The TSID is an abbreviation for transport session instance descriptor and may indicate a descriptor including detailed information on the transport session.

The TSID may include a tsi attribute, a PayloadFormat element transmitted via a SourceFlow and/or a RepairFlow. In addition, the PayloadFormat element may include codePoint, protocol, deliveryObjectFormat, realtime, isobmff and/or packetheadersize attributes. In addition, the PayloadFormat element may include EFID and/or ApplicationIdentifier elements.

The tsi may indicate a transport session identifier.

The codePoint may define what code point value is used for this payload. This value may indicate the value of the CP field of the LCT header.

The protocol indicates the transport protocol of this payload. That is, the protocol may define the transport protocol of each payload at a payload level. Various types may exist in the LCT based transport protocol and the type may be identified by assigning an integer value to each type. For example, 0 may identify the ALC and 1 may identify ROUTE. In addition, the same identification method is applicable to the other protocols and new protocols to be defined in the future. In addition, in the above-described embodiment, the other @protocol value may be assigned in units of the LCT packet having the codepoint value equal to the value assigned to the @codepoint to transmit content using various protocols within one transport session.

The deliveryObjectFormat may indicate the payload format of the transport object.

The realtime may indicate whether the LCT packet includes component data for a real-time service. When the component data for the real-time service is included, this may indicate whether an extension header including NTP timestamps representing the presentation time of the transport object is included.

The isobmff may indicate whether the transport object is a sequence of ISOBMFF boxes, a DASH object referred to by the MPD or a sequence of ISOBMFF boxes fragmented according to a MPU mode of an MMT.

The packetheadersize may indicate the size of the route packet header.

The EFID may include detailed information of file delivered data.

The ApplicationIdentifier may provide additional information which can be mapped to the application which is carried in this transport session, e.g., the RepresentationID of the DASH content.

FIG. 88 is a diagram showing signaling information for transport session information of a session level according to another embodiment of the present invention. When real-time or non-real-time content is transmitted using an LCT based protocol, signaling information describing the transport session information of a session level, such as a TSID, may be used. The TSID may be transmitted via some of the signaling message using various methods such as an in-band method of transport content or an out-of-band method using a separate path.

When the protocols of the packets transmitted within one transport session are all identical, the TSID may have the following structure. That is, a protocol attribute may exist at TransportSession protocol attribute and may indicate that all packets of the session having the TSI value of the tsi attribute are transmitted via the protocol corresponding to the value assigned to the protocol attribute.

The TSID may include a tsi attribute, a protocol attribute of a SourceFlow, a PayloadFormat element and/or a RepiarFlow of each transport session. In addition, the PayloadFormat element may include codePoint, deliveryObjectFormat, realtime, isobmff and/or packetheadersize attributes. In addition, the PayloadFormat element may include EFID and/or ApplicationIdentifier elements.

The tsi may indicate a transport session identifier.

The protocol indicates the transport protocol of this payload. Various types may exist in the LCT based transport protocol and the type may be identified by assigning an integer value to each type. For example, 0 may identify the ALC and 1 may identify ROUTE. In addition, the same identification method is applicable to the other protocols and new protocols to be defined in the future. In addition, in the above-described embodiment, content transmission using the same protocol is possible with respect to all the packets included in one transport session.

The codePoint may define what code point value is used for this payload. This value may indicate the value of the CP field of the LCT header.

The deliveryObjectFormat may indicate the payload format of the transport object.

The realtime may indicate whether the LCT packet includes an extension header including NTP timestamps representing the presentation time of the transport object.

The isobmff may indicate whether the transport object is a sequence of ISOBMFF boxes, a DASH object referred to by the MPD or a sequence of ISOBMFF boxes fragmented according to a MPU mode of an MMT.

The packetheadersize may indicate the size of the route packet header.

The EFID may include detailed information of file delivered data.

The ApplicationIdentifier may provide additional information which can be mapped to the application which is carried in this transport session, e.g., the RepresentationID of the DASH content.

FIG. 89 is a diagram showing signaling information of a broadcast service according to another embodiment of the present invention.

The signaling information of the broadcast service according to one embodiment of the present invention may be referred to as user service description. The signaling information of the broadcast service according to one embodiment of the present invention may include service identifier (id), service type, service name, channel number, timebase location, delivery mode, bootstrap info, MPD and/or signaling location fields. The signaling location field may have the same meaning as the MPD signaling location field. The above-described fields were described above in detail.

FIG. 90 is a diagram showing FDT related information included in signaling information of a broadcast service according to another embodiment of the present invention.

The FDTInstance element according to another embodiment of the present invention may further include a version attribute in addition to the attributes included in the FDTInstance elements according to the above-described embodiment. The version attribute according to one embodiment of the present invention may indicate the version information of the FDTInstance. The receiver according to one embodiment of the present invention may confirm whether the currently transmitted FDTInstance is equal to the previously received FDTInstance using the received version attribute.

FIG. 91 is a diagram showing the configuration of the binary format of a Service_Mapping_Table according to one embodiment of the present invention.

One embodiment of the present invention may provide a service signaling method when a ROUTE protocol and/or an MMP protocol for transmitting a real-time object based on a session is used. The service mapping table according to one embodiment of the present invention may include service signaling information in a broadcast system according to the ROUTE protocol and/or the MMT protocol. The service mapping table according to one embodiment of the present invention may be referred to as user service bundle description.

The service mapping table according to one embodiment of the present invention may include a Signaling_id field, a Signaling_length field, a Protocol_version field, a Broadcast_id field, a Version_number field, an Ip_version_flag field, a Signaling_data_type field, an expiration field, a Fragment_number field, a Last_fragment_number field, a Num_services field, a Service_id field, a Service_name_length field, a Service_name field, a Channel_number field, a service_category field, a Service_status field, an SP_indicator field, a Num_route_sessions field, a Source_ip field, a Destination_ip field, a Port field, a Num_lsid_tsi field and an Lsid_delivery_tsi field.

The Signaling_id field indicates the ID indicating that this table is a service mapping table (SMT).

The Signaling_length field indicates the length of the section after the SMT header.

The Protocol_version field indicates the version information of the signaling protocol.

The Broadcast_id field indicates a unique ID of the broadcast.

The Version_number field indicates the version number of the signaling data, that is, the version information of this table.

The Ip_version_flag field indicates the flag information indicating the IP described in this table is v4 or v6. When the value of this field is 0 by default, the IP is v4 and, when the value of this field 1, the IP is v6.

The Signaling_data_type field indicates whether the type of the signaling data included in this table is binary or xml.

The expiration field indicates the valid period of this table.

The Fragment_number field indicates the fragment number of this table when all signaling data is fragmented and transmitted. Here, the fragment number may be referred to as a section number.

The Last_fragment_number field indicates the number of the last fragment when all signaling data is fragmented and transmitted. Here, the last fragment number may be referred to as a last section number.

The Num_services field indicates the number of services transmitted in the SMT.

The Service_id field indicates the unique identifier of the service. According to one embodiment of the present invention, this field may identify the next generation broadcast service such as ATSC 3.0.

The Service_name_length field indicates the length of the service name.

The Service_name field indicates the name of the service.

The Channel_number field indicates the frequency actually used to transmit the service. This field may include a major channel number and/or a minor channel number.

The service_category field indicates the category of the service. According to one embodiment of the present invention, the category indicated by this field may include Basic TV, Basic Radio, RI service, Service Guide, Emergency Alert, etc. Here, the Basic TV may include a linear A/V service, the Basic radio may include a linear audio only service and the RI service may include an App-based service.

The service_status field indicates the status of the service. For example, when the value of this field is 0, this may indicate that the service is Inactive, and, when the value of this field is 1, this may indicate that the service is Active. When the value of this field is 3, this may indicate that the service is Shown and, when the value of this field is 4, this may indicate that the service is Hidden.

The SP_indicator field indicates whether service protection is applied to the service or one or more components in the service.

The Num_route_sessions field indicates the number of ROUTE sessions for transmitting the service.

The Source_ip field indicates the source IP address of the route session.

The Destination_ip field indicates the destination IP address of the route session.

The Port field indicates the destination port of the route session.

The Num_lsid_tsi field indicates the number of LCT session instance descriptions (LSIDs) transmitted within the route session. According to one embodiment of the present invention, the LSID may be referred to as Service-based transport session instance description (S-TSID).

The Lsid_delivery_tsi field indicates the value of the transport session identifier (TSI) for transmitting the LSID. According to one embodiment of the present invention, this field may include information for identifying the LSID having the information on the ROUTE session and/or the LCT session for transmitting the service.

FIG. 92 is a diagram showing the configuration of the XML format of a Service_Mapping_Table according to one embodiment of the present invention.

According to one embodiment of the present invention, a service mapping table (SMT) element which is a root element includes a service element and the service element includes a Name element, a Category element, a RouteSessionInfo element, a serviced attribute, an RFChan attribute, a serviceStatus attribute and an SPindicator attribute, a RouteSessionInfo element includes a sourceIPAddr element, a destinationIAddr element, a Port element and/or an lsid_delivery_tsi element, and the sourceIPAddr element and/or the destinationIPAddr element may include a version attribute. The above-described elements and/or attributes may have the same meanings as the corresponding fields of the above-described fields of the previous drawings.

Figure 93:
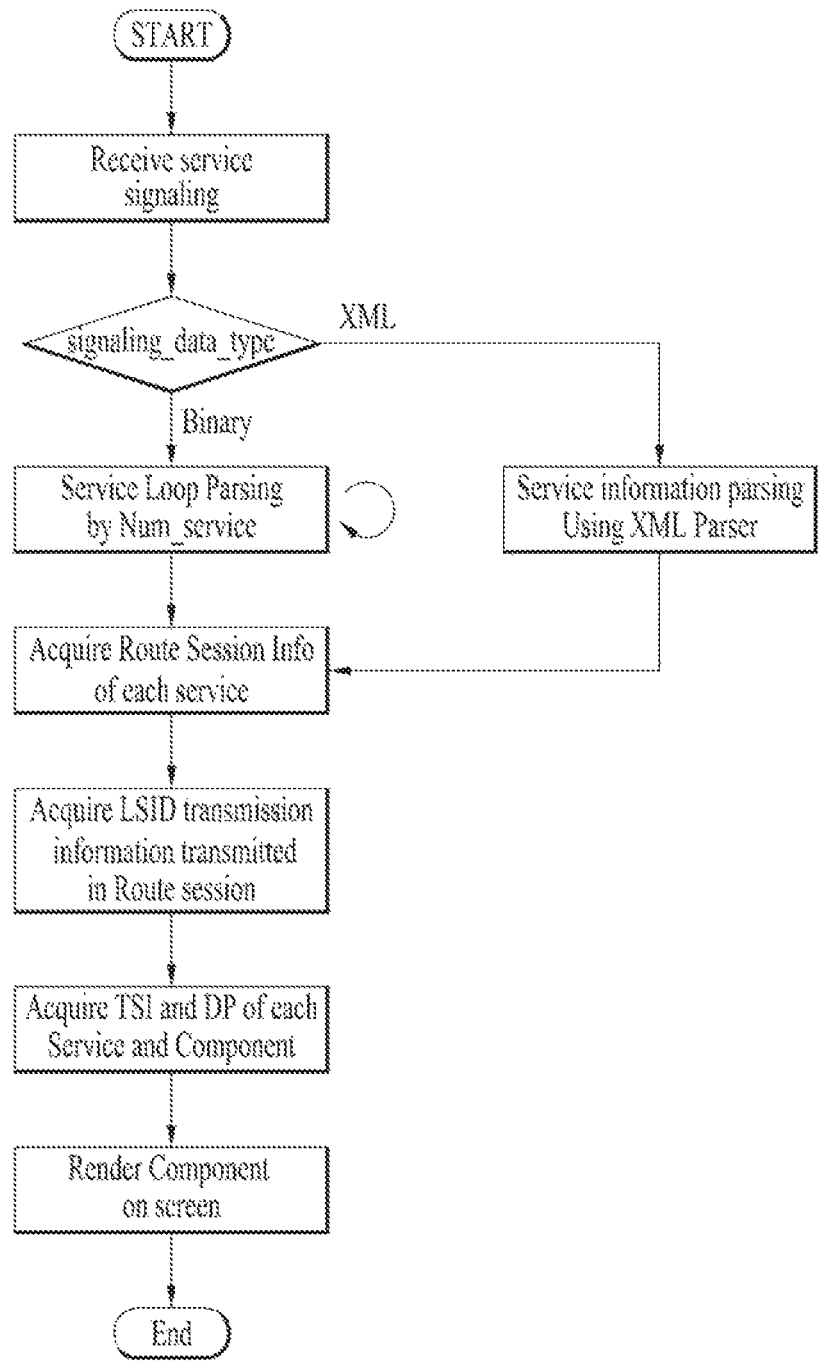
FIG. 93 is a diagram showing a process of receiving service signaling information included in a service mapping table according to one embodiment of the present invention.

FIG. 93 is a diagram showing a process of receiving service signaling information included in a service mapping table according to one embodiment of the present invention.

The reception apparatus according to one embodiment of the present invention may receive service signaling information included in the service mapping table (SL93010) and then check the signaling_data_type field included in the service signaling information to determine whether this information is in binary format or XML format (SL93020). When this information is in XML format, the reception apparatus may parse the service signaling information using an XML parser (SL93080) and, when this information is in binary format, the reception apparatus may parse the service signaling information by the number of services indicated by the Num_service field (SL93030). Thereafter, the reception apparatus may acquire the Route Session info field of each service (SL93040) and acquire LSID transmission information transmitted in the route session (SL93050). Hereinafter, the reception apparatus may acquire TSI and/or DP information of each service and/or component (SL93060) and render the components configuring the service on the display using the TSI and/or DP information (SL93070).

FIG. 94 is a diagram showing the configuration of service signaling according to one embodiment of the present invention.

One embodiment of the present invention may provide service signaling based on a ROUTE protocol and/or an MMT protocol. The service signaling according to one embodiment of the present invention may be provided in XML and/or binary format. Here, the service signaling may mean an SMT, a USD and/or an S-TSID.

The service signaling according to one embodiment of the present invention includes one or more service elements and one service element may include id, serviceType, serviceName, channelNumber, ROUTESessionInfo and/or TimebaseLocation information as attributes and/or sub elements. The id, the serviceType and/or the channelNumber information were described above.

The ROUTESessionInfo information according to one embodiment of the present invention may include id, version, sourceIP, destinationIP, port, DP_ID and/or LSIDInfo as attributes and/or sub elements. The id information indicates the identifier of the ROUTE session for transmitting the service. The version information indicates the version information of the ROUTE session for transmitting the. In one embodiment of the present invention, when the id is identical and the version information increases, it may be determined that the information on the ROUTE session has been changed. The sourceIP information indicates the source IP address of the ROUTE session. The destinationIP information indicates the destination IP address of the ROUTE session. The port information indicates the destination port of the ROUTE session. The DP_ID information indicates the identifier of the data pipeline via which the ROUTE session is transmitted. Here, the data pipeline may have the same meaning as the physical layer pipe. The LSIDInfo information may indicate the information on the LSID transmitted in the ROUTE session and will be described in detail below with respect to the next drawing.

According to one embodiment of the present invention, the ROUTESessioninfo information may be included in the LSID information.

The TimebaseLocation information may indicate the location where the timebase can be acquired. Here, the timebase may indicate metadata for setting a timeline for synchronizing the components included in the service. The Timebase-Location information may include deliveryMode and/or BootstrapInfo information as attributes and/or sub elements. The deliveryMode information may indicate the delivery mode of the timebase. The BootstrapInfo information may include bootstrap information of the timebase according to the delivery mode.

FIG. 95 is a diagram showing the configuration of LSID-Info information and DeliveryInfo information according to one embodiment of the present invention.

The DeliveryInfo information L95010 according to one embodiment of the present invention may include delivery-Mode, DeliveryInfo and/or LSID information as attributes and/or sub elements. The deliveryMode information may indicate the mode in which the LSID is transmitted. The mode in which the LSID is transmitted according to one embodiment of the present invention may include embedded, via-broadcast and/or via-broadband modes. The DeliveryInfo information may indicate the transport mode of the LSID when the mode indicated by the deliveryMode information is not the embedded mode and a detailed description thereof will be given in the next paragraph. The LSID information may indicate the LSID information transmitted in the ROUTE session when the mode indicated by the deliveryMode information is the embedded mode.

The DeliveryInfo information L95020 according to one embodiment of the present invention may include ROUTE_session_id, sourceIP, destinationIP, destinationPort, tsi, URL and DP_ID information as attributes and/or sub elements. The ROUTE_session_id information may indicate the identifier of the ROUTE session via which the LSID is transmitted and the value of this information being 0 may indicate that the LSID is transmitted in the same session as the ROUTE session described in the high-level element of this information. The sourceIP information may indicate the sourceIP address of the ROUTE session via which the LSID is transmitted. The destinationIP information may indicate the destination IP address of the ROUTE session via which the LSID is transmitted. The destinationPort information may indicate the destination port number of the ROUTE session via which the LSID is transmitted. The tsi information may indicate information for identifying the LCT session via which the LSID is transmitted. The URL information may indicate the URL where the LSID information can be acquired. The DP_ID information may indicate the data pipeline identifier of the physical layer for transmitting the LSID information.

FIG. 96 is a diagram showing the configuration of service signaling according to another embodiment of the present invention.

Referring to this figure, one embodiment of the present invention may provide a service signaling method when the ROUTE session via which service components are transmitted is transmitted via different DPs according to components, unlike the embodiment shown in FIG. 94. In this case, the service signaling according to one embodiment of the present invention may not include DP_ID information included in the above-described embodiment.

FIG. 97 is a diagram showing the configuration of an LSID according to one embodiment of the present invention.

The LSID according to one embodiment of the present invention may be included under the ROUTESessionInfo information according to the above-described embodiment of the present invention.

The LSID according to one embodiment of the present invention may include version information, validFrom information, expiration information and/or TransportService information as attributes and/or sub elements.

The version information may indicate the version information of this LSID. When this LSID is updated, the version of the LSID may increase. The reception LSID having a highest version number may correspond to the LSID of the currently valid version.

The validFrom information may indicate the valid date and time of this LSID information. This information may not exist and, when this information does not exist, the reception apparatus according to one embodiment of the present invention may assume that this LSID is valid.

The expiration information indicates the expiration date and time of this LSID information. This information may not exist and, when this information does not exist, the reception apparatus according to one embodiment of the present invention may assume that this LSID is permanently valid or that this LSID is valid until a new LSID having related expiration information is received.

The TransportSession information may provide information on an LCT transport session. The TransportSession information according to one embodiment of the present invention may include tsi information, DP_ID information, SourceFlow information and/or RepairFlow information as attributes and/or sub elements. The tsi information may indicate the identifier of the transport session. The DP_ID information may indicate the identifier of the DP via which the transport session is transmitted and the DP may have the same meaning as the PLP. The SourceFlow information may provide information in the source flow transmitted in this transport session. The RepairFlow information may provide information on the repair flow transmitted in this transport session.

Figure 98:
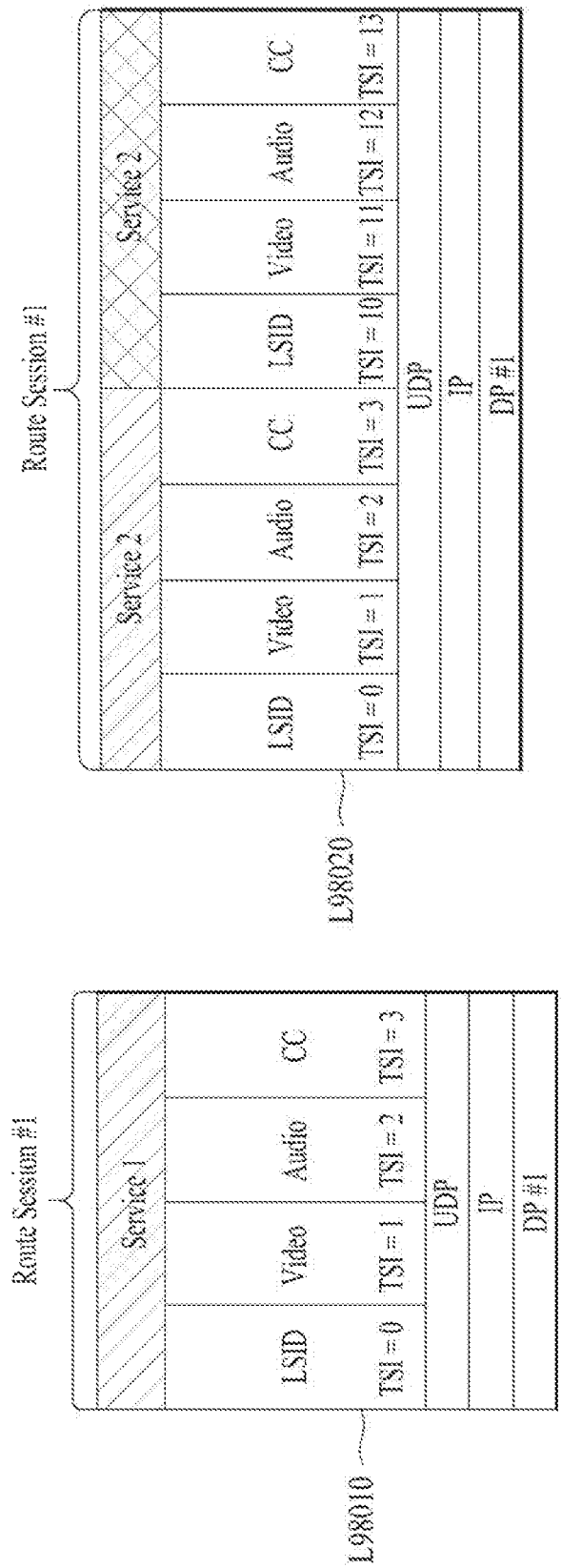
FIGS. 98 and 99 are diagrams showing a ROUTE session and a transmission method of an LSID according to one embodiment of the present invention.
Figure 99:
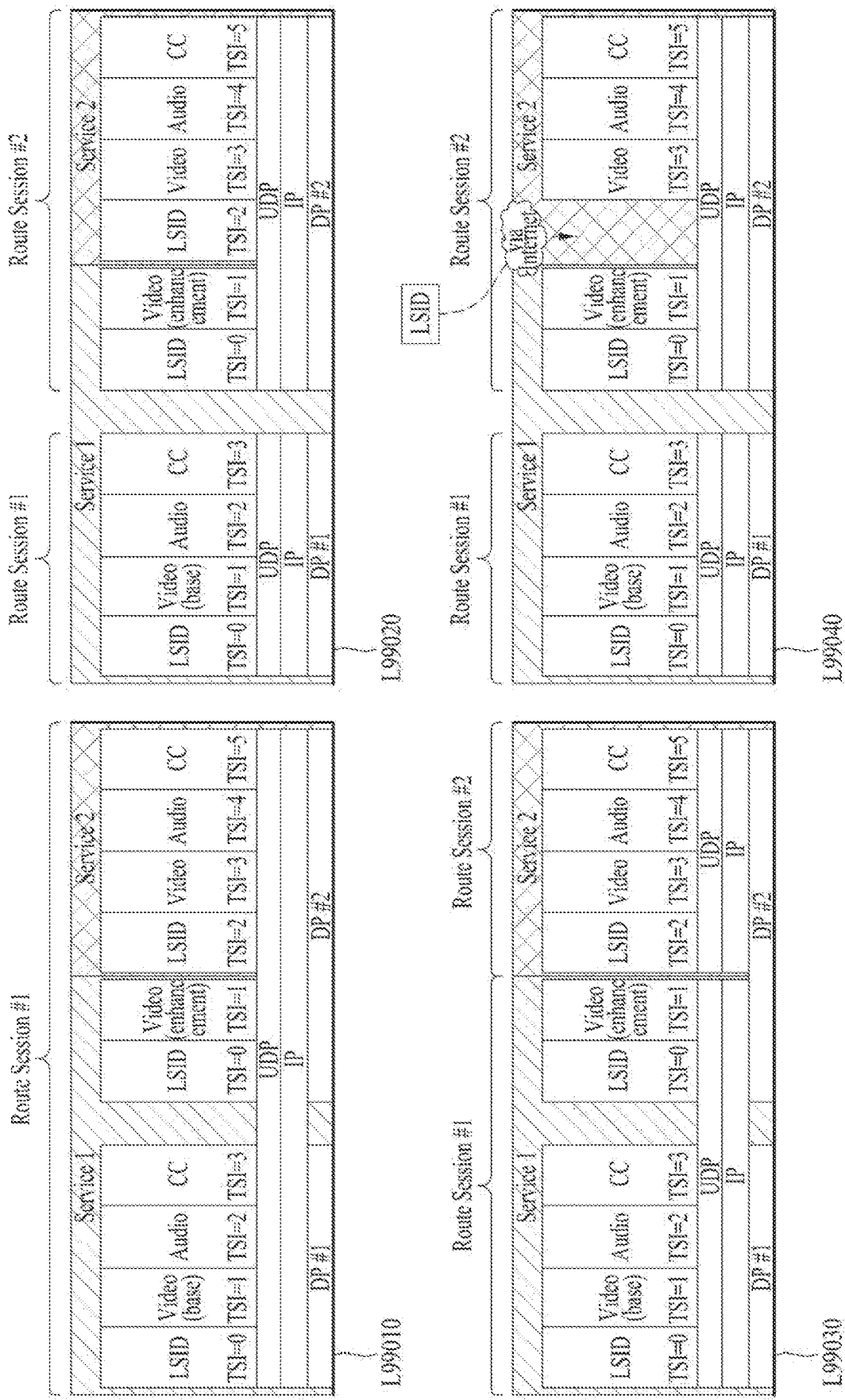

FIGS. 98 and 99 are diagrams showing a ROUTE session and a transmission method of an LSID according to one embodiment of the present invention.

According to one embodiment of the present invention, as shown in the drawing (L98010), Service 1 may be transmitted via ROUTE SESSION #1. Service 1 may include an LSID, a video component, an audio component and/or a CC component, each of which may be transmitted via an LCT session having TSI=0, 1, 2, 3. The LSID, video component, audio component and/or CC component included in Service 1 may be subjected to a UDP and IP packetization process and transmitted via DP #1.

According to another embodiment of the present invention, as shown in the drawing (L98020), Service 1 and Service 2 may be transmitted via ROUTE SESSION #1. Service 1 may include an LSID, a video component, an audio component and/or a CC component, each of which may be transmitted via an LCT session having TSI=0, 1, 2, 3. Service 2 may include an LSID, a video component, an audio component and/or a CC component, each of which may be transmitted via an LCT session having TSI=10, 11, 12, 13. The LSID, video component, audio component and/or CC component included in Service 1 and the LSID, video component, audio component and/or CC component included in Service 2 may be subjected to a UDP and IP packetization process and transmitted via DP #1.

According to another embodiment of the present invention, as shown in the drawing (L99010), Service 1 and Service 2 may be transmitted via ROUTE SESSION #1. Service 1 may include an LSID, a base video component, an enhancement video component, an audio component and/or a CC component. The LSID and the components may be transmitted via an LCT session having TSI=0, 1, 2, 3. Service 2 may include an LSID, a video component, an audio component and/or a CC component, each of which may be transmitted via an LCT session having TSI=2, 3, 4, 5. The LSID and the components may be packetized to packets having the same UDP port number and IP address. The IP packets including Service 1 may be transmitted via DP #1 and the IP packets including Service 2 may be transmitted DP #2. Here, the IP packets including the enhancement video component included in Service 1 may be transmitted via DP #2 and, at this time, the IP packet including the LSID for signaling Service 1 may be included in both DP #1 and DP #2 and transmitted.

According to another embodiment of the present invention, as shown in the drawing (L99020), the LSID, the base video component, the audio component and/or the CC component included in Service 1 may be transmitted via ROUTE SESSION #1. The LSID and the enhancement video component included in Service 1 and the LSID, the video component, the audio component and/or the CC component included in Service 2 may be transmitted via ROUTE SESSION #2. Accordingly, the LSID and the components transmitted via ROUTE SESSION #1 may be packetized to packets having the same UDP port number and IP address and transmitted via DP #1. The LSID and the components transmitted via ROUTE SESSION #2 may be packetized to packets having the same UDP port number and IP address and transmitted via DP #2.

According to another embodiment of the present invention, as shown in the drawing (L99030), the LSID, the base video component, the enhancement video component, the audio component and/or the CC component included in Service 1 may be transmitted via ROUTE SESSION #1. The LSID, the video component, the audio component and/or the CC component included in Service 2 may be transmitted via ROUTE SESSION #2. Accordingly, the LSID and the components transmitted via ROUTE SESSION #1 may be packetized to packets having the same UDP port number and IP address and the LSID and the components transmitted via ROUTE SESSION #2 may be packetized to packets having the same UDP port number and IP address. The LSID, the base video component, the audio component and/or CC component included in Service 1 may be transmitted via DP #1. The LSID and the enhancement video component included in Service I and the LSID, the video component, the audio component and/or the CC component included in Service 2 may be transmitted via DP #2.

Another embodiment of the present invention shown in the drawing L99040 is equal to the embodiment of the drawing (L99020) except that the LSID for signaling Service 2 may be transmitted via the Internet.

Figure 100:
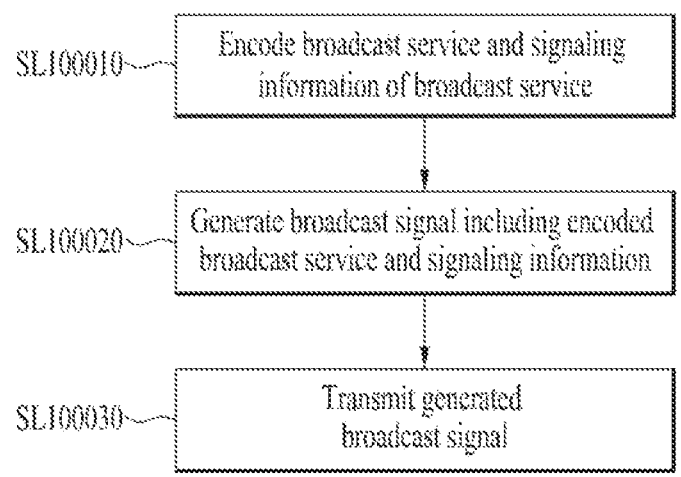
FIG. 100 is a diagram showing a method for transmitting broadcast signals according to one embodiment of the present invention.

FIG. 100 is a diagram showing a method for transmitting broadcast signals according to one embodiment of the present invention.

The broadcast signal transmission method according to one embodiment of the present invention may include encoding (SL100010) a broadcast service and signaling information of the broadcast service, generating (SL100020) a broadcast signal including the encoded broadcast service and signaling information and/or transmitting (SL100030) the generated broadcast signal. Here, the signaling information may have the same meaning as the above-described service signaling information. The transport session may mean a ROUTE session, an LCT session and/or a generic transport session. This was described above with reference to FIGS. 91, 92, 94 and 95.

According to another embodiment of the present invention, the signaling information may include service identification information for identifying the broadcast service, information indicating the name of the broadcast service and/or information indicating whether the broadcast service is active or inactive. Here, the information indicating whether the broadcast service is active or inactive may mean service_status information. This was described above with reference to FIGS. 91, 92, 94 and 95.

According to another embodiment of the present invention, the signaling information may include information for identifying information on a transport session for transmitting the broadcast service. Here, the information for identifying information on a transport session for transmitting the broadcast service may mean the above-described ROUTE-SessionInfo information, source_ip information, destination_IP information, port information, lsid_delivery_tsi information, DeliveryInfo information, DeliveryInfo information, tsi information, URL information and/or DP_ID information. This was described above with reference to FIGS. 91, 92, 94 and 95.

According to another embodiment of the present invention, the signaling information may include information indicating the channel number of the broadcast service. This was described above with reference to FIGS. 91 and 92.

According to another embodiment of the present invention, the signaling information may include information indicating whether the format of the signaling information is binary or XML. This was described above with reference to FIGS. 91 and 93.

According to another embodiment of the present invention, the signaling information may include information on a transport session for transmitting the broadcast service, and the information on the transport session may include source IP address information of the transport session, destination IP address information of the transport session and/or destination port number information of the transport session. Here, the information on the transport session may mean the above-described ROUTESessionInfo information. This was described above with reference to FIGS. 91, 92, 94, 95 and 96.

Figure 101:
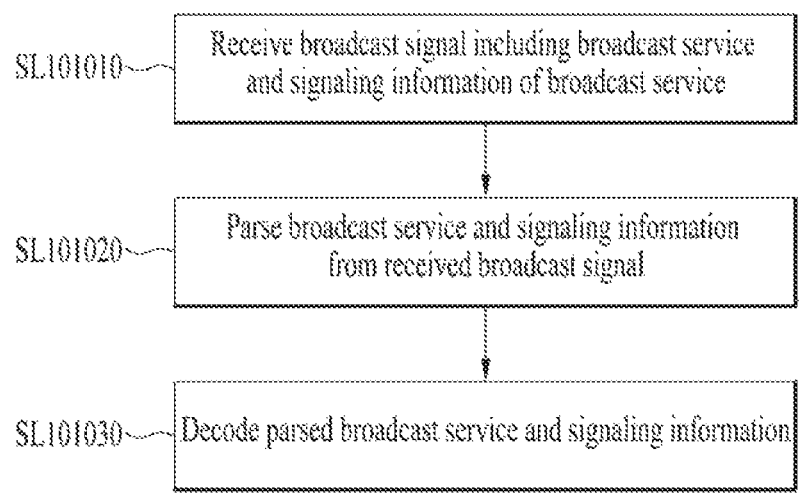
FIG. 101 is a diagram showing a method for receiving broadcast signals according to one embodiment of the present invention.

FIG. 101 is a diagram showing a method for receiving broadcast signals according to one embodiment of the present invention.

The broadcast signal reception method according to one embodiment of the present invention may include receiving (SL101010) a broadcast signal including a broadcast service and signaling information of the broadcast service, parsing (SL101020) the broadcast service and signaling information from the received broadcast signal and/or decoding (SL101030) the parsed broadcast service and signaling information. Here, the signaling information may have the same meaning as the above-described service signaling information. This was described above with reference to FIGS. 91, 92, 94 and 95.

According to another embodiment of the present invention, the signaling information may include service identification information for identifying the broadcast service, information indicating the name of the broadcast service and/or information indicating whether the broadcast service is active or inactive. Here, the information indicating whether the broadcast service is active or inactive may mean service_status information. This was described above with reference to FIGS. 91, 92, 94 and 95.

According to another embodiment of the present invention, the signaling information may include information for identifying information on a transport session for transmitting the broadcast service. Here, the information for identifying information on a transport session for transmitting the broadcast service may mean the above-described ROUTE- SessionInfo information, source_ip information, destination_IP information, port information, lsid_delivery_tsi information, DeliveryInfo information, DeliveryInfo information, tsi information, URL information and/or DP_ID information. This was described above with reference to FIGS. 91, 92, 94 and 95.

According to another embodiment of the present invention, the signaling information may include information indicating the channel number of the broadcast service. This was described above with reference to FIGS. 91 and 92.

According to another embodiment of the present invention, the signaling information may include information indicating whether the format of the signaling information is binary or XML. This was described above with reference to FIGS. 91 and 93.

According to another embodiment of the present invention, the signaling information may include information on a transport session for transmitting the broadcast service, and the information on the transport session may include source IP address information of the transport session, destination IP address information of the transport session and/or destination port number information of the transport session. Here, the information on the transport session may mean the above-described ROUTESessionInfo information. This was described above with reference to FIGS. 91, 92, 94, 95 and 96.

Figure 102:
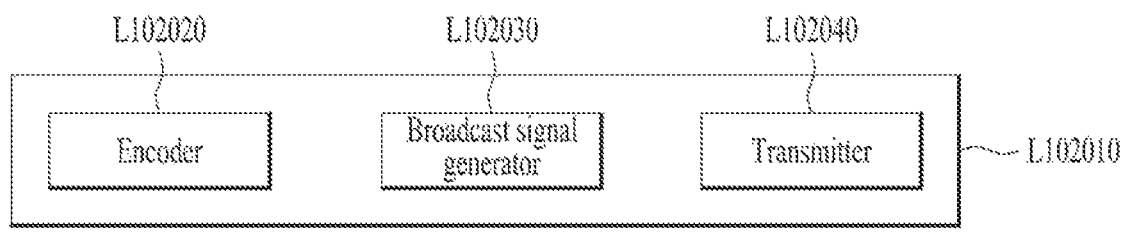
FIG. 102 is a diagram showing the configuration of an apparatus for transmitting broadcast signals according to one embodiment of the present invention.

FIG. 102 is a diagram showing the configuration of an apparatus for transmitting broadcast signals according to one embodiment of the present invention.

The broadcast signal transmission apparatus L102010 according to one embodiment of the present invention may include an encoder L102020, a broadcast signal generator L102030 and/or a transmitter L102040. The encoder may encode a broadcast service and signaling information of the broadcast service. The broadcast signal generator may generate a broadcast signal including the encoded broadcast service and signaling information. The transmitter may transmit the generated broadcast signal.

According to another embodiment of the present invention, the signaling information may include service identification information for identifying the broadcast service, information indicating the name of the broadcast service and/or information indicating whether the broadcast service is active or inactive.

Figure 103:
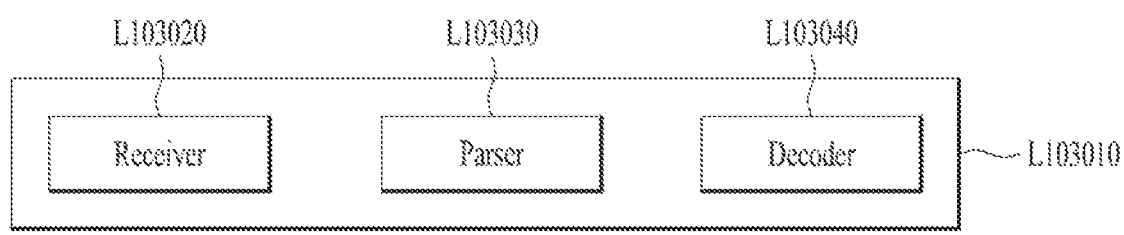
FIG. 103 is a diagram showing the configuration of an apparatus for receiving broadcast signals according to one embodiment of the present invention.

FIG. 103 is a diagram showing the configuration of an apparatus for receiving broadcast signals according to one embodiment of the present invention.

The broadcast signal reception apparatus L103010 according to one embodiment of the present invention may include a receiver L103020, a parser L103030 and/or a decoder L103040. The receiver may receive a broadcast signal including a broadcast service and signaling information of the broadcast service. The parser may parse the broadcast service and signaling information from the received broadcast signal. The decoder may decode the parsed broadcast service and signaling information.

The modules or units may be processors for executing consecutive processes stored in a memory (or a storage unit). The steps described in the above-described embodiments may be performed by hardware/processors. The modules/blocks/units described in the above-described embodiments may operate as hardware/processors. The methods proposed by the present invention may be executed as code. This code may be written in a processor-readable storage medium and may be read by the processor provided by an apparatus.

Although the description of the present invention is explained with reference to each of the accompanying drawings for clarity, it is possible to design new embodiment(s) by merging the embodiments shown in the accompanying drawings with each other. In addition, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. In addition, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

Those skilled in the art will appreciate that various modifications and variations can be made in the present invention without departing from the spirit or scope of the invention described in the appended claims. Accordingly, the present invention are intended to include the modifications and variations of the present invention provided within the appended claims and equivalents thereof.

Both apparatus and method inventions are mentioned in this specification and descriptions of both of the apparatus and method inventions may be complementarily applicable to each other.

Mode for Invention

Various embodiments have been described in the best mode for carrying out the invention.

INDUSTRIAL APPLICABILITY

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for transmitting a broadcast signal, the method comprising:
generating service data;
generating first signaling information including information for a Real-Time Object Delivery over Unidirectional Transport (ROUTE) session carrying the service data and a Layered Coding Transport (LCT) channel in which a component of the service data is delivered,
wherein the first signaling information further includes first source Internet Protocol (IP) address information of the ROUTE session, first destination IP address information of the ROUTE session, first destination port information of the ROUTE session, and transport session identification information for the LCT channel;
generating Media Presentation Description (MPD) information for the service data,
wherein the MPD information includes location information at which the MPD information is available;
generating second signaling information which is used for acquiring the first signaling information and the MPD information,
wherein the second signaling information further includes bootstrap information and signaling transport mode information for indicating a type of delivery protocol of the first signaling information, and further the bootstrap information changes depending on the signaling transport mode information, and
wherein the bootstrap information included in the second signaling information includes second source IP address information of packets for the first signaling information, second destination IP address information of the packets, and second destination port information of the packets; and
transmitting the broadcast signal including the service data, the MPD information, the first signaling information, and the second signaling information,
wherein the second signaling information is transmitted based on an IP packet that is separate from a channel in which the first signaling information is transmitted.

2. The method according to claim 1, wherein the first signaling information includes service identification information for identifying the service data.

3. The method according to claim 1, wherein the second signaling information includes information indicating a channel number of the service data.

4. The method according to claim 1, wherein the second signaling information includes information indicating whether a format of the second signaling information is binary or extensible markup language (XML).

5. The method according to claim 1, wherein the first signaling information includes identification information identifying at least one physical layer pipe in which the identified at least one LCT channel is delivered.

6. A method for receiving a broadcast signal, the method comprising:
receiving, by a receiver, the broadcast signal including at least one signal frame;
parsing the at least one signal frame from the broadcast signal;
parsing packets carrying service data in the at least one signal frame, first signaling information, Media Presentation Description (MPD) information and second signaling information from the at least one signal frame,
wherein the second signaling information is transmitted based on an IP packet that is separate from a channel in which the first signaling information is transmitted,
wherein the first signaling information includes information for a Real-Time Object Delivery over Unidirectional Transport (ROUTE) session carrying the service data and a Layered Coding Transport (LCT) channel in which a component of the service data is delivered,
wherein the first signaling information further includes first source Internet Protocol (IP) address information of the ROUTE session, first destination IP address information of the ROUTE session, first destination port information of the ROUTE session, and transport session identification information for the LCT channel,
wherein the MPD information is used for the service data, and the MPD information includes location information at which the MPD information is available,
wherein the second signaling information is used for acquiring the first signaling information and the MPD information,
wherein the second signaling information further includes bootstrap information and signaling transport mode information for indicating a type of delivery protocol of the first signaling information, and further the bootstrap information changes depending on the signaling transport mode information, and
wherein the bootstrap information included in the second signaling information includes second source IP address information of packets for the first signaling information, second destination IP address information of the packets, and second destination port information of the packets;
parsing the service data from the packets using the first signaling information; and
decoding, by a decoder, data in the service data using the MPD information.

7. The method according to claim 6, wherein the first signaling information includes service identification information for identifying the service data.

8. The method according to claim 6, wherein the second signaling information includes information indicating a channel number of the service data.

9. The method according to claim 6, wherein the second signaling information includes information indicating whether a format of the second signaling information is binary or extensible markup language (XML).

10. The method according to claim 6, wherein the first signaling information includes identification information identifying at least one physical layer pipe in which the identified at least one LCT channel is delivered.

11. An apparatus for transmitting a broadcast signal, the apparatus comprising:
a signaling generator configured to generate first signaling information including information for a Real-Time Object Delivery over Unidirectional Transport (ROUTE) session carrying service data and a Layered Coding Transport (LCT) channel in which a component of the service data is delivered,
wherein the first signaling information further includes first source Internet Protocol (IP) address information of the ROUTE session, first destination IP address information of the ROUTE session, first destination port information of the ROUTE session, and transport session identification information for the LCT channel, wherein the signaling generator further generates Media Presentation Description (MPD) information for content data, wherein the MPD information includes location information at which the MPD information is available, wherein the signaling generator further generates second signaling information which is used for acquiring the first signaling information and the MPD information, wherein the second signaling information further includes bootstrap information and signaling transport mode information for indicating a type of delivery protocol of the first signaling information, and further the bootstrap information changes depending on the signaling transport mode information, and wherein the bootstrap information included in the second signaling information includes second source IP address information of packets for the first signaling information, second destination IP address information of the packets, and second destination port information of the packets; and a transmitter configured to transmit the broadcast signal including the service data, the MPD information, the first signaling information, and the second signaling information, wherein the second signaling information is transmitted based on an IP packet that is separate from a channel in which the first signaling information is transmitted.

12. An apparatus for receiving a broadcast signal, the apparatus comprising:

a receiver configured to receive the broadcast signal including at least one signal frame;

a parser configured to parse the at least one signal frame from the broadcast signal;

a signaling parser configured to parse packets carrying service data in the at least one signal frame, first signaling information, Media Presentation Description (MPD) information and second signaling information from the at least one signal frame, wherein the second signaling information is transmitted based on an IP packet that is separate from a channel in which the first signaling information is transmitted, wherein the first signaling information includes information for a Real-Time Object Delivery over Unidirectional Transport (ROUTE) session carrying the service data and a Layered Coding Transport (LCT) channel in which a component of the service data is delivered, wherein the first signaling information further includes first source Internet Protocol (IP) address information of the ROUTE session, first destination IP address information of the ROUTE session, first destination port information the ROUTE session, and transport session identification information for the LCT channel, wherein the MPD information is used for the content data, and the MPD information includes location information at which the MPD information is available, wherein the second signaling information is used for acquiring the first signaling information and the MPD information, wherein the second signaling information further includes bootstrap information and signaling transport mode information for indicating a type of delivery protocol of the first signaling information, and further the bootstrap information changes depending on the signaling transport mode information, and wherein the bootstrap information included in the second signaling information includes second source IP address information of packets carrying the first signaling information, second destination IP address information of the packets, and second destination port information of the packets;

a packet parser configured to parse the service data from the packets using the first signaling information; and a decoder configured to decode data in the service data using the MPD information.

* * * * *